(12) United States Patent
Hu et al.

(10) Patent No.: US 11,399,405 B2
(45) Date of Patent: Jul. 26, 2022

(54) SESSION MANAGEMENT METHOD, DEVICE, AND SYSTEM

(71) Applicant: Huawei Technologies Co., Ltd., Shenzhen (CN)

(72) Inventors: Xiang Hu, Beijing (CN); Yuan Xia, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/014,696

(22) Filed: Sep. 8, 2020

(65) Prior Publication Data

US 2020/0404733 A1 Dec. 24, 2020

Related U.S. Application Data

(63) Continuation of application No. PCT/CN2019/088226, filed on May 24, 2019.

(30) Foreign Application Priority Data

May 31, 2018 (CN) .......................... 201810552812.5

(51) Int. Cl.
*H04W 76/22* (2018.01)

(52) U.S. Cl.
CPC .................................. *H04W 76/22* (2018.02)

(58) Field of Classification Search
CPC ..... H04W 76/22; H04W 36/12; H04W 36/38; H04W 76/10; H04W 76/11; H04W 36/00; H04W 36/0011
See application file for complete search history.

(56) References Cited

U.S. PATENT DOCUMENTS

2008/0276144 A1* 11/2008 Huben ........... G01R 31/318385
714/733
2009/0198845 A1* 8/2009 Kim ........................ H04L 47/20
710/40
(Continued)

FOREIGN PATENT DOCUMENTS

CN 106851856 A 6/2017
CN 107529199 A 12/2017
(Continued)

OTHER PUBLICATIONS

3rd Generation Partnership Project; Technical Specification Group Services and System Aspects; Procedures for the 5G System; Stage 2 (Release 15), 3GPP TS 23.502 V15.1.0, total 285 pages, 3rd Generation Partnership Project, Valbonne, France (Mar. 2018).
(Continued)

*Primary Examiner* — Nathan S Taylor
(74) *Attorney, Agent, or Firm* — Leydig, Voit & Mayer, Ltd.

(57) ABSTRACT

Embodiments provide a method, a device, and system to implement session management on a UPF network element. The method includes: determining, by a network device, that a first logical interface group on a first UPF network element needs to be migrated; determining, by the network device, a second UPF network element for the first logical interface group; sending, by the network device to the second UPF network element, configuration information of the first logical interface group and information about a first IP address segment corresponding to the first logical interface group, to restore the configuration information of the first logical interface group and the information about the first IP address segment on the second UPF network element; and sending, by the network device, a first message used to restore, on the second UPF network element, information about one or
(Continued)

more sessions corresponding to the first logical interface group.

15 Claims, 24 Drawing Sheets

(56) References Cited

U.S. PATENT DOCUMENTS

| | | | | |
|---|---|---|---|---|
| 2011/0188373 | A1* | 8/2011 | Saito | H04L 1/24 |
| | | | | 370/235 |
| 2017/0288972 | A1* | 10/2017 | Li | H04L 41/046 |
| 2019/0007330 | A1* | 1/2019 | Browne | H04L 47/522 |
| 2019/0356578 | A1* | 11/2019 | Gao | H04L 45/20 |

FOREIGN PATENT DOCUMENTS

| | | |
|---|---|---|
| CN | 107592328 A | 1/2018 |
| CN | 107888498 A | 4/2018 |
| WO | 2017167237 A1 | 10/2017 |

OTHER PUBLICATIONS

3rd Generation Partnership Project; Technical Specification Group Core Network and Terminals; Interface between the Control Plane and the User Plane Nodes; Stage 3 (Release 15), 3GPP TS 29.244 V15.1.0, total 170 pages, 3rd Generation Partnership Project, Valbonne, France (Mar. 2018).

Huawei et al.,"Discussion on restoration Procedure for PSA UPF Failure without Restart," 3GPP TS 23.527, 3GPP TSG CT WG4 Meeting #85bis Sophia Antipolis, France, C4-185268, total 3 pages, 3rd Generation Partnership Project, Valbonne, France (Jul. 9-13, 2018).

"Resource management of UPF shared by multiple SMFs," SA WG2 Meeting #127, Sanya, China, S2-183458, pp. 1-5, 3rd Generation Partnership Project, Valbonne, France (Apr. 16-20, 2018).

"TS 23.502: Handover procedure correction for UPF relocation," SA WG2 Meeting #121, Hangzhou, China, S2-173155 (was S2-17xxxx), pp. 1-10, 3rd Generation Partnership Project, Valbonne, France (May 15-19, 2017).

"Enhancing IP Allocation between UPF and SMF," SA WG2 Meeting #119, Dubrovnik, Croatia, S2-170951 (revision of S2-17xxxx), pp. 1-5, 3rd Generation Partnership Project, Valbonne, France (Feb. 13-17, 2017).

"Solution for Control Plane migration to 5GS," SA WG2 Meeting #126, Montreal, Canada, S2-183042 (e-mail revision 4 of S2-182395), pp. 1-15, 3rd Generation Partnership Project, Valbonne, France (Feb. 26-Mar. 2, 2018).

* cited by examiner

SESSION MANAGEMENT METHOD, DEVICE, AND SYSTEM

CROSS-REFERENCE TO RELATED APPLICATIONS

This application is a continuation of International Application No. PCT/CN2019/088226, filed on May 24, 2019, which claims priority to Chinese Patent Application No. 201810552812.5, filed on May 31, 2018. The disclosures of the aforementioned applications are hereby incorporated by reference in their entireties.

TECHNICAL FIELD

This application relates to the field of communications technologies, and in particular, to a session management method, a device, and a system.

BACKGROUND

To address challenges from wireless broadband technologies and keep 3rd generation partnership project (3GPP) networks staying ahead of the competition, the 3GPP standardization group formulated a network architecture for a next generation mobile communications system (next generation system) at the end of 2016, which is referred to as a 5th generation (5G) network architecture.

Currently, a 5G network architecture defines a session management function (SMF) network element as a session management network element on a 5G core network control plane (NG-CP), so that the SMF network element selects a user plane function (UPF) network element for a session, and manages a session or non-session message exchange procedure between the SMF network element and the UPF network element through an N4/Sx interface. As a user plane function network element on a 5G core network user plane (NG-UP), in addition to exchanging a session or non-session message with the SMF network element through the N4/Sx interface, the UPF network element needs to advertise an N3 interface address to an access device, advertise an N6 interface address to a data network (DN), advertise a related routing policy, and the like, to implement uplink and downlink data transmission.

In a current 5G core network, when a created session needs to be migrated, session migration is autonomously performed by a UPF network element, including session migration performed by a single UPF network element and session migration performed between a plurality of UPF network elements. However, during the session migration performed by the single UPF network element, when the entire UPF network element is faulty, no UPF network element can take over the session. During the session migration performed between the plurality of UPF network elements, an active/standby relationship between the plurality of UPF network elements needs to be coordinated, to trigger a fault monitoring operation and a takeover operation on a UPF network element. Consequently, a function of managing a backup relationship between the plurality of UPF network elements is complex, and there are a large quantity of overheads caused by processing session backup messages between the plurality of UPF network elements. How to implement session management on a UPF network element in a convenient manner is an urgent problem to be resolved currently.

SUMMARY

Embodiments of this application provide a session management method, a device, and a system, to implement session management on a UPF network element in a convenient manner.

To achieve the foregoing objective, the following technical solutions are used in the embodiments of this application.

According to a first aspect, a session management method is provided. The method includes: determining, by a network device, that a first logical interface group on a first user plane function network element needs to be migrated, where the first logical interface group includes a group of interface addresses; determining, by the network device, a second user plane function network element for the first logical interface group; sending, by the network device to the second user plane function network element, configuration information of the first logical interface group and information about a first internet protocol (IP) address segment corresponding to the first logical interface group, to restore the configuration information of the first logical interface group and the information about the first IP address segment on the second user plane function network element; and sending, by the network device, a first message, where the first message is used to restore, on the second user plane function network element, information about one or more sessions corresponding to the first logical interface group. In other words, in this solution, after determining that the first logical interface group on the first user plane function network element needs to be migrated, the network device sends, to the second user plane function network element, the configuration information of the first logical interface group and the information about the first IP address segment corresponding to the first logical interface group, so that the configuration information of the first logical interface group and the information about the first IP address segment can be restored on the second user plane function network element; and the network device sends the first message, so that the information about the one or more sessions corresponding to the first logical interface group can be restored on the second user plane function network element. This is different from the prior art in which a user plane function network element autonomously migrates a session. This can avoid a prior-art problem caused by migration autonomously performed by the user plane function network element. For example, the session can be flexibly taken over after the user plane function network element is faulty, a complex function of managing a backup relationship between a plurality of user plane function network elements is avoided, and a large quantity of overheads caused by processing session backup messages between the UPF network elements can be avoided. In other words, session management on the user plane function network element can be implemented in a convenient manner.

In an embodiment, the network device includes a session management network element or a service control function network element.

In an embodiment, when the network device is the session management network element, the session management method provided in this embodiment of this application further includes: determining, by the session management network element based on information about the first logical interface group, the information about the one or more sessions corresponding to the first logical interface group; and correspondingly, the sending, by the network device, a first message includes: sending, by the session management network element, the first message to the second user plane function network element, where the first message carries the information about the one or more sessions corresponding to the first logical interface group. In other words, in this solution, the session management network element may initiate a procedure for restoring the configuration information of the first logical interface group, a procedure for restoring the information about the first IP address segment corresponding to the first logical interface group, and a procedure for restoring the information about the one or more sessions corresponding to the first logical interface group.

In an embodiment, when the network device is the service control function network element, correspondingly, the sending, by the network device, a first message includes: sending, by the service control function network element, the first message to a session management network element, where the first message carries information about the first logical interface group, and is used to indicate the session management network element to initiate a procedure for restoring the information about the one or more sessions corresponding to the first logical interface group, so that the session management network element sends a second message to the second user plane function network element, and the second message carries the information about the one or more sessions corresponding to the first logical interface group. In other words, in this solution, the service control function network element may initiate a procedure for restoring the configuration information of the first logical interface group and a procedure for restoring the information about the first IP address segment corresponding to the first logical interface group, and the service control function network element controls the session management network element to initiate the procedure for restoring the information about the one or more sessions corresponding to the first logical interface group.

In an embodiment, the determining, by a network device, that a first logical interface group on a first user plane function network element needs to be migrated includes: obtaining, by the network device, one or more of a running status of the first user plane function network element or a running status of the first logical interface group on the first user plane function network element; and determining, by the network device based on one or more of the running status of the first user plane function network element or the running status of the first logical interface group on the first user plane function network element, that the first logical interface group on the first user plane function network element is faulty. Based on this solution, the network device may determine that the first logical interface group on the first user plane function network element needs to be migrated.

In an embodiment, when the network device is the session management network element, the session management method provided in this embodiment of this application further includes: determining, by the session management network element based on information about the first logical interface group, the information about the one or more sessions corresponding to the first logical interface group; correspondingly, the sending, by the network device, a first message includes: sending, by the session management network element, the first message to the second user plane function network element, where the first message carries the information about the one or more sessions corresponding to the first logical interface group; and the sending, by the network device to the second user plane function network element, configuration information of the first logical interface group and information about a first IP address segment corresponding to the first logical interface group includes: after the session management network element receives a third message returned by the second user plane function network element based on the first message, sending, by the session management network element to the second user plane function network element, the configuration information of the first logical interface group and the information about the first IP address segment corresponding to the first logical interface group, where the third message is used to indicate that the information about the one or more sessions corresponding to the first logical interface group has been successfully restored on the second user plane function network element. In other words, in this solution, the session management network element may initiate a procedure for restoring the configuration information of the first logical interface group, a procedure for restoring the information about the first IP address segment corresponding to the first logical interface group, and a procedure for restoring the information about the one or more sessions corresponding to the first logical interface group. In addition, in this embodiment of this application, during session migration, the information about the one or more sessions corresponding to the first logical interface group may be first restored, and then the configuration information of the first logical interface group and the information about the first IP address segment corresponding to the first logical interface group may be restored. This can reduce service interruption during the session migration, and can maintain service continuity.

In an embodiment, when the network device is the service control function network element, correspondingly, the sending, by the network device, a first message includes: sending, by the service control function network element, the first message to a session management network element, where the first message carries information about the first logical interface group, and is used to indicate the session management network element to initiate a procedure for restoring the information about the one or more sessions corresponding to the first logical interface group, so that the session management network element sends a second message to the second user plane function network element, and the second message carries the information about the one or more sessions corresponding to the first logical interface group; and the sending, by the network device to the second user plane function network element, configuration information of the first logical interface group and information about a first IP address segment corresponding to the first logical interface group includes: after the service control function network element receives a third message returned by the session management network element based on the first message, sending, by the service control function network element to the second user plane function network element, the configuration information of the first logical interface group and the information about the first IP address segment corresponding to the first logical interface group, where the third message is used to indicate that the information about the one or more sessions corresponding to the first logical interface group has been successfully restored on the second user plane function network element. In other words, in this solution, the service control function network element may initiate a procedure for restoring the configuration information of the first logical interface group and a procedure for restoring the information about the first IP address segment corresponding to the first logical interface group, and the service control function network element controls the session management network element to initiate the procedure for restoring the information about the one or more sessions corresponding to the first logical interface group. In addition, in this embodiment of this application, during session migration, the information about the one or more sessions corresponding to the first logical interface group may be first restored, and then the configuration information of the first logical interface group and the information about the first IP address segment corresponding to the first logical interface group may be restored. This can reduce service interruption during the session migration, and can maintain service continuity.

In an embodiment, the determining, by a network device, that a first logical interface group on a first user plane function network element needs to be migrated includes: obtaining, by the network device, load information of the first user plane function network element; and determining, by the network device based on the load information, that the first logical interface group on the first user plane function network element needs to be migrated. Based on this solution, the network device may determine that the first logical interface group on the first user plane function network element needs to be migrated.

In an embodiment, when the network device is the session management network element, correspondingly, the determining, by the network device, a second user plane function network element for the first logical interface group includes: sending, by the session management network element, a fourth message to a service control function network element, where the fourth message carries an identifier of the first user plane function network element and the information about the first logical interface group, and is used to request to reselect a user plane function network element for the first logical interface group; and receiving, from the service control function network element, an identifier of the second user plane function network element and the information about the first logical interface group, to indicate to migrate the first logical interface group to the second user plane function network element; or selecting, by the session management network element, the second user plane function network element for the first logical interface group. Based on this solution, the network device may determine the second user plane function network element for the first logical interface group.

In an embodiment, when the network device is the session management network element, correspondingly, before the determining, by a network device, that a first logical interface group on a first user plane function network element needs to be migrated, the session management method provided in this embodiment of this application further includes: sending, by the session management network element, a fifth message to a service control function network element, where the fifth message carries an identifier of the first user plane function network element, and is used to request to allocate, to the first UPF network element, a first logical interface group list and one or more IP address segments corresponding to each of one or more logical interface groups in the first logical interface group list; receiving, by the session management network element from the service control function network element, the configuration information of the first logical interface group and the information about the first IP address segment corresponding to the first logical interface group; and sending, by the session management network element to the first user plane function network element, the configuration information of the first logical interface group and the information about the first IP address segment corresponding to the first logical interface group. In other words, in this solution, when the network device is the session management network element, the service control function network element may be used as a centralized management node of user plane function network elements. For example, the service control function network element may allocate, to the first UPF network element, the first logical interface group list and the one or more IP address segments corresponding to each of the one or more logical interface groups in the first logical interface group list.

In an embodiment, before the determining, by a network device, that a first logical interface group on a first user plane function network element needs to be migrated, the session management method provided in this embodiment of this application further includes: allocating, by the network device to the first user plane function network element, the first logical interface group and the first IP address segment corresponding to the first logical interface group; and sending, by the session management network element to the first user plane function network element, the configuration information of the first logical interface group and the information about the first IP address segment corresponding to the first logical interface group. In other words, in this solution, the network device may be used as a centralized management node of user plane function network elements. For example, the network device may allocate, to the first UPF network element, a first logical interface group list and one or more IP address segments corresponding to each of one or more logical interface groups in the first logical interface group list.

In an embodiment, when the network device is the service control function network element, correspondingly, the determining, by a network device, that a first logical interface group on a first user plane function network element needs to be migrated includes: receiving, by the service control function network element, a sixth message from a session management network element, where the sixth message carries the information about the first logical interface group, and is used to request to reselect a user plane function network element for the first logical interface group. Based on this solution, the network device may determine that the first logical interface group on the first user plane function network element needs to be migrated.

In an embodiment, the session management method provided in this embodiment of this application further includes: sending, by the network device, a notification message to the first user plane function network element, where the notification message is used to notify the first user plane function network element to delete the information related to the first logical interface group, the information related to the first logical interface group includes one or more of the configuration information of the first logical interface group, the information about the first IP address segment corresponding to the first logical interface group, the information about the one or more sessions corresponding to the first logical interface group, or an advertised routing policy for the first IP address segment, and the routing policy is used to route data to the first user plane function network element. Based on this solution, after a session is migrated, the information related to the migrated first logical interface group on the first user plane function network element may be deleted. On one hand, this can save storage space of the first user plane function network element, and reduce a waste of resources. On the other hand, this can avoid a session failure that may be caused because all data is automatically resumed on the first user plane function network element according to the remaining routing policy without being perceived by the session management network element when the second user plane function network element is faulty subsequently.

In an embodiment, the determining, by the session management network element based on information about the first logical interface group, the information about the one or more sessions corresponding to the first logical interface group includes: determining, by the session management network element based on the information about the first logical interface group and a stored correspondence between the information about the first logical interface group and the information about the one or more sessions corresponding to the first logical interface group, the information about the one or more sessions corresponding to the first logical interface group. Based on this solution, the session management network element may determine the information about the one or more sessions corresponding to the first logical interface group.

In an embodiment, when the network device is the session management network element, before the determining, by a network device, that a first logical interface group on a first user plane function network element needs to be migrated, the session management method provided in this embodiment of this application further includes: determining, by the session management network element, that a session needs to be established for the first terminal; selecting, by the session management network element, the first user plane function network element to serve the first terminal; allocating, by the session management network element, a first interface address to the first terminal based on the first logical interface group on the first user plane function network element; allocating, by the session management network element, a first IP address to the first terminal, where the first IP address is an address in the first IP address segment corresponding to the first logical interface group; obtaining, by the session management network element based on the first interface address, a first fully qualified tunnel endpoint identifier F-TEID corresponding to the session; and generating, by the session management network element, information about a first session for the first terminal, and establishing a correspondence between the information about the first logical interface group and the information about the first session, where the information about the first session includes one or more of the first IP address or the first F-TEID. Based on this solution, the session management network element may bind the first logical interface group to the information about the first session. In this way, when the first logical interface group is to be migrated subsequently, the session management network element can obtain, based on the established correspondence, the information about the one or more sessions corresponding to the first logical interface group. The information about the one or more sessions includes the information about the first session.

Optionally, in an embodiment, the obtaining, by the session management network element based on the first interface address, a first F-TEID corresponding to the session includes: allocating, by the session management network element to the first terminal based on the first interface address, the first F-TEID corresponding to the session.

Alternatively, optionally, in an embodiment, the obtaining, by the session management network element based on the first interface address, a first F-TEID corresponding to the session includes: sending, by the session management network element, the first interface address to the first user plane function network element, where the first interface address is used by the first user plane function network element to allocate, to the first terminal, the first F-TEID corresponding to the session; and receiving the first F-TEID from the first user plane function network element.

According to a second aspect, a session management method is provided. The method includes: receiving, by a second user plane function network element from a network device, configuration information of a first logical interface group and information about a first internet protocol IP address segment corresponding to the first logical interface group, where the first logical interface group includes a group of interface addresses; receiving, by the second user plane network element, a seventh message, where the seventh message is used to restore, on the second user plane function network element, information about one or more sessions corresponding to the first logical interface group; restoring, by the second user plane function network element, the configuration information of the first logical interface group and the information about the first IP address segment on the second user plane function network element based on the configuration information of the first logical interface group and the information about the first IP address segment, and advertising a routing policy for the first IP address segment, where the routing policy is used to route data to the second user plane function network element; and restoring, by the second user plane function network element on the second user plane function network element based on the seventh message, the information about the one or more sessions corresponding to the first logical interface group. In other words, in this solution, when the first logical interface group on a first user plane function network element needs to be migrated, the second user plane function network element may receive, from the network device, the configuration information of the first logical interface group and the information about the first IP address segment corresponding to the first logical interface group, so that the configuration information of the first logical interface group and the information about the first IP address segment can be restored on the second user plane function network element; and the second user plane function network element may receive the seventh message, so that the information about the one or more sessions corresponding to the first logical interface group can be restored on the second user plane function network element. This is different from the prior art in which a user plane function network element autonomously migrates a session. This can avoid a prior-art problem caused by migration autonomously performed by the user plane function network element. For example, the session can be flexibly taken over after the user plane function network element is faulty, a complex function of managing a backup relationship between a plurality of user plane function network elements is avoided, and a large quantity of overheads caused by processing session backup messages between the UPF network elements can be avoided. In other words, session management on the user plane function network element can be implemented in a convenient manner.

In an embodiment, when the network device is a session management network element, correspondingly, the receiving, by the second user plane network element, a seventh message includes: receiving, by the second user plane function network element, the seventh message from the session management network element, where the seventh message carries the information about the one or more sessions corresponding to the first logical interface group. In other words, in this solution, the session management network element may initiate a procedure for restoring the configuration information of the first logical interface group, a procedure for restoring the information about the first IP address segment corresponding to the first logical interface group, and a procedure for restoring the information about the one or more sessions corresponding to the first logical interface group.

In an embodiment, when the network device is a session management network element, correspondingly, the receiving, by the second user plane network element, a seventh message includes: receiving, by the second user plane function network element, the seventh message from the session management network element, where the seventh message carries the information about the one or more sessions corresponding to the first logical interface group; and the receiving, by a second user plane function network element from a network device, configuration information of a first logical interface group and information about a first IP address segment corresponding to the first logical interface group includes: after the second user plane function network element sends a third message to the session management network element based on the seventh message, receiving, by the second user plane function network element from the session management network element, the configuration information of the first logical interface group and the information about the first IP address segment corresponding to the first logical interface group, where the third message is used to indicate that the information about the one or more sessions corresponding to the first logical interface group has been successfully restored on the second user plane function network element. In other words, in this solution, the session management network element may initiate a procedure for restoring the configuration information of the first logical interface group, a procedure for restoring the information about the first IP address segment corresponding to the first logical interface group, and a procedure for restoring the information about the one or more sessions corresponding to the first logical interface group. In addition, in this embodiment of this application, during session migration, the information about the one or more sessions corresponding to the first logical interface group may be first restored, and then the configuration information of the first logical interface group and the information about the first IP address segment corresponding to the first logical interface group may be restored. This can reduce service interruption during the session migration, and can maintain service continuity.

In an embodiment, when the network device is a service control function network element, correspondingly, the receiving, by the second user plane network element, a seventh message includes: receiving, by the second user plane function network element, the seventh message from a session management network element, where the seventh message carries the information about the one or more sessions corresponding to the first logical interface group. In other words, in this solution, the service control function network element may initiate a procedure for restoring the configuration information of the first logical interface group and a procedure for restoring the information about the first IP address segment corresponding to the first logical interface group, and the service control function network element controls the session management network element to initiate a procedure for restoring the information about the one or more sessions corresponding to the first logical interface group.

In an embodiment, when the network device is a service control function network element, correspondingly, the receiving, by the second user plane network element, a seventh message includes: receiving, by the second user plane function network element, the seventh message from a session management network element, where the seventh message carries the information about the one or more sessions corresponding to the first logical interface group; and the receiving, by a second user plane function network element from a network device, configuration information of a first logical interface group and information about a first IP address segment corresponding to the first logical interface group includes: after the second user plane function network element sends an eighth message to the session management network element based on the seventh message, receiving, by the second user plane function network element from the service control function network element, the configuration information of the first logical interface group and the information about the first IP address segment corresponding to the first logical interface group, where the eighth message is used to indicate that the information about the one or more sessions corresponding to the first logical interface group has been successfully restored on the second user plane function network element. In other words, in this solution, the service control function network element may initiate a procedure for restoring the configuration information of the first logical interface group and a procedure for restoring the information about the first IP address segment corresponding to the first logical interface group, and the service control function network element controls the session management network element to initiate a procedure for restoring the information about the one or more sessions corresponding to the first logical interface group. In addition, in this embodiment of this application, during session migration, the information about the one or more sessions corresponding to the first logical interface group may be first restored, and then the configuration information of the first logical interface group and the information about the first IP address segment corresponding to the first logical interface group may be restored. This can reduce service interruption during the session migration, and can maintain service continuity.

In an embodiment, the session management method provided in this embodiment of this application further includes: sending, by the second user plane function network element, one or more of a running status of the second user plane function network element, a running status of the first logical interface group on the second user plane function network element, or load information of the second user plane function network element to the session management network element, where one or more of the running status of the second user plane function network element, the running status of the first logical interface group on the second user plane function network element, or the load information of the second user plane function network element are used to determine whether the first logical interface group on the second user plane function network element needs to be migrated. Based on this solution, the session management network element may determine whether the first logical interface group on the second user plane function network element needs to be migrated.

In an embodiment, the session management method provided in this embodiment of this application further includes: sending, by the second user plane function network element, one or more of a running status of the second user plane function network element, a running status of the first logical interface group on the second user plane function network element, or load information of the second user plane function network element to the network device, where one or more of the running status of the second user plane function network element, the running status of the first logical interface group on the second user plane function network element, or the load information of the second user plane function network element are used to determine whether the first logical interface group on the second user plane function network element needs to be migrated. Based on this solution, the network device may determine whether the first logical interface group on the second user plane function network element needs to be migrated.

According to a third aspect, a session management method is provided. The method includes: determining, by a session management network element, that a session needs to be established for a first terminal; selecting, by the session management network element, a first user plane function network element to serve the first terminal; allocating, by the session management network element, a first interface address to the first terminal based on a first logical interface group on the first user plane function network element, where the first logical interface group includes a group of interface addresses; allocating, by the session management network element, a first internet protocol IP address to the first terminal, where the first IP address is an address in a first IP address segment corresponding to the first logical interface group; obtaining, by the session management network element based on the first interface address, a first fully qualified tunnel endpoint identifier F-TEID corresponding to the session; and generating, by the session management network element, information about a first session for the first terminal, and establishing a correspondence between information about the first logical interface group and the information about the first session, where the information about the first session includes one or more of the first IP address or the first F-TEID. Based on this solution, the session management network element may bind the first logical interface group to the information about the first session. In this way, when the first logical interface group is to be migrated subsequently, the session management network element can obtain, based on the established correspondence, information about one or more sessions corresponding to the first logical interface group. The information about the one or more sessions includes the information about the first session.

Optionally, in an embodiment, the obtaining, by the session management network element based on the first interface address, a first F-TEID corresponding to the session includes: allocating, by the session management network element to the first terminal based on the first interface address, the first F-TEID corresponding to the session.

Alternatively, optionally, in an embodiment, the obtaining, by the session management network element based on the first interface address, a first F-TEID corresponding to the session includes: sending, by the session management network element, the first interface address to the first user plane function network element, where the first interface address is used by the first user plane function network element to allocate, to the first terminal, the first F-TEID corresponding to the session; and receiving the first F-TEID from the first user plane function network element.

In an embodiment, the session management method provided in this embodiment of this application further includes: allocating, by the session management network element to the first user plane function network element, the first logical interface group and the first IP address segment corresponding to the first logical interface group; and sending, by the session management network element, configuration information of the first logical interface group and information about the first IP address segment to the first user plane function network element. In other words, in this solution, the session management network element may be used as a centralized management node of user plane function network elements. For example, the session management network element may allocate, to the first UPF network element, a first logical interface group list and one or more IP address segments corresponding to each of one or more logical interface groups in the first logical interface group list.

In an embodiment, the session management method provided in this embodiment of this application further includes: sending, by the session management network element, a fifth message to a service control function network element, where the fifth message carries an identifier of the first user plane function network element, and is used to request to allocate, to the first UPF network element, a first logical interface group list and one or more IP address segments corresponding to each of one or more logical interface groups in the first logical interface group list; receiving, by the session management network element from the service control function network element, configuration information of the first logical interface group and information about the first IP address segment corresponding to the first logical interface group; and sending, by the session management network element to the first user plane function network element, the configuration information of the first logical interface group and the information about the first IP address segment corresponding to the first logical interface group. In other words, in this solution, the service control function network element may be used as a centralized management node of user plane function network elements, and the session management network element may be used as a proxy management node of the user plane function network elements. For example, the service control function network element may allocate, to the first UPF network element, the first logical interface group list and the one or more IP address segments corresponding to each of the one or more logical interface groups in the first logical interface group list; and then the session management network element sends, to the first user plane function network element, the configuration information of the first logical interface group and the information about the first IP address segment corresponding to the first logical interface group.

In an embodiment, the session management method provided in this embodiment of this application further includes: determining, by the session management network element, that the first logical interface group needs to be migrated; determining, by the session management network element, a second user plane function network element for the first logical interface group; sending, by the session management network element to the second user plane function network element, the configuration information of the first logical interface group and the information about the first IP address segment corresponding to the first logical interface group, to restore the configuration information of the first logical interface group and the information about the first IP address segment on the second user plane function network element; and sending, by the session management network element, a first message, where the first message is used to restore, on the second user plane function network element, information about one or more sessions corresponding to the first logical interface group, and the information about the one or more sessions includes the information about the first session. In other words, in this solution, after determining that the first logical interface group on the first user plane function network element needs to be migrated, the session management network element sends, to the second user plane function network element, the configuration information of the first logical interface group and the information about the first IP address segment corresponding to the first logical interface group, so that the configuration information of the first logical interface group and the information about the first IP address segment can be restored on the second user plane function network element; and the session management network element sends the first message, so that the information about the one or more sessions corresponding to the first logical interface group can be restored on the second user plane function network element. This is different from the prior art in which a user plane function network element autonomously migrates a session. This can avoid a prior-art problem caused by migration autonomously performed by the user plane function network element. For example, the session can be flexibly taken over after the user plane function network element is faulty, a complex function of managing a backup relationship between a plurality of user plane function network elements is avoided, and a large quantity of overheads caused by processing session backup messages between the UPF network elements can be avoided. In other words, session management on the user plane function network element can be implemented in a convenient manner.

In addition, optionally, the session management network element in this embodiment of this application may further perform the session management method, corresponding to a case in which the network device is the session management network element, in the possible designs of the first aspect. For related descriptions, refer to descriptions in the first aspect. Details are not described herein again.

According to a fourth aspect, a session management method is provided. The method includes: obtaining, by a first user plane function network element, one or more of a running status of the first user plane function network element, a running status of the first logical interface group on the first user plane function network element, or load information of the first user plane function network element; and sending, by the first user plane function network element, one or more of the running status of the first user plane function network element, the running status of the first logical interface group on the first user plane function network element, or the load information of the first user plane function network element to a network device, where the first logical interface group includes a group of interface addresses, and one or more of the running status of the first user plane function network element, the running status of the first logical interface group on the first user plane function network element, or the load information of the first user plane function network element are used to determine whether the first logical interface group on the first user plane function network element needs to be migrated. Optionally, the network device may be a session management network element or a service control function network element. This is not specifically limited in this embodiment of this application. Based on this solution, the network device may determine whether the first logical interface group on a second user plane function network element needs to be migrated.

According to a fifth aspect, a session management method is provided. The method includes: determining, by a network device, that a first logical interface group on a first user plane function network element needs to be migrated, where the first logical interface group includes a group of interface addresses; determining, by the network device, a second user plane function network element for the first logical interface group; sending, by the network device, configuration information of the first logical interface group to the second user plane function network element, to restore the configuration information of the first logical interface group on the second user plane function network element; and sending, by the network device, a first message, where the first message is used to restore, on the second user plane function network element, information about one or more sessions corresponding to the first logical interface group. In other words, in this solution, after determining that the first logical interface group on the first user plane function network element needs to be migrated, the network device sends the configuration information of the first logical interface group to the second user plane function network element, so that the configuration information of the first logical interface group can be restored on the second user plane function network element; and the network device sends the first message, so that the information about the one or more sessions corresponding to the first logical interface group can be restored on the second user plane function network element. This is different from the prior art in which a user plane function network element autonomously migrates a session. This can avoid a prior-art problem caused by migration autonomously performed by the user plane function network element. For example, the session can be flexibly taken over after the user plane function network element is faulty, a complex function of managing a backup relationship between a plurality of user plane function network elements is avoided, and a large quantity of overheads caused by processing session backup messages between the UPF network elements can be avoided. In other words, session management on the user plane function network element can be implemented in a convenient manner.

It should be noted that this embodiment of this application provides a description by using an example in which a first IP address segment corresponding to the first logical interface group does not need to be allocated to the first user plane function network element. In this case, after determining that the first logical interface group on the first user plane function network element needs to be migrated, the network device may not need to send, to the second user plane function network element, information about the first IP address segment corresponding to the first logical interface group. For example, if the first user plane function network element is not a user plane function network element, for example, an intermediate user plane function network element, that directly communicates with or interfaces with a data network, the first IP address segment corresponding to the first logical interface group may not need to be allocated to the first user plane function network element. Further, after determining that the first logical interface group on the first user plane function network element needs to be migrated, the network device may not send, to the second user plane function network element, the information about the first IP address segment corresponding to the first logical interface group. A general description is provided herein, and details are not described below.

In addition, optionally, the network device in this embodiment of this application may further perform a session management method similar to that in the possible designs of the first aspect. A difference is as follows: For example, this embodiment of this application does not require the information about the first IP address segment corresponding to the first logical interface group. For related descriptions, refer to descriptions in the first aspect. Details are not described herein again.

According to a sixth aspect, a network device is provided. The network device includes a processing module and a transceiver module, where the processing module is configured to determine that a first logical interface group on a first user plane function network element needs to be migrated, where the first logical interface group includes a group of interface addresses; the processing module is further configured to determine a second user plane function network element for the first logical interface group; the transceiver module is configured to send, to the second user plane function network element, configuration information of the first logical interface group and information about a first internet protocol IP address segment corresponding to the first logical interface group, to restore the configuration information of the first logical interface group and the information about the first IP address segment on the second user plane function network element; and the transceiver module is further configured to send a first message, where the first message is used to restore, on the second user plane function network element, information about one or more sessions corresponding to the first logical interface group.

In an embodiment, the network device includes a session management network element or a service control function network element.

In an embodiment, when the network device is the session management network element, the processing module is further configured to determine, based on information about the first logical interface group, the information about the one or more sessions corresponding to the first logical interface group; and correspondingly, that the transceiver module is configured to send a first message includes: the transceiver module is configured to send the first message to the second user plane function network element, where the first message carries the information about the one or more sessions corresponding to the first logical interface group.

In an embodiment, when the network device is the service control function network element, correspondingly, that the transceiver module is configured to send a first message includes: the transceiver module is configured to send the first message to a session management network element, where the first message carries information about the first logical interface group, and is used to indicate the session management network element to initiate a procedure for restoring the information about the one or more sessions corresponding to the first logical interface group, so that the session management network element sends a second message to the second user plane function network element, and the second message carries the information about the one or more sessions corresponding to the first logical interface group.

In an embodiment, that the processing module is configured to determine that a first logical interface group on a first user plane function network element needs to be migrated includes: the processing module is configured to: obtain one or more of a running status of the first user plane function network element or a running status of the first logical interface group on the first user plane function network element; and determine, based on one or more of the running status of the first user plane function network element or the running status of the first logical interface group on the first user plane function network element, that the first logical interface group on the first user plane function network element is faulty.

In an embodiment, when the network device is the session management network element, the processing module is further configured to determine, based on information about the first logical interface group, the information about the one or more sessions corresponding to the first logical interface group; correspondingly, that the transceiver module is configured to send a first message includes: the transceiver module is configured to send the first message to the second user plane function network element, where the first message carries the information about the one or more sessions corresponding to the first logical interface group; and that the transceiver module is configured to send, to the second user plane function network element, configuration information of the first logical interface group and information about a first IP address segment corresponding to the first logical interface group includes: the transceiver module is configured to: after receiving a third message returned by the second user plane function network element based on the first message, send, to the second user plane function network element, the configuration information of the first logical interface group and the information about the first IP address segment corresponding to the first logical interface group, where the third message is used to indicate that the information about the one or more sessions corresponding to the first logical interface group has been successfully restored on the second user plane function network element.

In an embodiment, when the network device is the service control function network element, correspondingly, that the transceiver module is configured to send a first message includes: the transceiver module is configured to send the first message to a session management network element, where the first message carries information about the first logical interface group, and is used to indicate the session management network element to initiate a procedure for restoring the information about the one or more sessions corresponding to the first logical interface group, so that the session management network element sends a second message to the second user plane function network element, and the second message carries the information about the one or more sessions corresponding to the first logical interface group; and that the transceiver module is configured to send, to the second user plane function network element, configuration information of the first logical interface group and information about a first IP address segment corresponding to the first logical interface group includes: the transceiver module is configured to: after receiving a third message returned by the session management network element based on the first message, send, to the second user plane function network element, the configuration information of the first logical interface group and the information about the first IP address segment corresponding to the first logical interface group, where the third message is used to indicate that the information about the one or more sessions corresponding to the first logical interface group has been successfully restored on the second user plane function network element.

In an embodiment, that the processing module is configured to determine that a first logical interface group on a first user plane function network element needs to be migrated includes: the processing module is configured to: obtain load information of the first user plane function network element; and determine, based on the load information, that the first logical interface group on the first user plane function network element needs to be migrated.

In an embodiment, when the network device is the session management network element, correspondingly, that the processing module is further configured to determine a second user plane function network element for the first logical interface group includes: the processing module is configured to: send a fourth message to a service control function network element, where the fourth message carries an identifier of the first user plane function network element and the information about the first logical interface group, and is used to request to reselect a user plane function network element for the first logical interface group; and receive, from the service control function network element, an identifier of the second user plane function network element and the information about the first logical interface group, to indicate to migrate the first logical interface group to the second user plane function network element; or that the processing module is further configured to determine a second user plane function network element for the first logical interface group includes: the processing module is configured to select the second user plane function network element for the first logical interface group.

In an embodiment, when the network device is the session management network element, correspondingly, the transceiver module is further configured to send a fifth message to a service control function network element, where the fifth message carries an identifier of the first user plane function network element, and is used to request to allocate, to the first UPF network element, a first logical interface group list and one or more IP address segments corresponding to each of one or more logical interface groups in the first logical interface group list; the transceiver module is further configured to receive, from the service control function network element, the configuration information of the first logical interface group and the information about the first IP address segment corresponding to the first logical interface group; and the transceiver module is further configured to send, to the first user plane function network element, the configuration information of the first logical interface group and the information about the first IP address segment corresponding to the first logical interface group.

In an embodiment, the processing module is further configured to allocate, to the first user plane function network element, the first logical interface group and the first IP address segment corresponding to the first logical interface group; and the transceiver module is further configured to send, to the first user plane function network element, the configuration information of the first logical interface group and the information about the first IP address segment corresponding to the first logical interface group.

In an embodiment, when the network device is the service control function network element, correspondingly, that the processing module is configured to determine that a first logical interface group on a first user plane function network element needs to be migrated includes: the processing module is configured to receive a sixth message from a session management network element, where the sixth message carries the information about the first logical interface group, and is used to request to reselect a user plane function network element for the first logical interface group.

In an embodiment, the transceiver module is further configured to send a notification message to the first user plane function network element, where the notification message is used to notify the first user plane function network element to delete the information related to the first logical interface group, the information related to the first logical interface group includes one or more of the configuration information of the first logical interface group, the information about the first IP address segment corresponding to the first logical interface group, the information about the one or more sessions corresponding to the first logical interface group, or an advertised routing policy for the first IP address segment, and the routing policy is used to route data to the first user plane function network element.

In an embodiment, that the processing module is configured to determine, based on information about the first logical interface group, the information about the one or more sessions corresponding to the first logical interface group includes: the processing module is configured to determine, based on the information about the first logical interface group and a stored correspondence between the information about the first logical interface group and the information about the one or more sessions corresponding to the first logical interface group, the information about the one or more sessions corresponding to the first logical interface group.

In an embodiment, when the network device is the session management network element, correspondingly, the processing module is further configured to, after determining that a session needs to be established for the first terminal, select the first user plane function network element to serve the first terminal; the processing module is further configured to allocate a first interface address to the first terminal based on the first logical interface group on the first user plane function network element; the processing module is further configured to allocate a first IP address to the first terminal, where the first IP address is an address in the first IP address segment corresponding to the first logical interface group; the processing module is further configured to obtain, based on the first interface address, a first fully qualified tunnel endpoint identifier F-TEID corresponding to the session; and the processing module is further configured to: generate information about a first session for the first terminal, and establish a correspondence between the information about the first logical interface group and the information about the first session, where the information about the first session includes one or more of the first IP address or the first F-TEID.

For technical effects achieved in any design manner of the sixth aspect, refer to the technical effects achieved in different design manners of the first aspect. Details are not described herein again.

According to a seventh aspect, a second user plane function network element is provided. The second user plane function network element includes a transceiver module and a processing module, where the transceiver module is configured to receive, from a network device, configuration information of a first logical interface group and information about a first internet protocol IP address segment corresponding to the first logical interface group, where the first logical interface group includes a group of interface addresses; the transceiver module is further configured to receive a seventh message, where the seventh message is used to restore, on the second user plane function network element, information about one or more sessions corresponding to the first logical interface group; the processing module is configured to: restore the configuration information of the first logical interface group and the information about the first IP address segment on the second user plane function network element based on the configuration information of the first logical interface group and the information about the first IP address segment, and advertise a routing policy for the first IP address segment, where the routing policy is used to route data to the second user plane function network element; and the processing module is further configured to restore, on the second user plane function network element based on the seventh message, the information about the one or more sessions corresponding to the first logical interface group.

In an embodiment, when the network device is a session management network element, correspondingly, that the transceiver module is configured to receive a seventh message includes: the transceiver module is configured to receive the seventh message from the session management network element, where the seventh message carries the information about the one or more sessions corresponding to the first logical interface group.

In an embodiment, when the network device is a session management network element, correspondingly, that the transceiver module is configured to receive a seventh message includes: the transceiver module is configured to receive the seventh message from the session management network element, where the seventh message carries the information about the one or more sessions corresponding to the first logical interface group; and that the transceiver module is configured to receive, from a network device, configuration information of a first logical interface group and information about a first IP address segment corresponding to the first logical interface group includes: the transceiver module is configured to: after sending a third message to the session management network element based on the seventh message, receive, from the session management network element, the configuration information of the first logical interface group and the information about the first IP address segment corresponding to the first logical interface group, where the third message is used to indicate that the information about the one or more sessions corresponding to the first logical interface group has been successfully restored on the second user plane function network element.

In an embodiment, when the network device is the service control function network element, correspondingly, that the transceiver module is configured to receive a seventh message includes: the transceiver module is configured to receive the seventh message from a session management network element, where the seventh message carries the information about the one or more sessions corresponding to the first logical interface group.

In an embodiment, when the network device is the service control function network element, correspondingly, that the transceiver module is configured to receive a seventh message includes: the transceiver module is configured to receive the seventh message from a session management network element, where the seventh message carries the information about the one or more sessions corresponding to the first logical interface group; and that the transceiver module is configured to receive, from a network device, configuration information of a first logical interface group and information about a first IP address segment corresponding to the first logical interface group includes: the transceiver module is configured to: after sending an eighth message to the session management network element based on the seventh message, receive, from the service control function network element, the configuration information of the first logical interface group and the information about the first IP address segment corresponding to the first logical interface group, where the eighth message is used to indicate that the information about the one or more sessions corresponding to the first logical interface group has been successfully restored on the second user plane function network element.

In an embodiment, the transceiver module is further configured to send one or more of a running status of the second user plane function network element, a running status of the first logical interface group on the second user plane function network element, or load information of the second user plane function network element to the session management network element, where one or more of the running status of the second user plane function network element, the running status of the first logical interface group on the second user plane function network element, or the load information of the second user plane function network element are used to determine whether the first logical interface group on the second user plane function network element needs to be migrated.

In an embodiment, the transceiver module is further configured to send one or more of a running status of the second user plane function network element, a running status of the first logical interface group on the second user plane function network element, or load information of the second user plane function network element to the network device, where one or more of the running status of the second user plane function network element, the running status of the first logical interface group on the second user plane function network element, or the load information of the second user plane function network element are used to determine whether the first logical interface group on the second user plane function network element needs to be migrated.

For technical effects achieved in any design manner of the seventh aspect, refer to the technical effects achieved in different design manners of the second aspect. Details are not described herein again.

According to an eighth aspect, a session management network element is provided. The session management network element includes a processing module and an establishment module, where the processing module is configured to determine that a session needs to be established for a first terminal; the processing module is further configured to select a first user plane function network element to serve the first terminal; the processing module is further configured to allocate a first interface address to the first terminal based on a first logical interface group on the first user plane function network element, where the first logical interface group includes a group of interface addresses; the processing module is further configured to allocate a first internet protocol IP address to the first terminal, where the first IP address is an address in a first IP address segment corresponding to the first logical interface group; the processing module is further configured to obtain, based on the first interface address, a first fully qualified tunnel endpoint identifier F-TEID corresponding to the session; the processing module is further configured to generate information about a first session for the first terminal, where the information about the first session includes one or more of the first IP address or the first F-TEID; and the establishment module is further configured to establish a correspondence between information about the first logical interface group and the information about the first session.

In an embodiment, the session management network element further includes a transceiver module, where the processing module is further configured to allocate, to the first user plane function network element, the first logical interface group and the first IP address segment corresponding to the first logical interface group; and the transceiver module is further configured to send configuration information of the first logical interface group and information about the first IP address segment to the first user plane function network element.

In an embodiment, the session management network element further includes a transceiver module, where the transceiver module is further configured to send a fifth message to a service control function network element, where the fifth message carries an identifier of the first user plane function network element, and is used to request to allocate, to the first UPF network element, a first logical interface group list and one or more IP address segments corresponding to each of one or more logical interface groups in the first logical interface group list; the transceiver module is further configured to receive, from the service control function network element, configuration information of the first logical interface group and information about the first IP address segment corresponding to the first logical interface group; and the transceiver module is further configured to send, to the first user plane function network element, the configuration information of the first logical interface group and the information about the first IP address segment corresponding to the first logical interface group.

In an embodiment, the session management network element further includes the transceiver module, where the processing module is further configured to determine that the first logical interface group needs to be migrated; the processing module is further configured to determine a second user plane function network element for the first logical interface group; the transceiver module is further configured to send, to the second user plane function network element, the configuration information of the first logical interface group and the information about the first IP address segment corresponding to the first logical interface group, to restore the configuration information of the first logical interface group and the information about the first IP address segment on the second user plane function network element; and the transceiver module is further configured to send a first message, where the first message is used to restore, on the second user plane function network element, information about one or more sessions corresponding to the first logical interface group, and the information about the one or more sessions includes the information about the first session.

For technical effects achieved in any design manner of the eighth aspect, refer to the technical effects achieved in different design manners of the third aspect. Details are not described herein again.

According to a ninth aspect, a first user plane function network element is provided. The first user plane function network element includes a processing module and a transceiver module, where the processing module is configured to obtain one or more of a running status of the first user plane function network element, a running status of the first logical interface group on the first user plane function network element, or load information of the first user plane function network element; and the transceiver module is configured to send one or more of the running status of the first user plane function network element, the running status of the first logical interface group on the first user plane function network element, or the load information of the first user plane function network element to a network device, where the first logical interface group includes a group of interface addresses, and one or more of the running status of the first user plane function network element, the running status of the first logical interface group on the first user plane function network element, or the load information of the first user plane function network element are used to determine whether the first logical interface group on the first user plane function network element needs to be migrated. Optionally, the network device may be a session management network element or a service control function network element. This is not specifically limited in this embodiment of this application. Based on this solution, the network device may determine whether the first logical interface group on a second user plane function network element needs to be migrated.

According to a tenth aspect, a network device is provided. The network device includes a processing module and a transceiver module, where the processing module is configured to determine that a first logical interface group on a first user plane function network element needs to be migrated, where the first logical interface group includes a group of interface addresses; the processing module is further configured to determine a second user plane function network element for the first logical interface group; the transceiver module is configured to send configuration information of the first logical interface group to the second user plane function network element, to restore the configuration information of the first logical interface group on the second user plane function network element; and the transceiver module is further configured to send a first message, where the first message is used to restore, on the second user plane function network element, information about one or more sessions corresponding to the first logical interface group.

For technical effects achieved in the tenth aspect, refer to the technical effects achieved in the fifth aspect. Details are not described herein again.

According to an eleventh aspect, a network device is provided. The network device has a function of implementing the method according to any one of the first aspect or the fifth aspect. The function may be implemented by hardware, or by hardware executing corresponding software. The hardware or the software includes one or more modules corresponding to the function.

According to a twelfth aspect, a network device is provided. The network device includes a processor and a memory. The memory is configured to store a computer-executable instruction. When the network device runs, the processor executes the computer-executable instruction stored in the memory, to enable the network device to perform the session management method according to any one of the first aspect or the fifth aspect.

According to a thirteenth aspect, a network device is provided. The network device includes a processor. The processor is configured to: be coupled to a memory, read an instruction in the memory, and perform, according to the instruction, the session management method according to any one of the first aspect or the fifth aspect.

According to a fourteenth aspect, a computer-readable storage medium is provided. The computer-readable storage medium stores an instruction. When the instruction is run on a computer, the computer is enabled to perform the session management method according to any one of the first aspect or the fifth aspect.

According to a fifteenth aspect, a computer program product including an instruction is provided. When the computer program product runs on a computer, the computer is enabled to perform the session management method according to any one of the first aspect or the fifth aspect.

According to a sixteenth aspect, an apparatus (for example, the apparatus may be a chip system) is provided. The apparatus includes a processor. The processor is configured to support a network device to implement a function according to the first aspect or the fifth aspect, for example, determine that a first logical interface group on a first user plane function network element needs to be migrated. In an embodiment, the apparatus further includes a memory. The memory is configured to store a program instruction and data that are necessary for the network device. When the apparatus is a chip system, the chip system may include a chip, or may include a chip and another discrete device.

For technical effects achieved in any design manner of the eleventh aspect to the sixteenth aspect, refer to the technical effects achieved in the different design manners of the first aspect or the fifth aspect. Details are not described herein again.

According to a seventeenth aspect, a second user plane function network element is provided. The second user plane function network element has a function of implementing the method according to any one of the second aspect or the possible designs of the second aspect. The function may be implemented by hardware, or by hardware executing corresponding software. The hardware or the software includes one or more modules corresponding to the function.

According to an eighteenth aspect, a second user plane function network element is provided. The second user plane function network element includes a processor and a memory. The memory is configured to store a computer-executable instruction. When the second user plane function network element runs, the processor executes the computer-executable instruction stored in the memory, to enable the second user plane function network element to perform the session management method according to any one of the second aspect or the possible designs of the second aspect.

According to a nineteenth aspect, a second user plane function network element is provided. The second user plane function network element includes a processor. The processor is configured to: be coupled to a memory, read an instruction in the memory, and perform, according to the instruction, the session management method according to any one of the second aspect or the possible designs of the second aspect.

According to a twentieth aspect, a computer-readable storage medium is provided. The computer-readable storage medium stores an instruction. When the instruction is run on a computer, the computer is enabled to perform the session management method according to any one of the second aspect or the possible designs of the second aspect.

According to a twenty-first aspect, a computer program product including an instruction is provided. When the computer program product runs on a computer, the computer is enabled to perform the session management method according to any one of the second aspect or the possible designs of the second aspect.

According to a twenty-second aspect, an apparatus (for example, the apparatus may be a chip system) is provided. The apparatus includes a processor. The processor is configured to support a second user plane function network element to implement a function according to the second aspect, for example, restore configuration information of a first logical interface group and information about a first IP address segment on the second user plane function network element based on the configuration information of the first logical interface group and the information about the first IP address segment, and advertise a routing policy for the first IP address segment. In an embodiment, the apparatus further includes a memory. The memory is configured to store a program instruction and data that are necessary for the second user plane function network element. When the apparatus is a chip system, the chip system may include a chip, or may include a chip and another discrete device.

For technical effects achieved in any design manner of the seventeenth aspect to the twenty-second aspect, refer to the technical effects achieved in the different design manners of the second aspect. Details are not described herein again.

According to a twenty-third aspect, a session management network element is provided. The session management network element has a function of implementing the method according to any one of the third aspect or the possible designs of the third aspect. The function may be implemented by hardware, or by hardware executing corresponding software. The hardware or the software includes one or more modules corresponding to the function.

According to a twenty-fourth aspect, a session management network element is provided. The session management network element includes a processor and a memory. The memory is configured to store a computer-executable instruction. When the session management network element runs, the processor executes the computer-executable instruction stored in the memory, to enable the session management network element to perform the session management method according to any one of the third aspect or the possible designs of the third aspect.

According to a twenty-fifth aspect, a session management network element is provided. The session management network element includes a processor. The processor is configured to: be coupled to a memory, read an instruction in the memory, and perform, according to the instruction, the session management method according to any one of the third aspect or the possible designs of the third aspect.

According to a twenty-sixth aspect, a computer-readable storage medium is provided. The computer-readable storage medium stores an instruction. When the instruction is run on a computer, the computer is enabled to perform the session management method according to any one of the third aspect or the possible designs of the third aspect.

According to a twenty-seventh aspect, a computer program product including an instruction is provided. When the computer program product runs on a computer, the computer is enabled to perform the session management method according to any one of the third aspect or the possible designs of the third aspect.

According to a twenty-eighth aspect, an apparatus (for example, the apparatus may be a chip system) is provided. The apparatus includes a processor. The processor is configured to support a session management network element to implement a function according to the third aspect, for example, select a first user plane function network element to serve the first terminal. In an embodiment, the apparatus further includes a memory. The memory is configured to store a program instruction and data that are necessary for the session management network element. When the apparatus is a chip system, the chip system may include a chip, or may include a chip and another discrete device.

For technical effects achieved in any design manner of the twenty-third aspect to the twenty-eighth aspect, refer to the technical effects achieved in the different design manners of the third aspect. Details are not described herein again.

According to a twenty-ninth aspect, a first user plane function network element is provided. The first user plane function network element has a function of implementing the method according to the fourth aspect. The function may be implemented by hardware, or by hardware executing corresponding software. The hardware or the software includes one or more modules corresponding to the function.

According to a thirtieth aspect, a first user plane function network element is provided. The first user plane function network element includes a processor and a memory. The memory is configured to store a computer-executable instruction. When the first user plane function network element runs, the processor executes the computer-executable instruction stored in the memory, to enable the first user plane function network element to perform the session management method according to the fourth aspect.

According to a thirty-first aspect, a first user plane function network element is provided. The first user plane function network element includes a processor. The processor is configured to: be coupled to a memory, read an instruction in the memory, and perform, according to the instruction, the session management method according to the fourth aspect.

According to a thirty-second aspect, a computer-readable storage medium is provided. The computer-readable storage medium stores an instruction. When the instruction is run on a computer, the computer is enabled to perform the session management method according to the fourth aspect.

According to a thirty-third aspect, a computer program product including an instruction is provided. When the computer program product runs on a computer, the computer is enabled to perform the session management method according to the fourth aspect.

According to a thirty-fourth aspect, an apparatus (for example, the apparatus may be a chip system) is provided. The apparatus includes a processor. The processor is configured to support a first user plane function network element to implement a function according to the fourth aspect, for example, obtain one or more of a running status of the first user plane function network element, a running status of the first logical interface group on the first user plane function network element, or load information of the first user plane function network element. In an embodiment, the apparatus further includes a memory. The memory is configured to store a program instruction and data that are necessary for the first user plane function network element. When the apparatus is a chip system, the chip system may include a chip, or may include a chip and another discrete device.

For technical effects achieved in any design manner of the twenty-ninth aspect to the thirty-fourth aspect, refer to the technical effects achieved in the different design manners of the fourth aspect. Details are not described herein again.

According to a thirty-fifth aspect, a session management system is provided. The session management system includes a network device and/or a second user plane function network element. The network device is configured to perform the steps performed by the network device according to the first aspect or the solutions provided in the embodiments of this application. The second user plane function network element is configured to perform the steps performed by the second user plane function network element according to the second aspect or the solutions provided in the embodiments of this application.

In an embodiment, when the network device is a service control function network element, the session management system may further include a session management network element. The session management network element is configured to perform the steps performed by the session management network element when the network device is the service control function network element according to the third aspect or the solutions provided in the embodiments of this application.

In an embodiment, the session management system may further include another device, for example, a first user plane function network element, that interacts with one or more of the network device or the second user plane function network element in the solutions provided in the embodiments of this application.

These aspects or other aspects in this application may be clearer and more intelligible in descriptions in the following embodiments.

DESCRIPTION OF EMBODIMENTS

The following describes the technical solutions in the embodiments of this application with reference to the accompanying drawings in the embodiments of this application. In descriptions of this application, unless otherwise specified, "/" represents an "or" relationship between associated objects. For example, A/B may represent A or B. In this application, "and/or" merely describes an association relationship between associated objects and represents that three relationships may exist. For example, A and/or B may represent the following three cases: Only A exists, both A and B exist, and only B exists, where A and B may be singular or plural. In addition, in the descriptions of this application, unless otherwise specified, "a plurality of" means two or more than two. "At least one of the following items (pieces)" or a similar expression thereof means any combination of the items, and includes any combination of one item (piece) or a plurality of items (pieces). For example, at least one (one piece) of a, b, or c may indicate: a, b, c, a-b, a-c, b-c, or a-b-c, where a, b, and c may be singular or plural. In addition, to clearly describe the technical solutions in the embodiments of this application, terms such as "first" and "second" are used in the embodiments of this application to distinguish between same items or similar items that have basically same functions and purposes. A person skilled in the art may understand that the terms such as "first" and "second" do not constitute a limitation on a quantity or an execution sequence, and that the terms such as "first" and "second" do not indicate a definite difference.

In addition, a network architecture and a service scenario described in the embodiments of this application are intended to more clearly describe the technical solutions in the embodiments of this application, and do not constitute a limitation on the technical solutions provided in the embodiments of this application. A person of ordinary skill in the art may know that: With evolution of the network architecture and emergence of new service scenarios, the technical solutions provided in the embodiments of this application are also applicable to similar technical problems.

Figure 1:
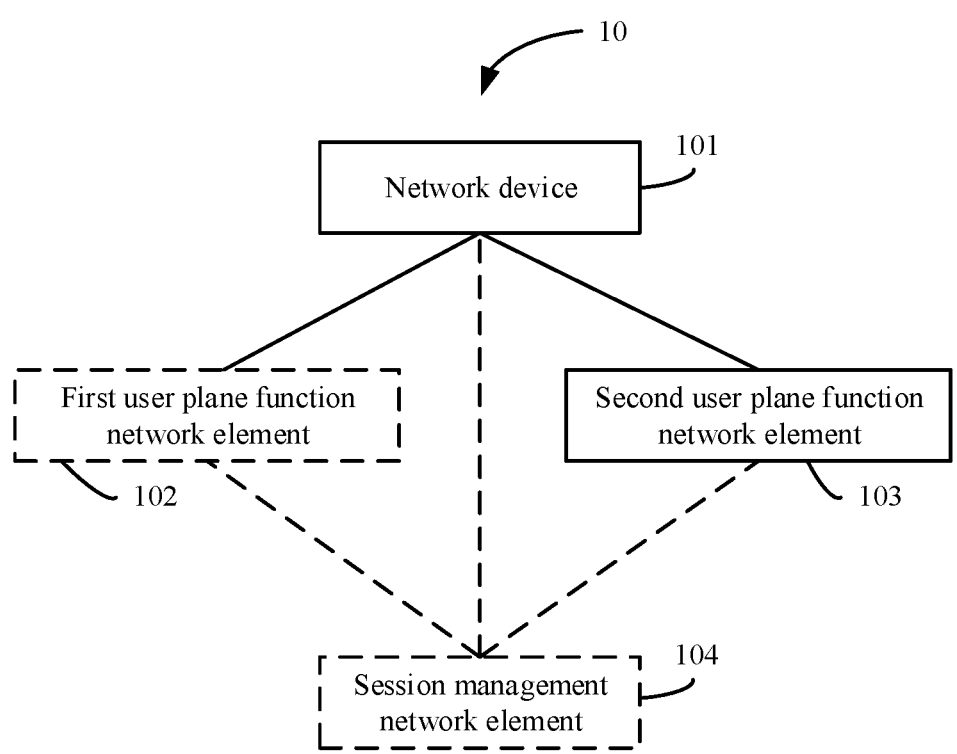
FIG. 1 is a schematic structural diagram of a session management system according to an embodiment of this application.

FIG. 1 shows a session management system 10 according to an embodiment of this application. The session management system 10 includes a network device 101 and a second user plane function network element 103. Optionally, as shown in FIG. 1, the session management system 10 may further include a first user plane function network element 102.

The network device 101 is configured to: after determining that a first logical interface group on the first user plane function network element 102 needs to be migrated, determine the second user plane function network element 103 for the first logical interface group, where the first logical interface group includes a group of interface addresses.

The network device 101 is further configured to send, to the second user plane function network element 103, configuration information of the first logical interface group and information about a first internet protocol (internet protocol, IP) address segment corresponding to the first logical interface group.

The second user plane function network element 103 is configured to: receive, from the network device 101, the configuration information of the first logical interface group and the information about the first IP address segment corresponding to the first logical interface group, restore, based on the configuration information of the first logical interface group and the information about the first IP address segment corresponding to the first logical interface group, the configuration information of the first logical interface group and the information about the first IP address segment on the second user plane function network element 103, and advertise a routing policy for the first IP address segment, where the routing policy is used to route data to the second user plane function network element 103.

The network device 101 is further configured to send a first message, where the first message is used to restore, on the second user plane function network element 103, information about one or more sessions corresponding to the first logical interface group.

The second user plane function network element 103 is further configured to receive a seventh message, where the seventh message is used to restore, on the second user plane function network element 103, the information about the one or more sessions corresponding to the first logical interface group.

The second user plane function network element 103 is further configured to restore, on the second user plane function network element 103 based on the seventh message, the information about the one or more sessions corresponding to the first logical interface group.

Optionally, in this embodiment of this application, the network device 101 may directly communicate with the first user plane function network element 102 or the second user plane function network element 103, or may communicate with the first user plane function network element 102 or the second user plane function network element 103 through forwarding by another device. This is not specifically limited in this embodiment of this application.

In the session management system provided in this embodiment of this application, after determining that the first logical interface group on the first user plane function network element needs to be migrated, the network device sends, to the second user plane function network element, the configuration information of the first logical interface group and the information about the first IP address segment corresponding to the first logical interface group, so that the configuration information of the first logical interface group and the information about the first IP address segment can be restored on the second user plane function network element; and the network device sends the first message, so that the information about the one or more sessions corresponding to the first logical interface group can be restored on the second user plane function network element. This is different from the prior art in which a user plane function network element autonomously migrates a session. This can avoid a prior-art problem caused by migration autonomously performed by the user plane function network element. For example, the session can be flexibly taken over after the user plane function network element is faulty, a complex function of managing a backup relationship between a plurality of user plane function network elements is avoided, and a large quantity of overheads caused by processing session backup messages between the UPF network elements can be avoided. In other words, session management on the user plane function network element can be implemented in a convenient manner.

Optionally, in a possible implementation, the network device 101 in this embodiment of this application may be a session management network element. In this case, the first message and the seventh message may be the same message.

That the network device 101 (the session management network element) is configured to send a first message includes: the network device 101 is configured to send the first message to the second user plane function network element 103, where the first message carries the information about the one or more sessions corresponding to the first logical interface group.

Correspondingly, that the second user plane function network element 103 is configured to receive a seventh message includes: the second user plane function network element 103 is configured to receive the seventh message (or referred to as the first message) from the network device 101, where the seventh message carries the information about the one or more sessions corresponding to the first logical interface group.

In other words, in this scenario, the configuration information of the first logical interface group, the information about the first IP address segment, and the information about the one or more sessions corresponding to the first logical interface group may all be restored by the session management network element.

Optionally, a sequence of restoring the configuration information of the first logical interface group, the information about the first IP address segment, and the information about the one or more sessions corresponding to the first logical interface group may not be limited in this embodiment of this application. For example, the configuration information of the first logical interface group and the information about the first IP address segment may be first restored, and then the information about the one or more sessions corresponding to the first logical interface group may be restored. Alternatively, the information about the one or more sessions corresponding to the first logical interface group may be first restored, and then the configuration information of the first logical interface group and the information about the first IP address segment may be restored. Alternatively, the configuration information of the first logical interface group, the information about the first IP address segment, and the information about the one or more sessions corresponding to the first logical interface group may be simultaneously restored.

Optionally, in this embodiment of this application, the information about the one or more sessions corresponding to the first logical interface group may be first restored, and then the configuration information of the first logical interface group and the information about the first IP address segment may be restored. For example, That the network device 101 is configured to send, to the second user plane function network element 103, configuration information of the first logical interface group and information about a first IP address segment corresponding to the first logical interface group includes: the network device 101 is configured to: after receiving a third message returned by the second user plane function network element 103 based on the first message, send, to the second user plane function network element 103, the configuration information of the first logical interface group and the information about the first IP address segment corresponding to the first logical interface group.

Correspondingly, that the second user plane function network element 103 is configured to receive, from the network device 101, the configuration information of the first logical interface group and the information about the first IP address segment corresponding to the first logical interface group includes: the second user plane function network element 103 is configured to: after sending the third message to the network device 101 based on the seventh message, receive, from the network device 101, the configuration information of the first logical interface group and the information about the first IP address segment corresponding to the first logical interface group.

The third message is used to indicate that the information about the one or more sessions corresponding to the first logical interface group has been successfully restored on the second user plane function network element 103.

In other words, in this embodiment of this application, to reduce service interruption during session migration and maintain service continuity, the information about the one or more sessions corresponding to the first logical interface group may be first restored, and then the configuration information of the first logical interface group and the information about the first IP address segment may be restored. This is not specifically limited in this embodiment of this application.

Optionally, in another possible implementation, the network device 101 in this embodiment of this application may be a service control function network element. Correspondingly, as shown in FIG. 1, the session management system 10 provided in this embodiment of this application may further include a session management network element 104. In this case, the first message and the seventh message are different messages, and the seventh message and the following second message are the same message.

That the network device 101 (the service control function network element) is configured to send a first message includes: the network device 101 is configured to send the first message to the session management network element 104, where the first message carries information about the first logical interface group, and is used to indicate the session management network element 104 to initiate a procedure for restoring the information about the one or more sessions corresponding to the first logical interface group.

The session management network element 104 is configured to: receive the first message, and send the second message to the second user plane function network element 103 based on the first message, where the second message carries the information about the one or more sessions corresponding to the first logical interface group.

Correspondingly, that the second user plane function network element 103 is configured to receive a seventh message includes: the second user plane function network element 103 is configured to receive the seventh message (or referred to as the second message) from the session management network element 104, where the seventh message carries the information about the one or more sessions corresponding to the first logical interface group.

In other words, in this scenario, the configuration information of the first logical interface group and the information about the first IP address segment are restored by the service control function network element, and the information about the one or more sessions corresponding to the first logical interface group is restored by the session management network element.

Optionally, a sequence of restoring the configuration information of the first logical interface group, the information about the first IP address segment, and the information about the one or more sessions corresponding to the first logical interface group may not be limited in this embodiment of this application. For example, the configuration information of the first logical interface group and the information about the first IP address segment may be first restored, and then the information about the one or more sessions corresponding to the first logical interface group may be restored. Alternatively, the information about the one or more sessions corresponding to the first logical interface group may be first restored, and then the configuration information of the first logical interface group and the information about the first IP address segment may be restored. Alternatively, the configuration information of the first logical interface group, the information about the first IP address segment, and the information about the one or more sessions corresponding to the first logical interface group may be simultaneously restored.

Optionally, in this embodiment of this application, the information about the one or more sessions corresponding to the first logical interface group may be first restored, and then the configuration information of the first logical interface group and the information about the first IP address segment may be restored. For example, That the network device 101 is configured to send, to the second user plane function network element 103, configuration information of the first logical interface group and information about a first IP address segment corresponding to the first logical interface group includes: the network device 101 is configured to: after receiving a third message returned by the session management network element 104 based on the first message, send, to the second user plane function network element 103, the configuration information of the first logical interface group and the information about the first IP address segment corresponding to the first logical interface group. The third message is used to indicate that the information about the one or more sessions corresponding to the first logical interface group has been successfully restored on the second user plane function network element 103.

Correspondingly, that the second user plane function network element 103 is configured to receive, from the network device, the configuration information of the first logical interface group and the information about the first IP address segment corresponding to the first logical interface group includes: the second user plane function network element 103 is configured to: after sending an eighth message to the session management network element based on the seventh message, receive, from the network device 101, the configuration information of the first logical interface group and the information about the first IP address segment corresponding to the first logical interface group. The eighth message is used to indicate that the information about the one or more sessions corresponding to the first logical interface group has been successfully restored on the second user plane function network element 103.

In other words, in this embodiment of this application, to reduce service interruption during session migration and maintain service continuity, the information about the one or more sessions corresponding to the first logical interface group may be first restored, and then the configuration information of the first logical interface group and the information about the first IP address segment may be restored. This is not specifically limited in this embodiment of this application.

Optionally, in this embodiment of this application, if the first IP address segment corresponding to the first logical interface group does not need to be allocated to the first user plane function network element, after determining that the first logical interface group on the first user plane function network element needs to be migrated, the network device may not send, to the second user plane function network element, the information about the first IP address segment corresponding to the first logical interface group. For example, if the first user plane function network element is not a user plane function network element, for example, an intermediate user plane function network element, that directly communicates with or interfaces with a data network, the first IP address segment corresponding to the first logical interface group may not need to be allocated to the first user plane function network element. Further, after determining that the first logical interface group on the first user plane function network element needs to be migrated, the network device may not send, to the second user plane function network element, the information about the first IP address segment corresponding to the first logical interface group. A general description is provided herein, and details are not described below.

Optionally, the session management system 10 shown in FIG. 1 may be applied to a current 4.5G network in which a user plane is separate from a control plane, or may be applied to a current 5G network and another future network. This is not specifically limited in this embodiment of this application.

Figure 2:
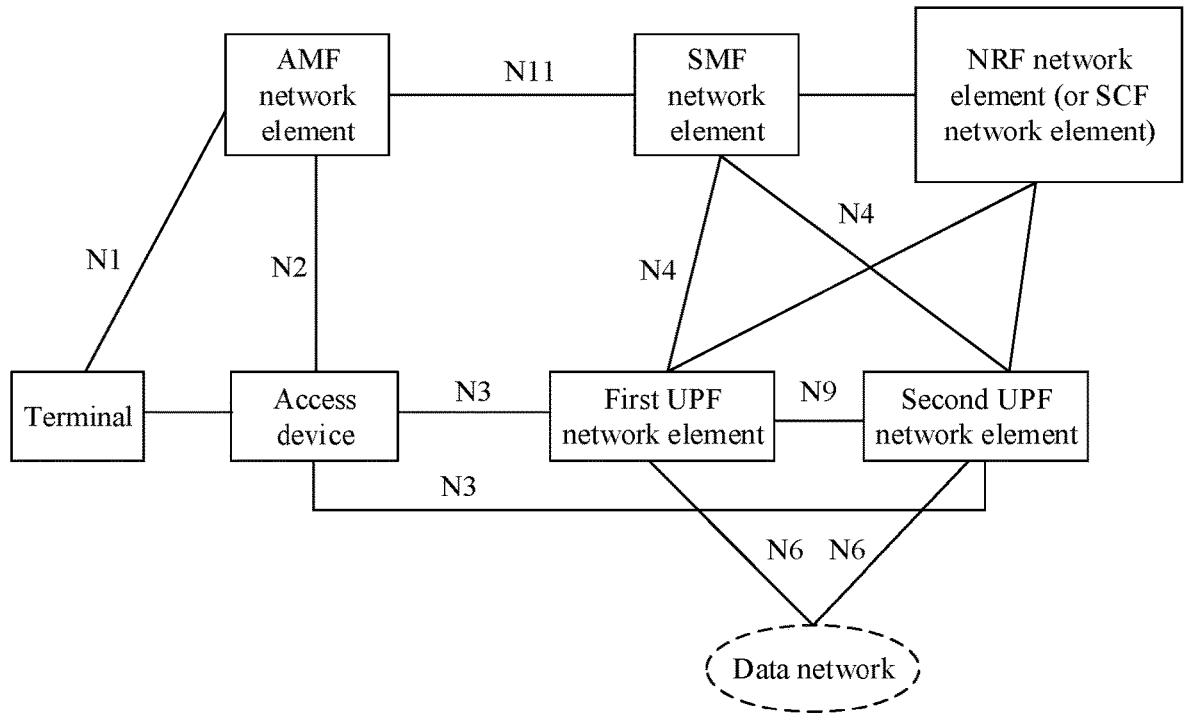
FIG. 2 is a schematic diagram of a 5G network architecture according to an embodiment of this application.

For example, it is assumed that the session management system 10 shown in FIG. 1 is applied to a current 5G network. As shown in FIG. 2, a network element or an entity corresponding to the session management network element may be an SMF network element in the 5G network, a network element or an entity corresponding to the first user plane function network element may be a first UPF network element in the 5G network, a network element or an entity corresponding to the second user plane function network element may be a second UPF network element in the 5G network, and a network element or an entity corresponding to the service control function network element may be a network repository function (NRF) network element in the 5G network.

In addition, as shown in FIG. 2, the 5G network may further include an access device, an access and mobility management function (access and mobility management function, AMF) network element, and the like. This is not specifically limited in this embodiment of this application.

A terminal accesses a network through the access device, and the terminal communicates with the AMF network element through a next generation (N) interface 1 (N1 for short). The access device communicates with the AMF network element through an N2 interface (N2 for short), and communicates with the first UPF network element or the second UPF network element through an N3 interface (N3 for short). The AMF network element communicates with the SMF network element through an N11 interface (N11 for short). The SMF network element communicates with the first UPF network element or the second UPF network element through an N4 interface (N4 for short). The first UPF network element communicates with the second UPF network element through an N9 interface (N9 for short). The first UPF network element or the second UPF network element accesses a data network through an N6 interface (N6 for short). In addition, the NRF network element may further separately communicate with the SMF network element, the first UPF network element, or the second UPF network element.

It should be noted that, names of the interfaces between the network elements in FIG. 2 are merely examples, and the interfaces may have other names in a specific implementation. This is not specifically limited in this embodiment of this application.

It should be noted that the access device, the SMF network element, the AMF network element, the first UPF network element, the second UPF network element, the NRF network element, or the like in FIG. 2 is merely a name, and the name constitutes no limitation on the device. In the 5G network and another future network, a network element or an entity corresponding to the access device, the SMF network element, the AMF network element, the first UPF network element, the second UPF network element, the NRF network element, or the like may have another name. This is not specifically limited in this embodiment of this application. For example, the first UPF network element may alternatively be replaced with a first UPF or a first UPF entity. A general description is provided herein, and details are not described below.

It should be noted that FIG. 2 shows, as an example, only one SMF network element. Certainly, there may be a plurality of SMF network elements in the 5G network. This is not specifically limited in this embodiment of this application. For a manner of connecting each SMF network element to another network element in the 5G network, refer to a manner of connecting the SMF network element to another network element in the 5G network in FIG. 2. Details are not described herein.

It should be noted that FIG. 2 merely shows, as an example, two UPF network elements managed by one SMF network element. Certainly, one SMF network element may alternatively manage more than two UPF network elements. This is not specifically limited in this embodiment of this application. For a manner of connecting each UPF network element to another network element in the 5G network, refer to a manner of connecting the first UPF network element or the second UPF network element to another network element in the 5G network in FIG. 2. Details are not described herein.

In addition, it should be noted that control plane network elements such as the AMF network element, the SMF network element, and the NRF network element in the 5G network shown in FIG. 5 may alternatively interact with each other through a service-based interface. For example, a service-based interface externally provided by the AMF network element may be Namf, a service-based interface externally provided by the SMF network element may be Nsmf, and a service-based interface externally provided by the NRF network element may be Nnrf. For related descriptions, refer to a diagram of a 5G system architecture (5G system architecture) in the standard TS 23.501. Details are not described herein.

Figure 3:
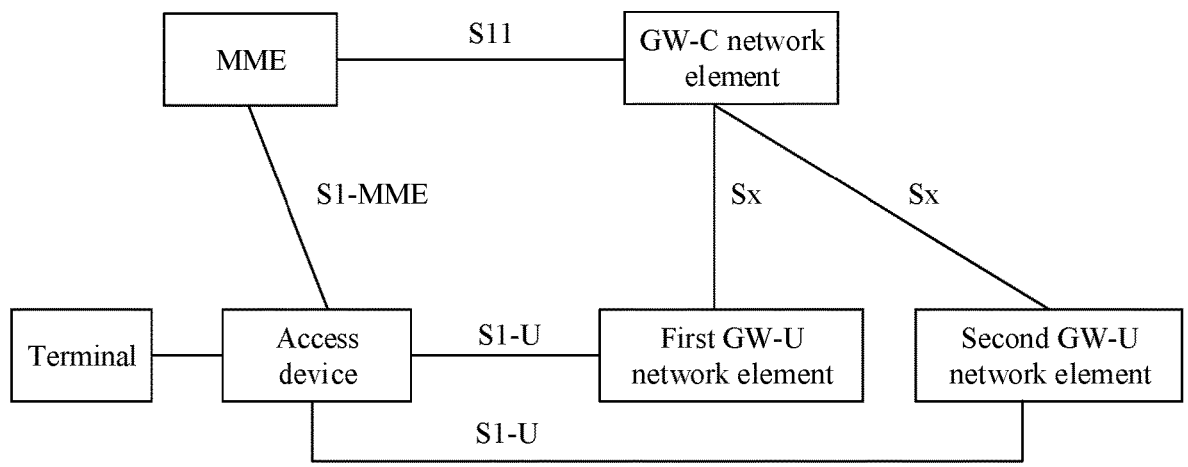
FIG. 3 is a schematic diagram of a 4.5G network architecture according to an embodiment of this application.

For example, it is assumed that the session migration system 10 shown in FIG. 1 is applied to a current 4.5G network in which a user plane is separate from a control plane. As shown in FIG. 3, a network element or an entity corresponding to the session management network element may be a gateway control plane function (GW-C) network element in the 4.5G network, a network element or an entity corresponding to the first user plane function network element may be a first gateway user plane function (GW-U) network element in the 4.5G network, and a network element or an entity corresponding to the second user plane function network element may be a second GW-U network element in the 4.5G network.

In addition, as shown in FIG. 3, the 4.5G network may further include an access device, a mobility management entity (MME), or the like. A GW may include a serving gateway (SGW), a packet data network (PDN) gateway (PGW), or the like. For details, refer to an existing 4.5G network architecture. Details are not described in this embodiment of this application.

The access device communicates with the first GW-U network element or the second GW-U network element through an S1-U interface, and the access device communicates with the MME through an S1-MME interface. The MME communicates with the GW-C network element through an S11 interface. The GW-C network element communicates with the first GW-U network element or the second GW-U network element through an Sx interface.

It should be noted that FIG. 3 shows, as an example, only one GW-C network element. Certainly, there may be a plurality of GW-C network elements in the 4.5G network. This is not specifically limited in this embodiment of this application. For a manner of connecting each GW-C network element to another network element in the 4.5G network, refer to a manner of connecting the GW-C network element to another network element in the 4.5G network in FIG. 3. Details are not described herein.

It should be noted that FIG. 3 merely shows, as an example, two GW-U network elements managed by one GW-C network element. Certainly, one GW-C network element may alternatively manage more than two GW-U network elements. This is not specifically limited in this embodiment of this application. For a manner of connecting each GW-U network element to another network element in the 4.5G network, refer to a manner of connecting the first GW-U network element or the second GW-U network element to another network element in the 4.5G network in FIG. 3. Details are not described herein.

Optionally, in this embodiment of this application, a network element or an entity corresponding to a service control function network element may be the NRF network element in the 5G network, or may be a customized network element that implements control and collaboration between a plurality of network elements such as a session management network element and a user plane function network element. For example, a service control function (SCF network element may cooperate with the 5G network to perform an operation, or may cooperate with the 4.5G network to perform an operation, or may cooperate with another future network to perform an operation. This is not specifically limited in this embodiment of this application.

Optionally, the terminal in this embodiment of this application may include various handheld devices, vehicle-mounted devices, wearable devices, or computing devices that have a wireless communication function, or another processing device connected to a wireless modem. The terminal may further include a subscriber unit, a cellular phone, a smart phone, a wireless data card, a personal digital assistant (PDA) computer, a tablet computer, a wireless modem, a handheld device, a laptop computer, a cordless phone or a wireless local loop (WLL) station, a machine type communication (MTC) terminal, user equipment (UE), a mobile station (MS), a terminal device, relay user equipment, or the like. The relay user equipment may be, for example, a 5G residential gateway (RG). For ease of description, the devices mentioned above are collectively referred to as a terminal in this application.

Optionally, the access device in this embodiment of this application is a device that accesses a core network. For example, the access device may be a base station, a broadband network gateway (BNG), an aggregation switch, or a non-3rd generation partnership project (3GPP) access device. The base station may include base stations in various forms such as a macro base station, a micro base station (also referred to as a small cell), a relay station, and an access point.

Optionally, in this embodiment of this application, the network device, the first user plane function network element, the second user plane function network element, or the session management network element in FIG. 1 may be implemented by one device, or may be jointly implemented by a plurality of devices, or may be a functional module in one device. This is not specifically limited in this embodiment of this application. It may be understood that the foregoing function may be a network element in a hardware device, or may be a software function running on dedicated hardware, or may be a virtualization function instantiated on a platform (for example, a cloud platform).

Figure 4:
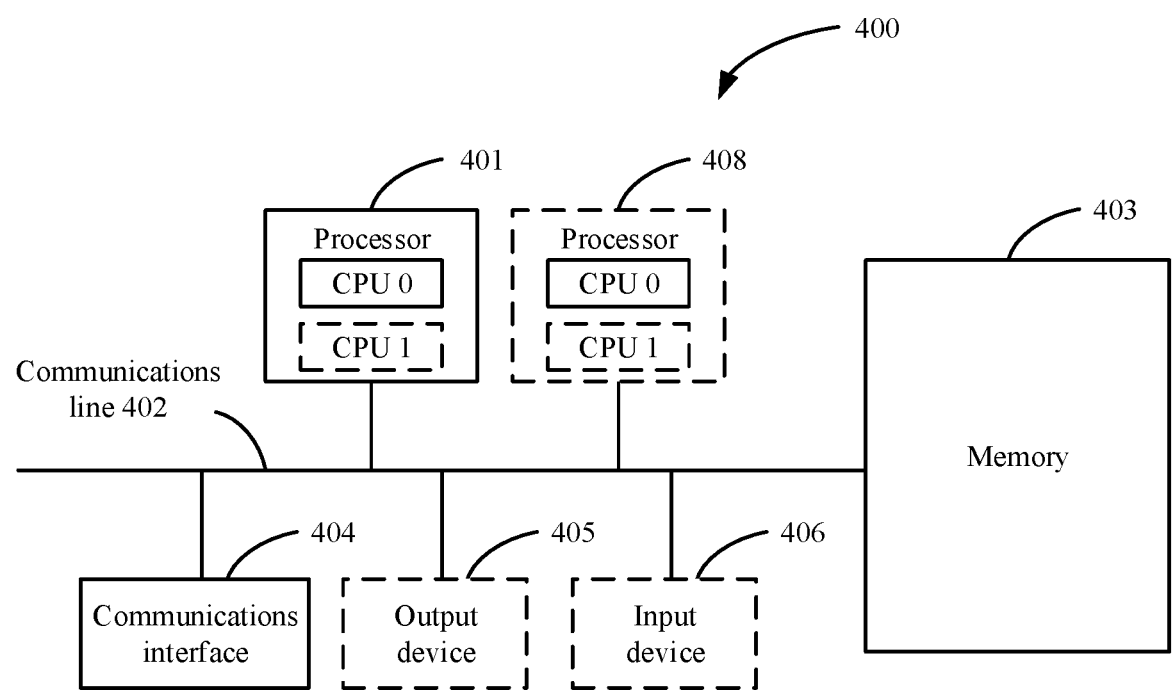
FIG. 4 is a schematic structural diagram of a communications device according to an embodiment of this application.

For example, in this embodiment of this application, the network device, the first user plane function network element, the second user plane function network element, or the second user plane function network element in FIG. 1 may be implemented by a communications device in FIG. 4. FIG. 4 is a schematic diagram of a hardware structure of a communications device according to an embodiment of this application. The communications device 400 includes a processor 401, a communications line 402, and one or more communications interfaces 404. Optionally, as shown in FIG. 4, the communications device 400 may further include a memory 403.

The processor 401 may be a general-purpose central processing unit (CPU), a microprocessor, an application-specific integrated circuit (ASIC), or one or more integrated circuits configured to control execution of a program in the solutions of this application.

The communications line 402 may include a channel for transmitting information between the foregoing components.

The communications interface 404 is configured to communicate with another device or a communications network such as the Ethernet, a radio access network (RAN), or a wireless local area network (WLAN) through any apparatus such as a transceiver.

The memory 403 may be a read-only memory (ROM) or another type of static storage device that can store static information and an instruction, or a random access memory (RAM) or another type of dynamic storage device that can store information and an instruction. The memory 403 may alternatively be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that is accessible by a computer, but is not limited thereto. The memory 403 may exist independently and is connected to the processor 401 through the communications line 402. The memory 403 may alternatively be integrated with the processor 401.

The memory 403 is configured to store a computer-executable instruction for performing the solutions in this application, and the processor 401 controls execution of the computer-executable instruction. The processor 401 is configured to execute the computer-executable instruction stored in the memory 403, to implement a session management method provided in the following embodiments of this application.

Optionally, in this embodiment of this application, the computer-executable instruction may also be referred to as application program code. This is not specifically limited in this embodiment of this application.

In a specific implementation, in an embodiment, the processor 401 may include one or more CPUs, for example, a CPU 0 and a CPU 1 in FIG. 4.

In a specific implementation, in an embodiment, the communications device 400 may include a plurality of processors, for example, the processor 401 and a processor 408 in FIG. 4. Each of the processors may be a single-core (single-CPU) processor, or may be a multi-core (multi-CPU) processor. The processor herein may be one or more devices, circuits, and/or processing cores configured to process data (for example, a computer program instruction).

In a specific implementation, in an embodiment, the communications device 400 may further include an output device 405 and an input device 406. The output device 405 communicates with the processor 401, and may display information in a plurality of manners. For example, the output device 405 may be a liquid crystal display (LCD), a light emitting diode (LED) display device, a cathode ray tube (CRT) display device, or a projector. The input device 406 communicates with the processor 401, and may receive an input of a user in a plurality of manners. For example, the input device 406 may be a mouse, a keyboard, a touchscreen device, or a sensor device.

The communications device 400 may be a general-purpose device or a dedicated device. In a specific implementation, the communications device 400 may be a desktop computer, a portable computer, a network server, a personal digital assistant (PDA), a mobile phone, a tablet computer, a wireless terminal device, an embedded device, or a device with a structure similar to that in FIG. 4. A type of the communications device 400 is not limited in this embodiment of this application.

The following specifically describes, with reference to FIG. 1 to FIG. 4, a session management method provided in the embodiments of this application.

It should be noted that, in the following embodiments of this application, names of messages or names of parameters in messages between network elements are merely examples, and the messages or the parameters may have other names in a specific implementation. This is not specifically limited in the embodiments of this application.

Figure 5A:
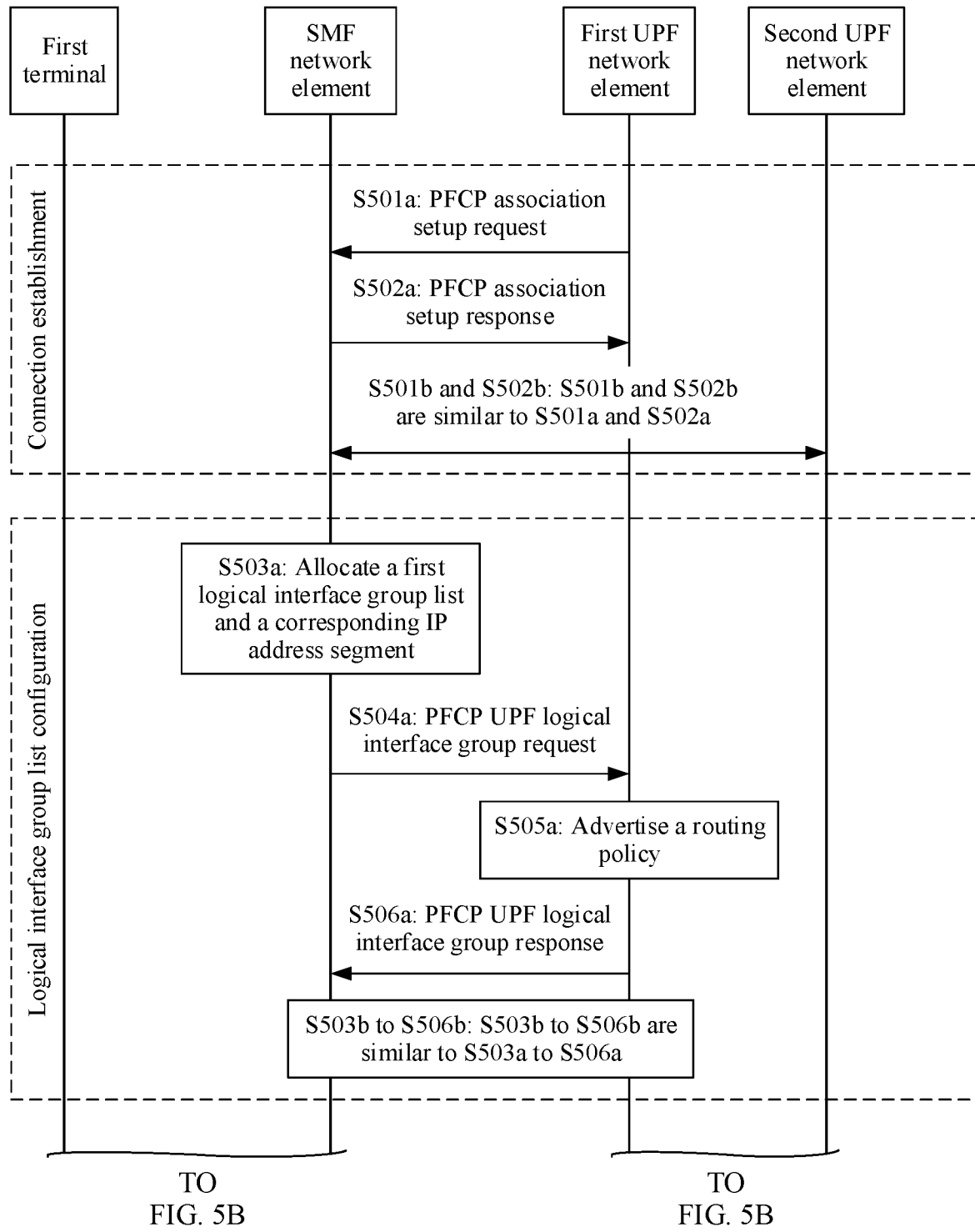
FIG. 5A, FIG. 5B, and FIG. 5C are a schematic flowchart 1 of a session management method according to an embodiment of this application.
Figure 5B:
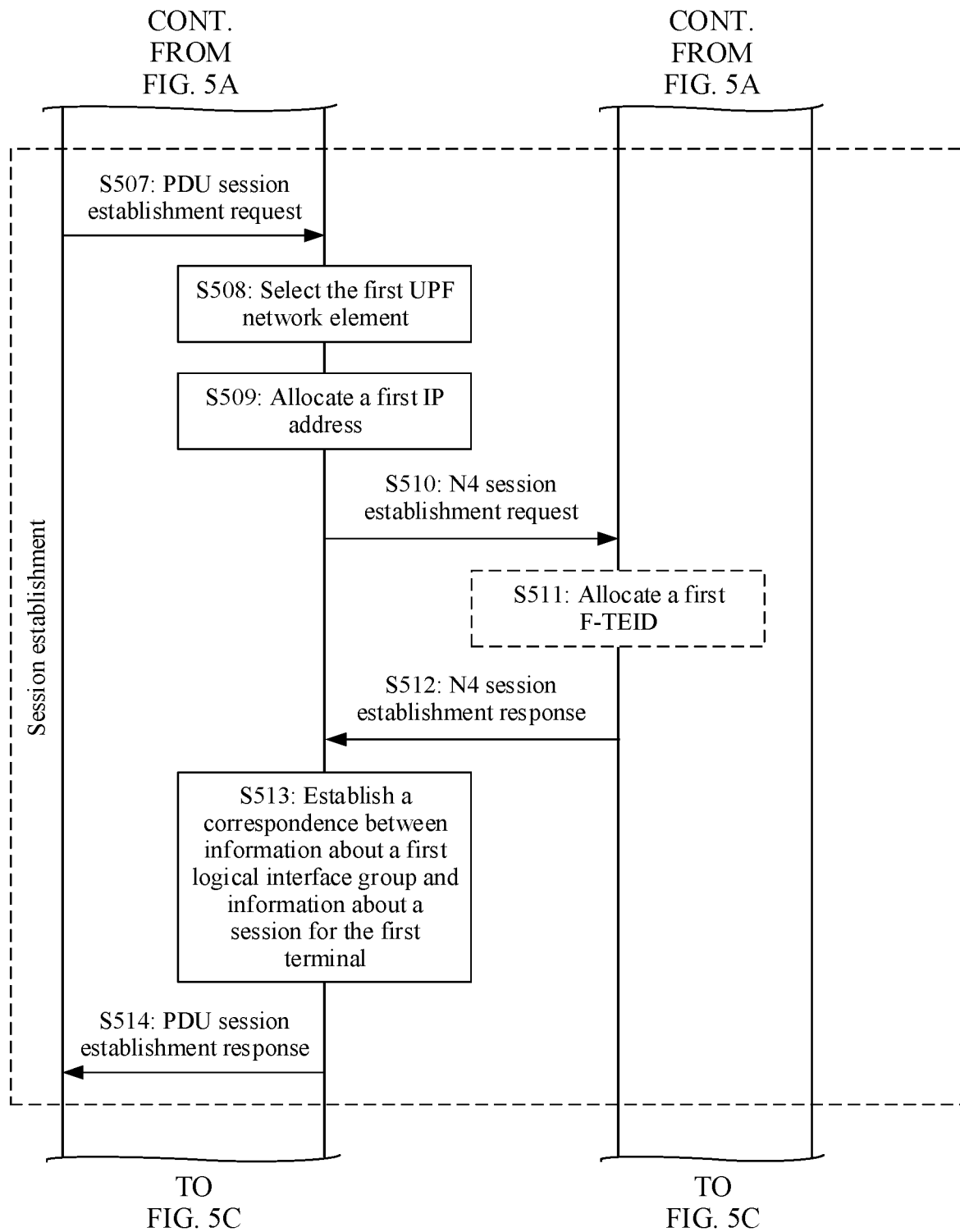
Figure 5C:
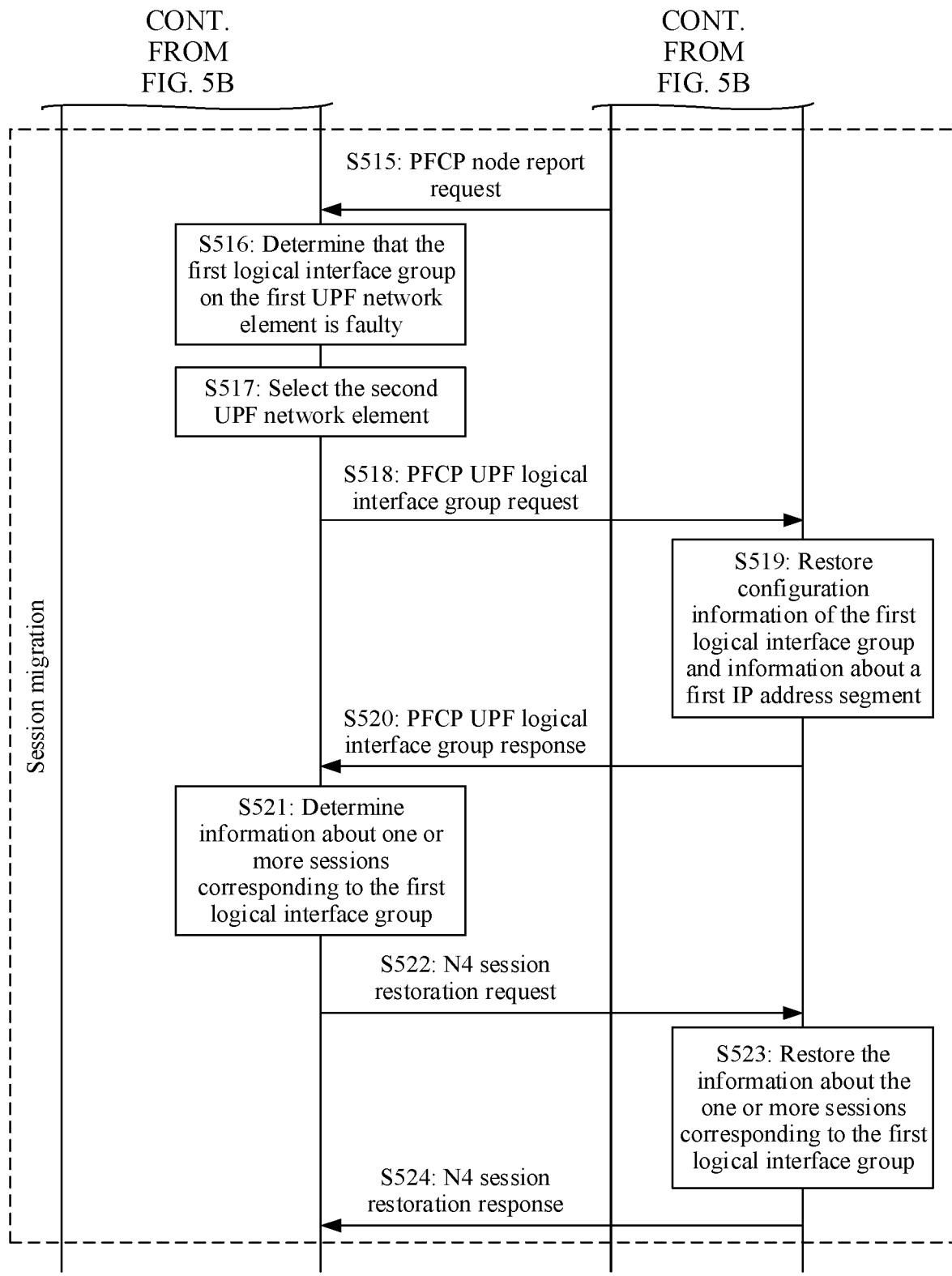

First, in an example, the session management system shown in FIG. 1 is applied to the 5G network shown in FIG. 2, the network device is an SMF network element, and a session migration scenario is a fault scenario. FIG. 5A, FIG. 5B, and FIG. 5C show a session management method according to an embodiment of this application. The session management method includes the following steps.

Optionally, the session management method provided in this embodiment of this application may include the following one or more connection establishment procedures:

S501*a*: A first UPF network element sends a first request message to the SMF network element that manages the first UPF network element, so that the SMF network element receives the first request message from the first UPF network element.

For example, as shown in FIG. 5A, FIG. 5B, and FIG. 5C, the first request message in this embodiment of this application may be, for example, a packet forwarding control protocol (PFCP) association setup request. This is not specifically limited in this embodiment of this application.

S502*a*: The SMF network element sends a first response message to the first UPF network element, so that the first UPF network element receives the first response message from the SMF network element.

For example, as shown in FIG. 5A, FIG. 5B, and FIG. 5C, the first response message in this embodiment of this application may be, for example, a PFCP association setup response. This is not specifically limited in this embodiment of this application.

For specific implementations of step S501*a* and step S502*a*, refer to an existing N4 interface link establishment procedure. Details are not described herein.

Optionally, in this embodiment of this application, that the first UPF network element initiates an N4 interface link establishment procedure is used as an example for description. Certainly, the N4 interface link establishment procedure may alternatively be initiated by the SMF network element. This is not specifically limited in this embodiment of this application.

S501*b* and S502*b*: Steps S501*b* and S502*b* may be similar to steps S501*a* and S502*a*. A difference is as follows: The first UPF network element in steps S501*a* and S502*a* is replaced with a second UPF network element. For related descriptions, refer to descriptions in steps S501*a* and S502*a*. Details are not described herein again.

Steps S501*a* and S502*a* provide a specific implementation in which the first UPF network element establishes, after an instance is deployed for the first UPF network element, an N4 interface link with the SMF network element that manages the first UPF network element. Steps S501*b* and S502*b* provide a specific implementation in which the second UPF network element establishes, after an instance is deployed for the second UPF network element, an N4 interface link with an SMF network element that manages the second UPF network element. All these steps in the session management method provided in this embodiment of this application are optional steps. A general description is provided herein, and details are not described below.

It should be noted that, in this embodiment of this application, that the SMF network element that manages the first UPF network element is the same as the SMF network element that manages the second UPF network element is used as an example for description. Certainly, if a third UPF network element exists, an SMF network element that manages the third UPF network element may be the same as or different from the SMF network element that manages the first UPF network element or the second UPF network element. This is not specifically limited in this embodiment of this application.

It should be noted that steps S501a and S502a and steps S501b and S502b are not subject to a specific sequence in this embodiment of this application. Steps S501a and S502a may be performed before steps S501b and S502b. Alternatively, steps S501b and S502b may be performed before steps S501a and S502a. Alternatively, steps S501a and S502a and steps S501b and S502b may be simultaneously performed. This is not specifically limited in this embodiment of this application.

Optionally, the session management method provided in this embodiment of this application may further include the following one or more logical interface group list configuration procedures:

S503a: The SMF network element allocates, to the first UPF network element, a first logical interface group list and one or more IP address segments corresponding to each of one or more logical interface groups in the first logical interface group list.

Optionally, in this embodiment of this application, the SMF network element may allocate the first logical interface group list from a logical interface group resource pool to the first UPF network element. The first logical interface group list includes the one or more logical interface groups.

Optionally, in this embodiment of this application, the logical interface group may include a group of interface addresses. The group of interface addresses may include one or more interface addresses that correspond to the first UPF network element and that are for another network element (which may also be referred to as interface addresses between the first UPF network element and another network element), and are used for one or more sessions in a subsequent procedure. This is not specifically limited in this embodiment of this application.

For example, the group of interface addresses may include, for example, one or more of an N3 address for an access device (which is an N3 address for short below for ease of description), an N6 address for a data network (which is an N6 address for short below for ease of description), or an N9 address for another UPF network element (which is an N9 addresses for short below for ease of description). This is not specifically limited in this embodiment of this application. For example, the group of interface addresses may include one or more N3 addresses. Alternatively, the group of interface addresses may include one or more N6 addresses. Alternatively, the group of interface addresses may include one or more N9 addresses. Alternatively, the group of interface addresses may include one or more N3 addresses and one or more N6 addresses. Alternatively, the group of interface addresses may include one or more N3 addresses and one or more N9 addresses. Alternatively, the group of interface addresses may include one or more N6 addresses and one or more N9 addresses. Alternatively, the group of interface addresses may include one or more N3 addresses, one or more N6 addresses, and one or more N9 addresses.

For example, the group of interface addresses may be configured to be fixed. This is not specifically limited in this embodiment of this application.

Optionally, in this embodiment of this application, a logical interface group may correspond to one or more IP address segments.

Optionally, in this embodiment of this application, an IP address segment may include one or more IP addresses, for example, an IP address 1 and an IP address 2. An IP address in a first IP address segment corresponding to a first logical interface group in the first logical interface group list may be allocated to a first terminal in a subsequent process of establishing a session for the first terminal. The first terminal is any terminal in one or more terminals for which the session is bound to the first logical interface group. This is not specifically limited in this embodiment of this application.

S504a: The SMF network element sends a second request message to the first UPF network element, so that the first UPF network element receives the second request message from the SMF network element.

The second request message carries configuration information of the first logical interface group list that is allocated by the SMF network element to the first UPF network element and information about the one or more IP address segments corresponding to each of the one or more logical interface groups in the first logical interface group list.

For example, as shown in FIG. 5A, FIG. 5B, and FIG. 5C, the second request message in this embodiment of this application may be, for example, a PFCP UPF logical interface group request (PFCP UPF logic interface dispatch request). This is not specifically limited in this embodiment of this application.

Optionally, in this embodiment of this application, the configuration information of the first logical interface group list may include configuration information of the one or more logical interface groups.

Optionally, in this embodiment of this application, configuration information of a logical interface group may include a group of interface addresses and an identifier of the corresponding logical interface group. An identifier of a logical interface group is used to identify the logical interface group. For example, the identifier of the logical interface group may be any interface address in the logical interface group, for example, an N3 address. Certainly, the identifier of the logical interface group may alternatively be another identifier. This is not specifically limited in this embodiment of this application.

Optionally, in this embodiment of this application, the information about the one or more IP address segments corresponding to each of the one or more logical interface groups in the first logical interface group list may include an IP address segment and an identifier of a corresponding logical interface group. For related descriptions of the identifier of the logical interface group, refer to the foregoing descriptions. Details are not described herein again.

For example, in this embodiment of this application, as shown in Table 1, the configuration information of the first logical interface group list that is allocated by the SMF network element to the first UPF network element and the information about the one or more IP address segments corresponding to each of the one or more logical interface groups in the first logical interface group list may include: an identifier of a logical interface group, a group of interface addresses in the logical interface group, and an IP address segment corresponding to the logical interface group, where the configuration information and the information about the one or more IP address segments are carried in the PFCP UPF logical interface group request.

TABLE 1

| Identifier of a logical interface group | A group of interface addresses | IP address segment |
|---|---|---|
| Identifier 1 | N3 address 1, N9 address 1, . . . | IP address segment 1 |
| Identifier 2 | N3 address 2, N9 address 2, . . . | IP address segment 2 |
| Identifier 3 | N3 address 3, N9 address 3, . . . | IP address segment 3, IP address segment 4, . . . |
| . . . | . . . | . . . |

It should be noted that, in this embodiment of this application, descriptions are provided by using an example in which the SMF network element sends, to the first UPF network element, both the configuration information of the first logical interface group list that is allocated by the SMF network element to the first UPF network element and the information about the one or more IP address segments corresponding to each of the one or more logical interface groups in the first logical interface group list. Certainly, the SMF network element may alternatively send, to the first UPF network element respectively through two messages, the configuration information of the first logical interface group list and the information about the one or more IP address segments corresponding to each of the one or more logical interface groups in the first logical interface group list. For example, the SMF network element sends, through a PFCP association setup request, the configuration information of the first logical interface group list shown in Table 2, and sends, through a PFCP association update request (PFCP association update request), the information, shown in Table 3, about the one or more IP address segments corresponding to each of the one or more logical interface groups in the first logical interface group list. This is not specifically limited in this embodiment of this application.

TABLE 2

| Identifier of a logical interface group | A group of interface addresses |
|---|---|
| Identifier 1 | N3 address 1, N9 address 1, . . . |
| Identifier 2 | N3 address 2, N9 address 2, . . . |
| Identifier 3 | N3 address 3, N9 address 3, . . . |
| . . . | . . . |

TABLE 3

| Identifier of a logical interface group | IP address segment |
|---|---|
| Identifier 1 | IP address segment 1 |
| Identifier 2 | IP address segment 2 |
| Identifier 3 | IP address segment 3, IP address segment 4, . . . |
| . . . | . . . |

It should be noted that Table 1 merely provides an example of a manner of representing the configuration information of the first logical interface group list and the information about the one or more IP address segments corresponding to each of the one or more logical interface groups in the first logical interface group list, Table 2 merely provides an example of a manner of representing the configuration information of the first logical interface group list, and Table 3 merely provides an example of a manner of representing the information about the one or more IP address segments corresponding to each of the one or more logical interface groups in the first logical interface group list. Certainly, in this embodiment of this application, the configuration information of the first logical interface group list and the information about the one or more IP address segments corresponding to each of the one or more logical interface groups in the first logical interface group list may alternatively be represented in another form. This is not specifically limited in this embodiment of this application.

Optionally, in this embodiment of this application, an IP address segment corresponding to a first logical interface group in the first logical interface group list may be dynamically configured by the SMF network element for the first UPF network element. In other words, after the SMF network element allocates a corresponding IP address segment, for example, an IP address segment 1, for the first logical interface group, and sends information about the IP address segment B to the first UPF network element, if the IP address segment 1 is used up, the SMF network element may further allocate a new IP address segment, for example, an IP address segment 5, for the first logical interface group, and send, to the first UPF network element, information about the IP address segment 5 corresponding to the first logical interface group. The first logical interface group may be any logical interface group in the first logical interface group list. This is not specifically limited in this embodiment of this application. For example, information about the IP address segment corresponding to the first logical interface group may be updated through a PFCP association update request. This is not specifically limited in this embodiment of this application.

It should be noted that, in this embodiment of this application, that an IP address in an IP address segment corresponding to a logical interface group is used up may mean that a quantity of available IP addresses in the IP address segment is 0, or a quantity of available IP addresses in the IP address segment or a proportion of available IP address relative to the IP address segment is less than a preset value. This is not specifically limited in this embodiment of this application.

Optionally, in this embodiment of this application, the SMF network element may alternatively send, through an extended PFCP association setup request or an extended PFCP association update request, the configuration information of the first logical interface group list that is allocated by the SMF network element to the first UPF network element and the information about the one or more IP address segments corresponding to each of the one or more logical interface groups in the first logical interface group list. This is not specifically limited in this embodiment of this application.

S505a: The first UPF network element respectively advertises a routing policy for the one or more IP address segments corresponding to each of the one or more logical interface groups in the first logical interface group list, where the routing policy is used to route data to the first UPF network element.

For example, assuming that the first logical interface group list includes a first logical interface group, that the first UPF network element advertises a routing policy for a first IP address segment corresponding to the first logical interface group is specifically that the first UPF network element advertises, to a corresponding data network according to a routing protocol, a routing policy corresponding to a destination address that is an address related to the first logical interface group. Further, a network element or a device in the data network may route downlink data or uplink data to the first UPF network element according to the routing policy. A general description is provided herein, and details are not described below.

For example, in this embodiment of this application, the address related to the first logical interface group may include, for example, an interface address in the first logical interface group, such as an N3 address or an N9 address. The N3 address corresponds to uplink data, and the N9 address may correspond to uplink data or may correspond to downlink data. This is not specifically limited in this embodiment of this application.

S506a: The first UPF network element sends a second response message to the SMF network element, so that the SMF network element receives the second response message from the first UPF network element.

The second response message is used to acknowledge that the first logical interface group list is successfully configured and the information about the one or more IP address segments corresponding to each of the one or more logical interface groups in the first logical interface group list is successfully sent.

For example, as shown in FIG. 5A, FIG. 5B, and FIG. 5C, the second response message in this embodiment of this application may be, for example, a PFCF UPF logical interface group response (PFCP UPF Logic Interface Dispatch Response). This is not specifically limited in this embodiment of this application.

Certainly, in this embodiment of this application, if the SMF network element sends, to the first UPF network element respectively through two messages, the configuration information of the first logical interface group list and the information about the one or more IP address segments corresponding to each of the one or more logical interface groups in the first logical interface group list, two messages may be used to respectively acknowledge that the first logical interface group list is successfully configured and the information about the one or more IP address segments corresponding to each of the one or more logical interface groups in the first logical interface group list is successfully sent. This is not specifically limited in this embodiment of this application.

Optionally, when the first logical interface group list includes a plurality of logical interface groups, the SMF network element may alternatively send configuration information of one or more logical interface groups in the first logical interface group list to the first UPF network element respectively through different messages. For example, the SMF network element sends configuration information of a first logical interface group in the first logical interface group list to the first UPF network element through a message 1, and sends configuration information of a second logical interface group in the first logical interface group list to the first UPF network element through a message 2. In other words, the SMF network element may separately, namely, for a plurality of times, configure configuration information of the plurality of logical interface groups in the first logical interface group list for the first UPF network element. This is not specifically limited in this embodiment of this application.

Similarly, optionally, when the first logical interface group list includes a plurality of logical interface groups, the SMF network element may alternatively send, to the first UPF network element respectively through different messages, the information about the one or more IP address segments corresponding to each of the one or more logical interface groups in the first logical interface group list. For example, the SMF network element sends, to the first UPF network element through a message 3, information about a first IP address segment corresponding to a first logical interface group in the first logical interface group list, and sends, to the first UPF network element through a message 4, information about a second IP address segment corresponding to a second logical interface group in the first logical interface group list. In other words, the SMF network element may separately, namely, for a plurality of times, send, to the first UPF network element, information about IP address segments corresponding to each of the plurality of logical interface groups in the first logical interface group list. This is not specifically limited in this embodiment of this application.

Certainly, optionally, when the first logical interface group list includes a plurality of logical interface groups, the SMF network element may alternatively send, to the first UPF network element respectively through different messages, configuration information of the one or more logical interface groups in the first logical interface group list and the information about the one or more IP address segments corresponding to each of the one or more logical interface groups. For example, the SMF network element sends, to the first UPF network element through a message 5, configuration information of a first logical interface group in the first logical interface group list and information about a first IP address segment corresponding to the first logical interface group, and sends, to the first UPF network element through a message 6, configuration information of a second logical interface group in the first logical interface group list and information about a second IP address segment corresponding to the second logical interface group. In other words, the SMF network element may send, to the first UPF network element respectively through a plurality of messages, the configuration information of the one or more logical interface groups in the first logical interface group list and the information about the one or more IP address segments corresponding to each of the one or more logical interface groups. This is not specifically limited in this embodiment of this application.

Optionally, in this embodiment of this application, if the SMF network element sends, through an extended PFCP association setup request, the configuration information of the first logical interface group list that is allocated by the SMF network element to the first UPF network element and the information about the one or more IP address segments corresponding to each of the one or more logical interface groups in the first logical interface group list, an extended PFCP association setup response may be used to acknowledge that the first logical interface group list is successfully configured and the information about the one or more IP address segments corresponding to each of the one or more logical interface groups in the first logical interface group list is successfully sent. If the SMF network element sends, through an extended PFCP association update request, the configuration information of the first logical interface group list that is allocated by the SMF network element to the first UPF network element and the information about the one or more IP address segments corresponding to each of the one or more logical interface groups in the first logical interface group list, an extended PFCP association update response may be used to acknowledge that the first logical interface group list is successfully configured and the information about the one or more IP address segments corresponding to each of the one or more logical interface groups in the first logical interface group list is successfully sent. This is not specifically limited in this embodiment of this application.

S503b to S506b: Steps S503b to S506b are similar to steps S503a to S506a. A difference is as follows: The first UPF network element in steps S503a to S506a is replaced with a second UPF network element, and the first logical interface group list in steps S503a to S506a is replaced with a second logical interface group list. For related descriptions, refer to descriptions in steps S503a to S506a. Details are not described herein again.

Steps S503a to S506a provide specific implementations in which the SMF network element configures the first logical interface group list for the first UPF network element and the first UPF network element obtains the information about the one or more IP address segments corresponding to each of the one or more logical interface groups in the first logical interface group list. Steps S503b to S506b provide specific implementations in which the SMF network element configures the second logical interface group list for the second UPF network element and the first UPF network element obtains information about one or more IP address segments corresponding to each of one or more logical interface groups in the second logical interface group list. A general description is provided herein, and details are not described below.

It should be noted that steps S503a to S506a and steps S503b to S506b are not subject to a specific sequence in this embodiment of this application. Steps S503a to S506a may be performed before steps S503b to S506b. Alternatively, steps S503b to S506b may be performed before steps S503a to S506a. Alternatively, steps S503a to S506a and steps S503b to S506b may be simultaneously performed. This is not specifically limited in this embodiment of this application.

It should be noted that, in this embodiment of this application, in a scenario in which there are a plurality of SMF network elements, logical interface groups managed by different SMF network elements do not overlap, and IP address segments that correspond to different logical interface groups and that are managed by different SMF network elements do not overlap either. In other words, a same logical interface group or a same IP address segment is managed by only one SMF network element, and can be allocated to only one UPF network element. A general description is provided herein, and details are not described below.

Figure 6:
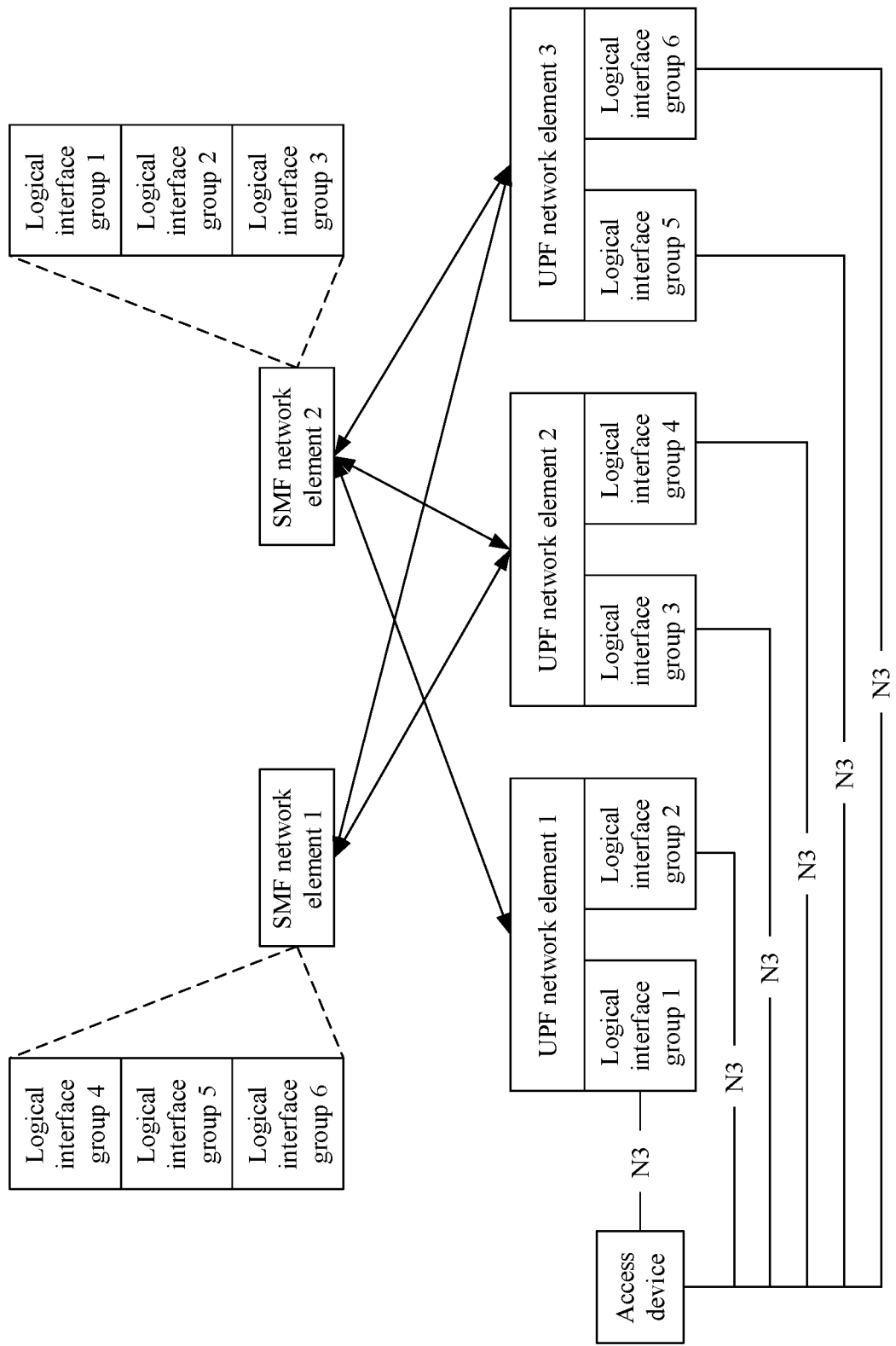
FIG. 6 is a schematic diagram 1 of configuration of a logical interface group according to an embodiment of this application.

For example, as shown in FIG. 6, an SMF network element 1 may manage a UPF network element 2 and a UPF network element 3, and the SMF network element 1 may manage a logical interface group 4, a logical interface group 5, and a logical interface group 6. In this case, the SMF network element 1 may configure the logical interface group 4 for the UPF network element 2, and configure the logical interface group 5 and the logical interface group 6 for the UPF network element 3. In addition, the SMF network element 1 may further send, to the UPF network element 2, information 4 about an IP address segment corresponding to the logical interface group 4, and send, to the UPF network element 3, information 5 about an IP address segment corresponding to the logical interface group 5 and information 6 about an IP address segment corresponding to the logical interface group 6. This is not shown in FIG. 6, and is not specifically limited in this embodiment of this application.

Alternatively, for example, as shown in FIG. 6, an SMF network element 2 may manage a UPF network element 1, a UPF network element 2, and a UPF network element 3, and the SMF network element 2 may manage a logical interface group 1, a logical interface group 2, and a logical interface group 3. In this case, the SMF network element 2 may configure the logical interface group 1 and the logical interface group 2 for the UPF network element 1, and configure the logical interface group 3 for the UPF network element 2. In addition, the SMF network element 2 may further send, to the UPF network element 1, information 1 about an IP address segment corresponding to the logical interface group 1 and information 2 about an IP address segment corresponding to the logical interface group 2, and send, to the UPF network element 2, information 3 about an IP address segment corresponding to the logical interface group 3. This is not shown in FIG. 6, and is not specifically limited in this embodiment of this application.

In addition, for example, as shown in FIG. 6, a logical interface group in this embodiment of this application may include the foregoing N3 address.

Optionally, the session management method provided in this embodiment of this application may further include the following procedure for establishing the session (it may be understood that there is one or more terminals in the network, and the first terminal is merely used as an example for description below).

S507: The first terminal sends a third request message to the SMF network element, so that the SMF network element receives the third request message from the terminal.

For example, as shown in FIG. 5A, FIG. 5B, and FIG. 5C, the third request message in this embodiment of this application may be, for example, a packet data unit (packet data unit, PDU) session establishment request (PDU session establishment request). This is not specifically limited in this embodiment of this application.

It should be noted that the first terminal in this embodiment of this application is any terminal that can communicate with the SMF network element in FIG. 5A, FIG. 5B, and FIG. 5C. A general description is provided herein, and details are not described below.

S508: The SMF network element selects the first UPF network element to serve the first terminal.

For specific implementations of step S507 and step S508, refer to existing implementations. Details are not described herein.

S509: The SMF network element allocates a first interface address (that is, one or more interface addresses, for example, may include an N3 address 1 or an N9 address 1) to the first terminal based on the first logical interface group, and allocates a first IP address in the first IP address segment to the first terminal.

The first IP address segment is an IP address segment corresponding to the first logical interface group. The first IP address may include one or more of an IP version 4 (IP version 4, IPv4) address or an IP version 6 (IP version 6, IPv6) address. This is not specifically limited in this embodiment of this application.

Optionally, in this embodiment of this application, the SMF network element may further allocate, to the first terminal based on the first interface address, a first fully qualified tunnel endpoint identifier (fully qualified tunnel endpoint identifier, F-TEID) corresponding to the session. The first F-TEID may include a tunnel address and a tunnel endpoint identifier (tunnel endpoint identifier, TEID). For a related implementation or related descriptions, refer to an existing implementation. Details are not described herein.

Optionally, in this embodiment of this application, if the first logical interface group list configured for the first UPF network element includes a plurality of logical interface groups, the SMF network element may select the first logical interface group from the first logical interface group list. For example, the SMF network element may select the first logical interface group based on a status of each of one or more logical interface groups. For example, the SMF network element may select a corresponding logical interface group with relatively low load. This is not specifically limited in this embodiment of this application.

S510: The SMF network element sends a fourth request message to the first UPF network element, so that the first UPF network element receives the fourth request message from the SMF network element.

Optionally, the fourth request message in this embodiment of this application may carry the first interface address in the first logical interface group. For example, the fourth request message may include an N3 address or an N9 address in the first logical interface group. This is not specifically limited in this embodiment of this application.

Optionally, the fourth request message in this embodiment of this application may further carry the first IP address allocated by the SMF network element to the first terminal. The first IP address is subsequently used to determine a session to which downlink data from a data network belongs. For a related implementation, refer to an existing implementation. Details are not described herein.

Optionally, if the SMF network element allocates, to the first terminal, the first F-TEID corresponding to the session in step S509, the fourth request message may further carry the first F-TEID. This is not specifically limited in this embodiment of this application.

For example, as shown in FIG. 5A, FIG. 5B, and FIG. 5C, the fourth request message in this embodiment of this application may be, for example, an N4 session establishment request (N4 session establishment request). This is not specifically limited in this embodiment of this application.

Optionally, S511: The first UPF network element allocates, to the first terminal, the first F-TEID corresponding to the session.

To be specific, if the SMF network element has allocated, to the first terminal based on the first interface address, the first F-TEID corresponding to the session in step S509, the first UPF network element does not need to perform step S511. A general description is provided herein, and details are not described below.

For example, in this embodiment of this application, the first UPF network element may allocate, to the first terminal based on the first interface address in the first logical interface group, the first F-TEID corresponding to the session, where the first interface address is carried in the N4 session establishment request.

S512: The first UPF network element sends a fourth response message to the SMF network element, so that the SMF network element receives the fourth response message from the first UPF network element.

Optionally, if the session management method provided in this embodiment of this application includes step S511, the fourth response message in this embodiment of this application may carry the first F-TEID that corresponds to the session and that is allocated by the first UPF network element to the first terminal. This is not specifically limited in this embodiment of this application.

For example, as shown in FIG. 5A, FIG. 5B, and FIG. 5C, the fourth response message in this embodiment of this application may be, for example, an N4 session establishment response (N4 session establishment response). This is not specifically limited in this embodiment of this application.

S513: The SMF network element establishes a correspondence between information about the first logical interface group and information about a first session.

Specifically, the SMF network element may generate the information about the first session for the first terminal, bind the information about the first session to the first logical interface group, and establish the correspondence between the information about the first logical interface group and the information about the first session. In this way, when the first logical interface group is to be migrated subsequently, the SMF network element can obtain, based on the established correspondence, information about one or more sessions corresponding to the first logical interface group. The information about the one or more sessions includes the information about the first session.

Optionally, in this embodiment of this application, the information about the first logical interface group is used to represent the first logical interface group. For example, the information about the first logical interface group may be information that can be used to represent the first logical interface group, such as an identifier of the first logical interface group or a group of interface addresses in the first logical interface group. This is not specifically limited in this embodiment of this application.

Optionally, in this embodiment of this application, the information about the first session may include, for example, the first IP address allocated by the SMF network element to the first terminal, the first F-TEID that corresponds to the session and that is allocated by the first UPF network element or the SMF network element to the first terminal, and some other existing information about the session, such as an identifier of the SMF network element, a session identifier, a session type, a packet detection rule, a forwarding action rule, a usage reporting rule, a buffering action rule, or traffic endpoint information. This is not specifically limited in this embodiment of this application.

Optionally, in this embodiment of this application, if the first F-TEID that corresponds to the session and that is allocated to the first terminal is allocated by the SMF network element, or if the information about the first session does not include the first F-TEID that corresponds to the session and that is allocated to the first terminal, step S513 and steps S510 to S512 are not subject to a specific sequence in this embodiment of this application. Step S513 may be performed before steps S510 to S512. Alternatively, steps S510 to S512 may be performed before step S513. Alternatively, steps S510 to S512 and step S513 may be simultaneously performed. This is not specifically limited in this embodiment of this application.

S514: The SMF network element sends a third response message to the first terminal, so that the first terminal receives a PDU session establishment response from the SMF network element.

For example, as shown in FIG. 5A, FIG. 5B, and FIG. 5C, the third response message in this embodiment of this application may be, for example, a PDU session establishment response (PDU session establishment response). This is not specifically limited in this embodiment of this application.

In steps S507 to S514, a method for establishing the session for the first terminal is described by using an example in which a UPF network element serving the first terminal is the first UPF network element, and the first logical interface group in the first logical interface group list is selected for the session established for the first terminal, and corresponds to the session. It may be understood that, there is one or more terminals in the network, and if a session needs to be established for any terminal in the one or more terminals, for a corresponding method for establishing the session for the terminal, refer to steps S507 to S514. Details are not described herein again.

The session management method provided in this embodiment of this application may further include the following session migration procedure:

S515: The first UPF network element sends a fifth request message to the SMF network element, so that the SMF network element receives the fifth request message from the first UPF network element.

The fifth request message carries one or more of one or more running statuses of one or more logical interface groups in the first logical interface group list or a running status of the first UPF network element. For example, the fifth request message carries the one or more running statuses of the one or more logical interface groups in the first logical interface group list. Alternatively, the fifth request message carries the running status of the first UPF network element. Alternatively, the fifth request message carries the one or more running statuses of the one or more logical interface groups in the first logical interface group list and the running status of the first UPF network element.

For example, as shown in FIG. 5A, FIG. 5B, and FIG. 5C, the fifth request message in this embodiment of this application may be, for example, a PFCP node report request (PFCP node report request). This is not specifically limited in this embodiment of this application.

Optionally, in this embodiment of this application, the first UPF network element may periodically report one or more of the one or more running statuses of the one or more logical interface groups in the first logical interface group list or the running status of the first UPF network element through an extended heartbeat request (heartbeat request) message over an N4 interface. This is not specifically limited in this embodiment of this application.

Optionally, in this embodiment of this application, another network element may perceive that one or more of the one or more running statuses of the one or more logical interface groups in the first logical interface group list or the running status of the first UPF network element change, and then notify the SMF network element. This is not specifically limited in this embodiment of this application.

It is assumed that one or more of the one or more running statuses of the one or more logical interface groups in the first logical interface group list or the running status of the first UPF network element include one or more of a running status of the first logical interface group or the running status of the first UPF network element. The session management method provided in this embodiment of this application may further include the following steps.

S516: The SMF network element determines, based on one or more of the running status of the first logical interface group or the running status of the first UPF network element, that the first logical interface group on the first UPF network element is faulty.

For example, the SMF network element may determine, based on the running status of the first logical interface group, that the first logical interface group on the first UPF network element is faulty. Alternatively, the SMF network element may determine, based on the running status of the first UPF network element, that the first logical interface group on the first UPF network element is faulty. Alternatively, the SMF network element determines, based on the running status of the first logical interface group and the running status of the first UPF network element, that the first logical interface group on the first UPF network element is faulty.

For example, if the first UPF network element is the UPF network element 1 in FIG. 6, when a running status reported by the UPF network element 1 includes a running status of the UPF network element 1, if the running status of the UPF network element 1 is faulty, both the logical interface group 1 and the logical interface group 2 on the UPF network element 1 are considered to be faulty. Alternatively, when only a running status of the logical interface group 1 in the running status reported by the UPF network element 1 is faulty, it can be determined that the logical interface group 1 on the UPF network element 1 is faulty.

Optionally, in this embodiment of this application, if the first UPF network element periodically reports the one or more running statuses of the one or more logical interface groups in the first logical interface group list or the running status of the first UPF network element through the extended heartbeat request message over the N4 interface, and if the SMF network element does not receive, for a plurality of times or within a preset time, the heartbeat request message reported by the first UPF network element, the SMF network element may also determine that the first UPF network element is faulty, and further determine that the first logical interface group on the first UPF network element is faulty. This is not specifically limited in this embodiment of this application.

S517: The SMF network element selects the second UPF network element for the first logical interface group.

Optionally, in this embodiment of this application, when the SMF network element reselects, for the first logical interface group, a UPF network element that can take over, the SMF network element may consider factors such as a running status and load information of the UPF network element. For details, refer to an existing manner of selecting a UPF network element by an SMF network element. This is not specifically limited in this embodiment of this application.

S518: The SMF network element sends a sixth request message to the second UPF network element, so that the second UPF network element receives the sixth request message from the SMF network element.

The sixth request message carries the configuration information of the first logical interface group and the information about the first IP address segment corresponding to the first logical interface group, and is used to restore the configuration information of the first logical interface group and the information about the first IP address segment on the second UPF network element.

For related descriptions of the configuration information of the first logical interface group and the information about the first IP address segment corresponding to the first logical interface group, refer to related descriptions in step S504a. Details are not described herein again.

For example, as shown in FIG. 5A, FIG. 5B, and FIG. 5C, the sixth request message in this embodiment of this application may be, for example, a PFCP UPF logical interface group request. This is not specifically limited in this embodiment of this application.

Optionally, in this embodiment of this application, the configuration information of the first logical interface group and the information about the first IP address segment corresponding to the first logical interface group may be respectively sent to the second UPF network element through two messages. For example, the configuration information of the first logical interface group may be sent to the second UPF network element through a PFCP association setup request, and the information about the first IP address segment corresponding to the first logical interface group may be sent to the second UPF network element through a PFCP association update request. This is not specifically limited in this embodiment of this application.

S519: The second UPF network element restores, on the second UPF network element based on the sixth request message, the configuration information of the first logical interface group and the information about the first IP address segment corresponding to the first logical interface group, and advertises a routing policy for the first IP address segment corresponding to the first logical interface group, where the routing policy is used to route data to the second UPF network element.

Optionally, in this embodiment of this application, that the second UPF network element advertises a routing policy for the first IP address segment corresponding to the first logical interface group is specifically that the second UPF network element advertises, to a corresponding data network according to a routing protocol, a routing policy corresponding to a destination address that is an address related to the first logical interface group. Further, a network element or a device in the data network may route downlink data or uplink data to the second UPF network element according to the routing policy. A general description is provided herein, and details are not described below.

For descriptions of the address related to the first logical interface group, refer to descriptions in step S505a. Details are not described herein again.

Optionally, in this embodiment of this application, that the second UPF network element restores the configuration information of the first logical interface group on the second UPF network element may specifically include that the second UPF network element stores the received configuration information of the first logical interface group; and that the second UPF network element restores, on the second UPF network element, the information about the first IP address segment corresponding to the first logical interface group may specifically include that the second UPF network element stores the received information about the first IP address segment corresponding to the first logical interface group. A general description is provided herein, and details are not described below.

S520: The second UPF network element sends a sixth response message to the SMF network element, so that the SMF network element receives the sixth response message from the second UPF network element.

The sixth response message is used to acknowledge that the configuration information of the first logical interface group and the information about the first IP address segment corresponding to the first logical interface group have been successfully restored on the second UPF network element.

For example, as shown in FIG. 5A, FIG. 5B, and FIG. 5C, the sixth response message in this embodiment of this application may be, for example, a PFCF UPF logical interface group response. This is not specifically limited in this embodiment of this application.

Figure 7:
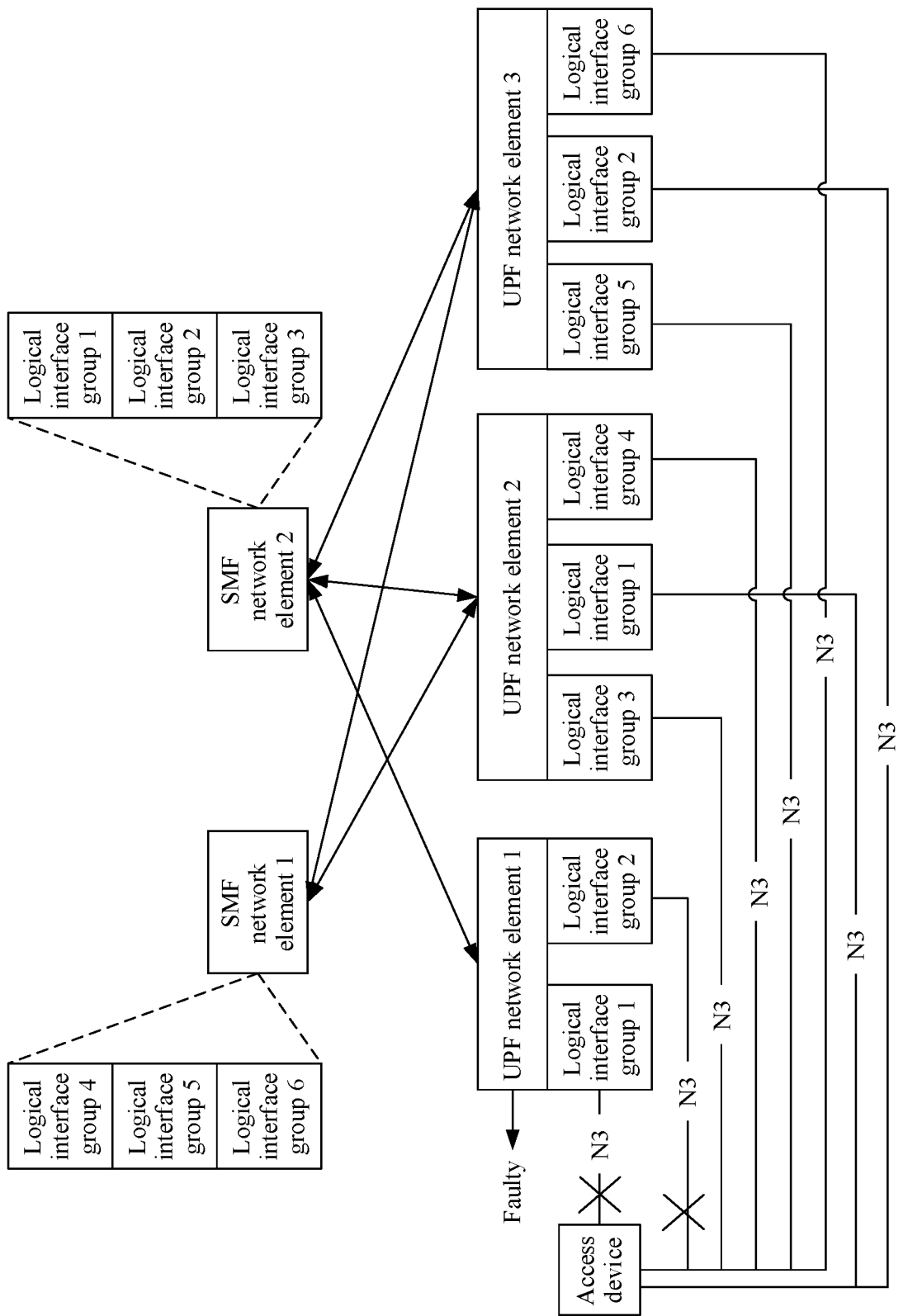
FIG. 7 is a schematic diagram 1 of restoration of a logical interface group according to an embodiment of this application.

For example, if the first UPF network element is the UPF network element 1 in FIG. 6, and if the running status of the UPF network element 1 is faulty, the logical interface group 1 on the UPF network element 1 may be migrated to the UPF network element 2, and the logical interface group 2 on the UPF network element 1 may be migrated to the UPF network element 3. A result is shown in FIG. 7. In addition, when the logical interface group 1 on the UPF network element 1 is migrated to the UPF network element 2, the information 1 about the IP address segment corresponding to the logical interface group 1 may also be sent to the UPF network element 2; and when the logical interface group 2 on the UPF network element 1 is migrated to the UPF network element 3, the information 2 about the IP address segment corresponding to the logical interface group 2 may also be sent to the UPF network element 3. This is not shown in FIG. 7, and is not specifically limited in this embodiment of this application.

Optionally, if the SMF network element sends, to the first UPF network element respectively through two messages, the configuration information of the first logical interface group and the information about the first IP address segment corresponding to the first logical interface group, two messages may be used to respectively acknowledge that the configuration information of the first logical interface group has been successfully restored on the second UPF network element and the information about the first IP address segment corresponding to the first logical interface group has been successfully restored on the second UPF network element. This is not specifically limited in this embodiment of this application.

S521: The SMF network element determines, based on the information about the first logical interface group and an established correspondence between the information about the first logical interface group and the information about the one or more sessions, the information about the one or more sessions corresponding to the first logical interface group.

In this embodiment of this application, the established correspondence between the information about the first logical interface group and the information about the one or more sessions may include, for example, the correspondence that is established in step S513 and that is between the information about the first logical interface group and the information about the first session and a correspondence that is established according to the foregoing method for establishing the session and that is between the information about the first logical interface group and information about another session generated for another terminal, such as an established correspondence between the information about the first logical interface group and information about a second session generated for a second terminal and an established correspondence between the information about the first logical interface group and information about a third session generated for a third terminal, as shown in Table 4. This is not specifically limited in this embodiment of this application. For related descriptions of the information about the first logical interface group and information about a session, refer to descriptions in step S513. Details are not described herein again.

TABLE 4

| Information about a logical interface group | Information about a session |
| --- | --- |
| Information about the first logical interface group | Information about the first session<br>Information about the second session<br>Information about the third session<br>. . . |

S522: The SMF network element sends a seventh request message to the second UPF network element, so that the second UPF network element receives the seventh request message from the SMF network element.

The seventh request message is used to restore, on the second UPF network element, the information about the one or more sessions corresponding to the first logical interface group.

Optionally, in this embodiment of this application, the seventh request message may carry the information that is about the one or more sessions corresponding to the first logical interface group and that is determined in step S512.

For example, as shown in FIG. 5A, FIG. 5B, and FIG. 5C, the seventh request message in this embodiment of this application may be, for example, an N4 session restoration request (N4 session recover request). Certainly, the seventh request message may alternatively be, for example, an N4 session establishment request. This is not specifically limited in this embodiment of this application.

S523: The second UPF network element restores, on the second UPF network element based on the seventh request message, the information about the one or more sessions corresponding to the first logical interface group.

Optionally, in this embodiment of this application, that the second UPF network element restores, on the second UPF network element, the information about the one or more sessions corresponding to the first logical interface group may specifically include that the second UPF network element stores the received information about the one or more sessions corresponding to the first logical interface group, for example, stores the correspondence shown in Table 4. This is not specifically limited in this embodiment of this application.

S524: The second UPF network element sends a seventh response message to the SMF network element, so that the SMF network element receives the seventh response message from the second UPF network element.

The seventh response message is used to acknowledge that the information about the one or more sessions corresponding to the first logical interface group has been successfully restored on the second UPF network element.

For example, as shown in FIG. 5A, FIG. 5B, and FIG. 5C, the seventh response message in this embodiment of this application may be, for example, an N4 session restoration response.

Optionally, if the seventh request message is an N4 session establishment request, correspondingly, the seventh response message in step S524 may be, for example, an N4 session establishment response. A general description is provided herein, and details are not described below.

It should be noted that, in steps S522 to S524 in this embodiment of this application, descriptions are provided by using an example in which the second UPF network element restores, in batches, the information about the one or more sessions corresponding to the first logical interface group. Optionally, when there are a plurality of pieces of information about a session corresponding to the first logical interface group, the plurality of pieces of information may be restored one by one or for a plurality of times in a manner similar to the foregoing manner. To be specific, the SMF network element sends a plurality of seventh request messages to the second UPF network element. Each of the seventh request messages is used to restore, on the second UPF network element, information about one session corresponding to the first logical interface group. For example, a seventh request message 1 is used to restore information about a first session, a seventh request message 2 is used to restore information about a second session, and a seventh request message 3 is used to restore information about a third session. This is not specifically limited in this embodiment of this application.

In steps S515 to S524, specific implementations of restoring the configuration information of the first logical interface group, restoring the information about the first IP address segment corresponding to the first logical interface group, and restoring the information about the one or more sessions corresponding to the first logical interface group are provided by using an example in which one or more of the running status of the first logical interface group or the running status of the first UPF network element are reported and it is determined that the first logical interface group on the first UPF network element is faulty. Certainly, if a plurality of logical interface groups on the first UPF network element are faulty, for a manner of restoring configuration information of any logical interface group in the plurality of logical interface groups and information about an IP address segment corresponding to the logical interface group, refer to steps S518 to S520; and for a manner of restoring information about one or more sessions corresponding to a logical interface group, refer to steps S521 to S524. Details are not described herein again. In addition, in this embodiment of this application, the SMF network element may alternatively obtain a running status of the second UPF network element, and migrate the session based on the running status of the second UPF network element. For related descriptions, refer to descriptions in steps S515 to S524. Details are not described herein again.

It should be noted that steps S518 to S520 and steps S521 to S524 are not subject to a specific sequence in this embodiment of this application. Steps S518 to S520 may be performed before steps S521 to S524. Alternatively, steps S521 to S524 may be performed before steps S518 to S520. Alternatively, steps S518 to S520 and steps S521 to S524 may be simultaneously performed. This is not specifically limited in this embodiment of this application.

In addition, after the configuration information of the first logical interface group and the information about the IP address segment corresponding to the first logical interface group are migrated to the second UPF network element, for a method for establishing, for a new terminal, a session corresponding to the first logical interface, refer to steps S507 to S514. Details are not described herein again.

According to the session management method provided in this embodiment of this application, the SMF network element may be used as a centralized management node of UPF network elements, to monitor running statuses of the UPF network elements or a running status of a logical interface group on a UPF network element, and the SMF network element actively initiates a procedure for restoring configuration information of a faulty logical interface group on the UPF network element, a procedure for restoring information about an IP address segment corresponding to the faulty logical interface group, and a procedure for restoring information about one or more sessions corresponding to the faulty logical interface group. This is different from the prior art in which a UPF network element autonomously migrates a session. This can avoid a prior-art problem caused by migration autonomously performed by the UPF network element. For example, the session can be flexibly taken over after the UPF network element is faulty, a complex function of managing a backup relationship between a plurality of UPF network elements is avoided, and a large quantity of overheads caused by processing session backup messages between the UPF network elements can be avoided. In other words, session management on the UPF network element can be implemented in a convenient manner.

The actions of the SMF network element, the first UPF network element, and the second UPF network element in steps S501a to S524 may be performed by the processor 401, by invoking the application program code stored in the memory 403, in the communications device 400 shown in FIG. 4. This is not limited in this embodiment.

It should be noted that, in this embodiment shown in FIG. 5A, FIG. 5B, and FIG. 5C, descriptions are provided by using an example in which the first UPF network element is a UPF network element that directly communicates with or interfaces with a data network. Therefore, in step S503a, the SMF network element needs to allocate, to the first UPF network element, the one or more IP address segments corresponding to each of the one or more logical interface groups in the first logical interface group list. If the first UPF network element is not a UPF network element, for example, an intermediate UPF network element, that directly communicates with or interfaces with a data network, in step S503a, the SMF network element may not need to allocate, to the intermediate UPF network element, the one or more IP address segments corresponding to each of the one or more logical interface groups in the first logical interface group list. For example, assuming that the first terminal accesses a data network successively through the UPF network element 1 and the UPF network element 2, the first logical interface group and the first IP address segment corresponding to the first logical interface group may be allocated to the UPF network element 2, and the second logical interface group may be allocated to the UPF network element 1, but the second IP address segment corresponding to the second logical interface group does not need to be allocated to the UPF network element 1.

If an IP address segment corresponding to a logical interface group does not need to be allocated, an operation related to the IP address segment in the subsequent steps does not need to be performed. For example, the second request message in step S504 may not need to carry the information about the one or more IP address segments corresponding to each of the one or more logical interface groups in the first logical interface group list. For example, step S505a may not need to be performed. For example, in step S509, the first IP address in the first IP address segment may not need to be allocated to the first terminal. For example, the sixth request message in step S518 may not need to carry the information about the first IP address segment corresponding to the first logical interface group. A general description is provided herein, and related descriptions may also be applicable to subsequent embodiments. Details are not described below.

Figure 8A:
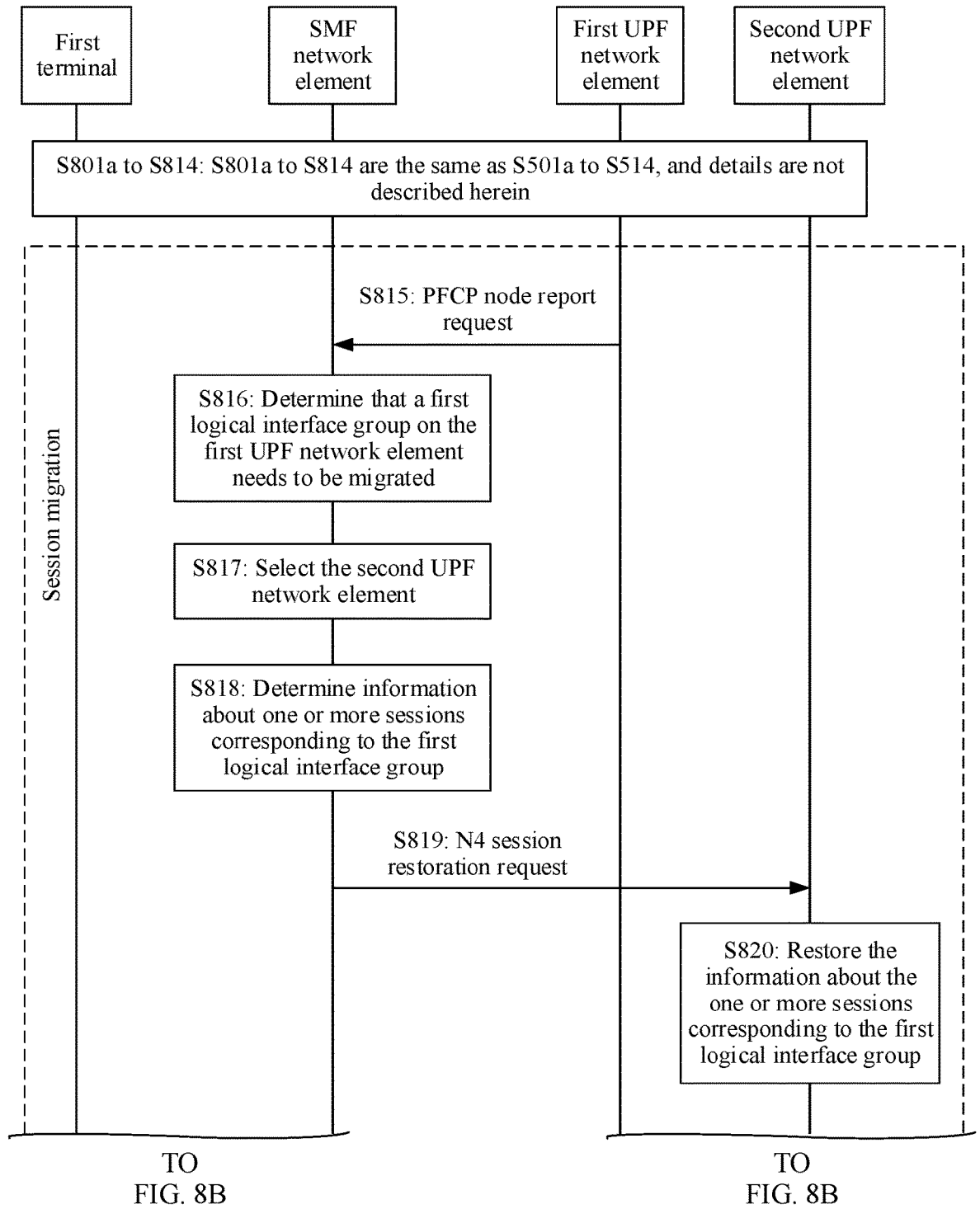
FIG. 8A and FIG. 8B are a schematic flowchart 2 of a session management method according to an embodiment of this application.
Figure 8B:
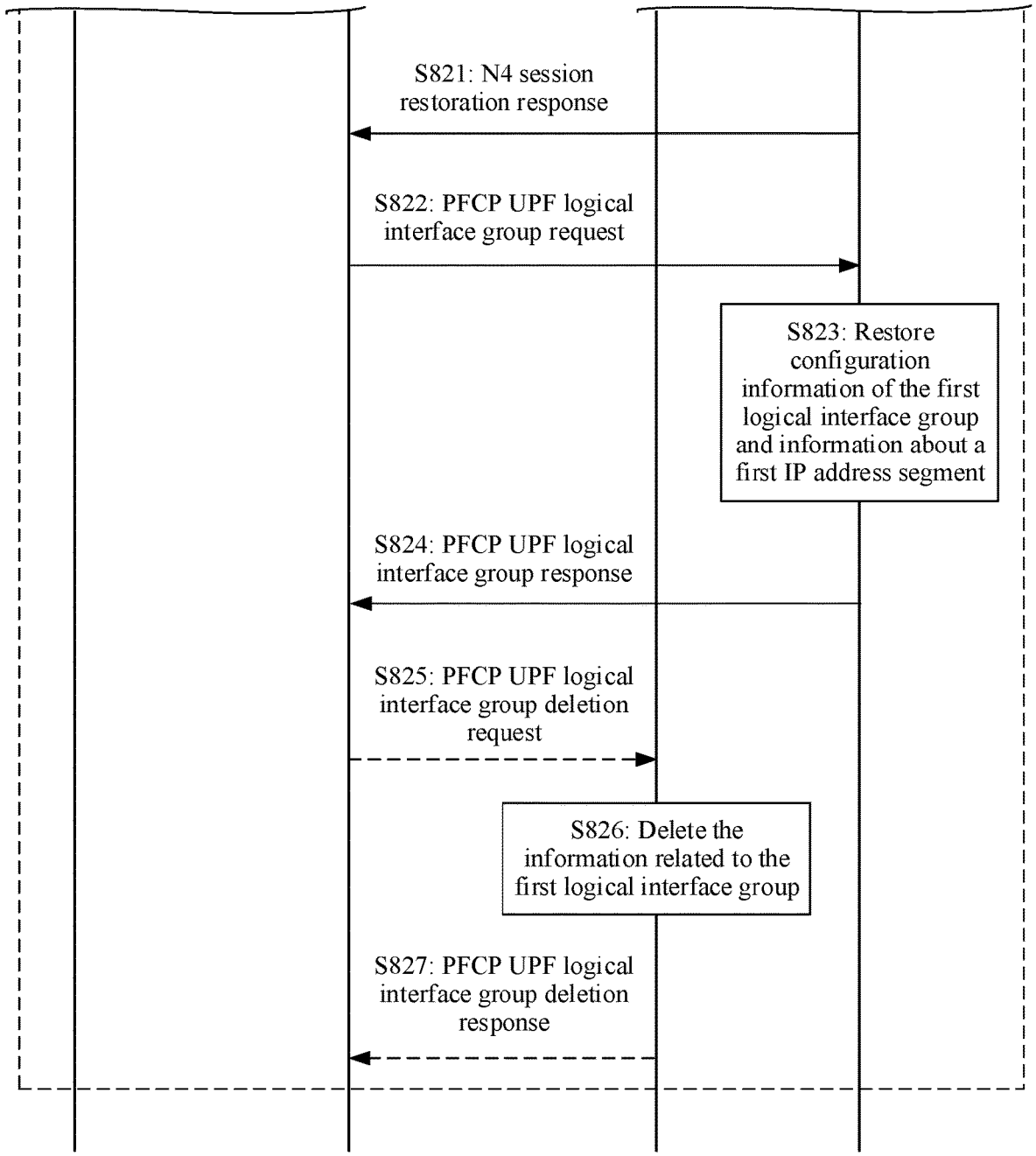
Figure 9A:
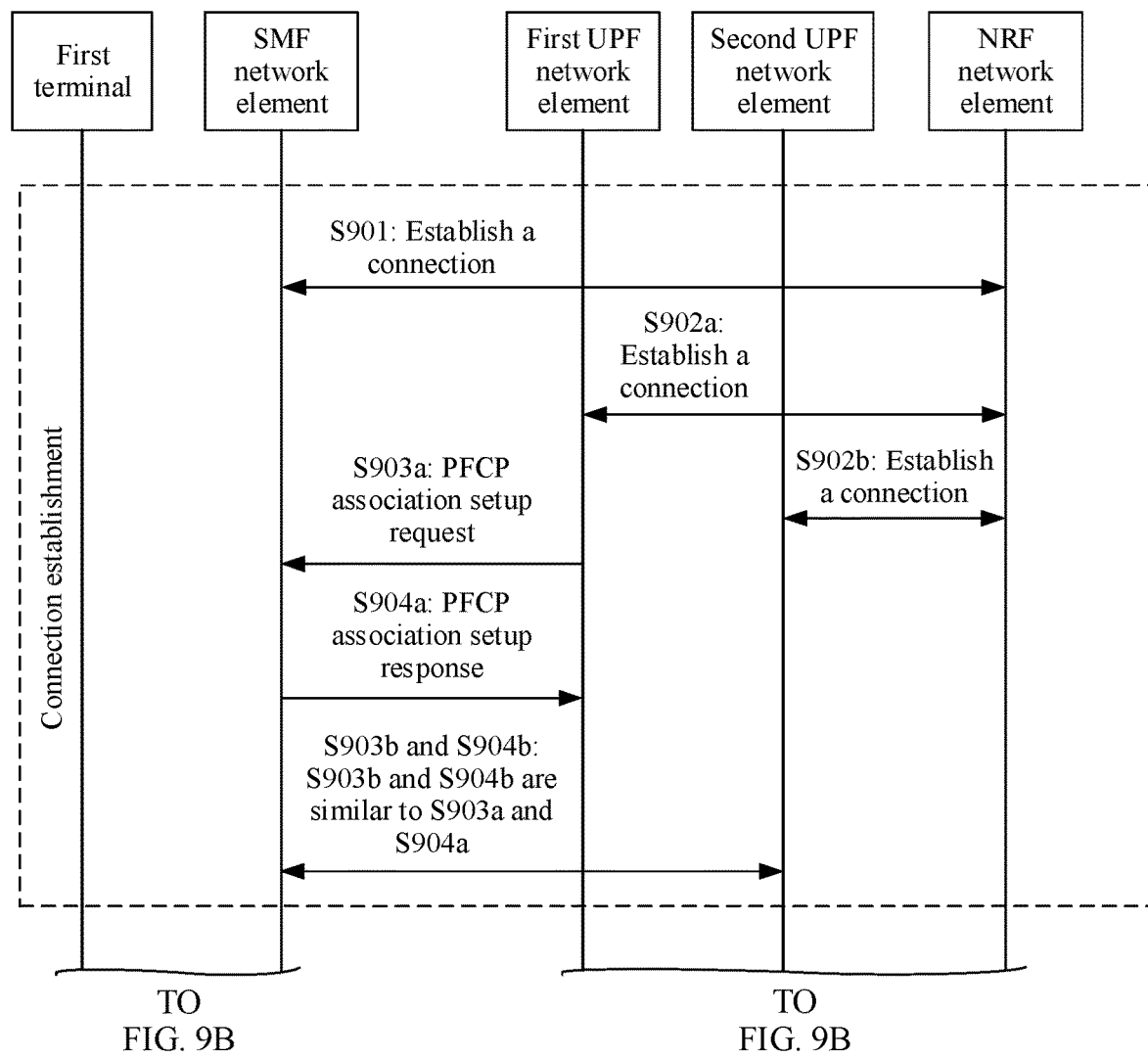
FIG. 9A, FIG. 9B, FIG. 9C, and FIG. 9D are a schematic flowchart 3 of a session management method according to an embodiment of this application.
Figure 9B:
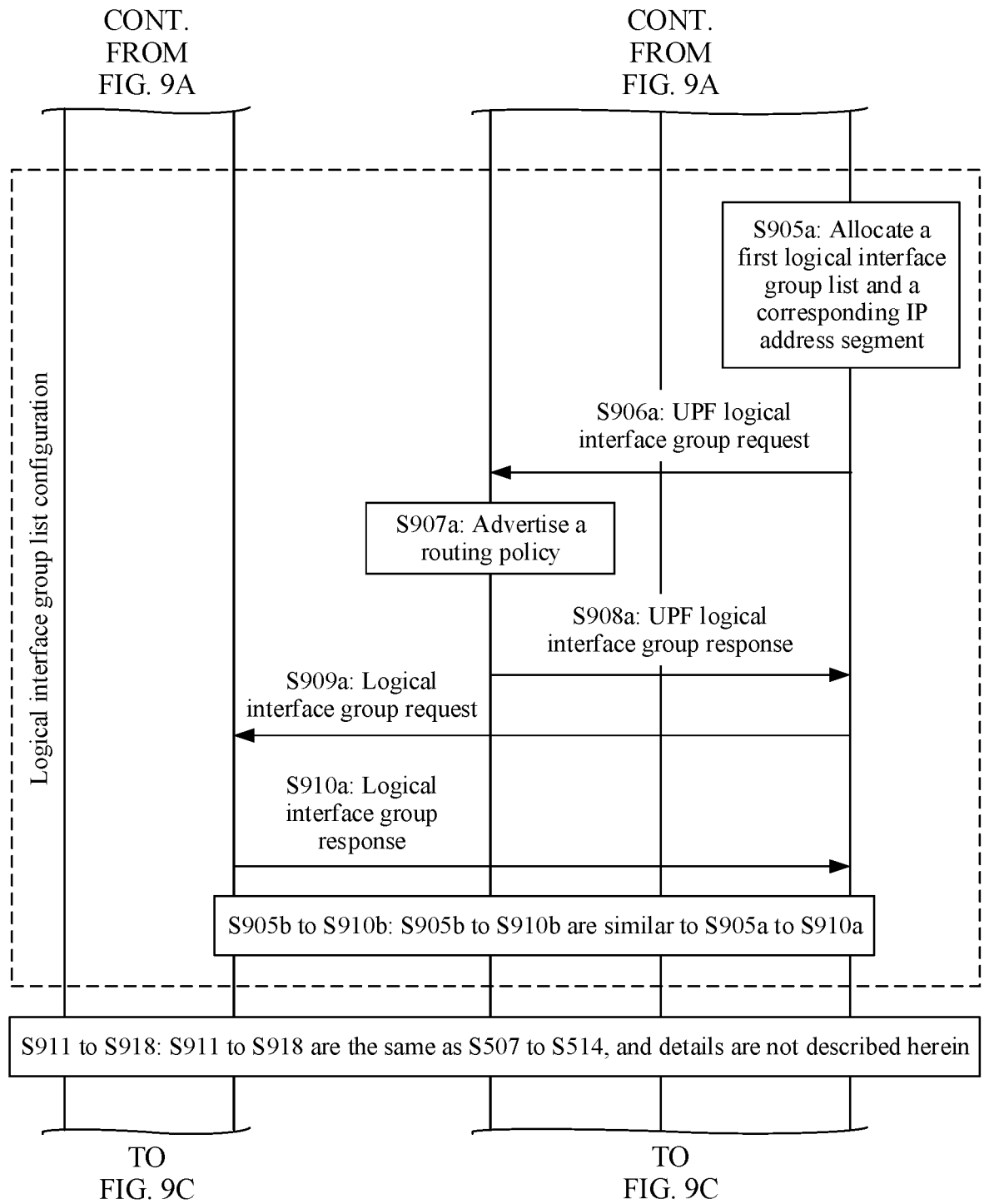
Figure 9C:
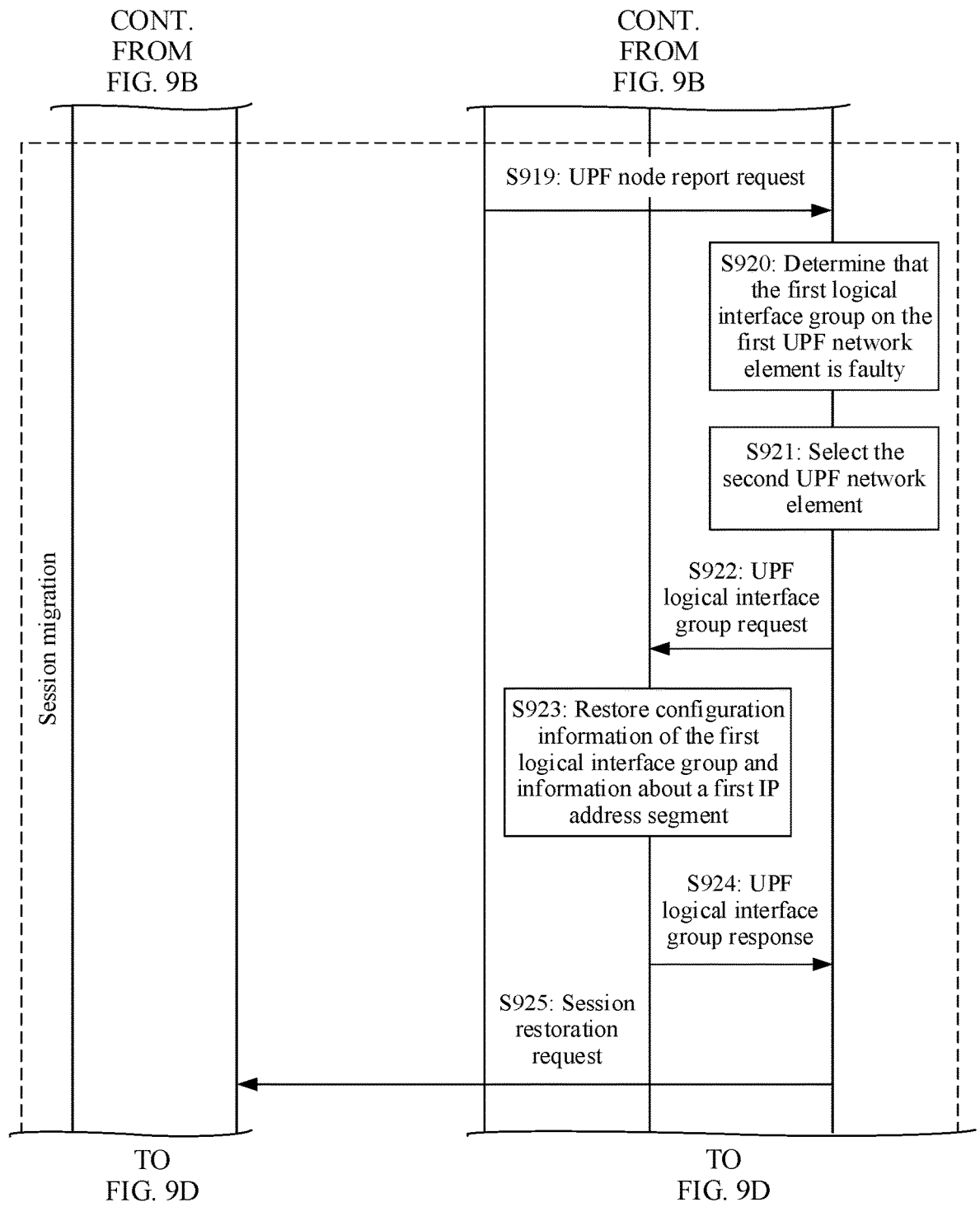
Figure 9D:
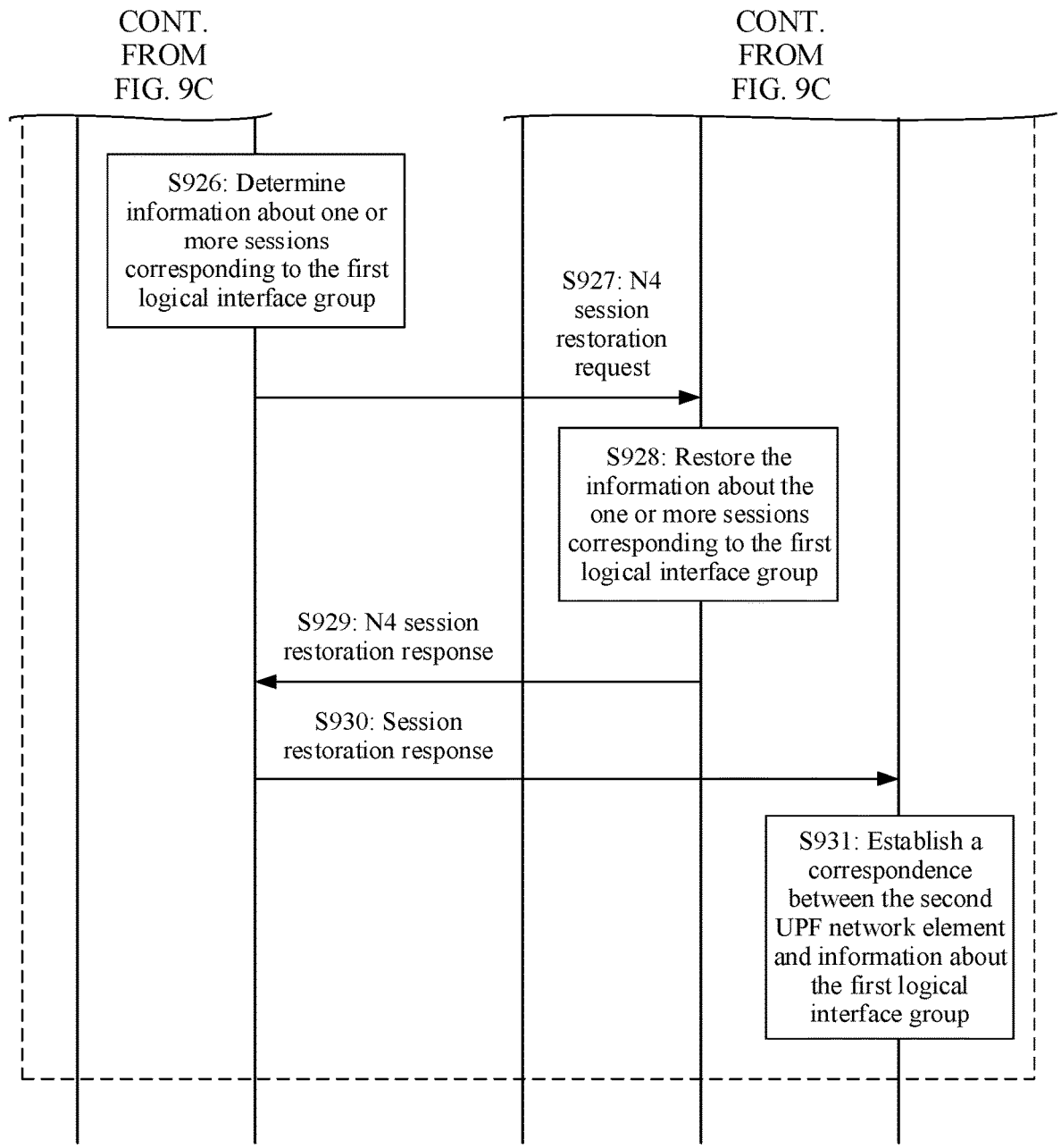

Optionally, in an example, the session management system shown in FIG. 1 is applied to the 5G network shown in FIG. 2, the network device is an SMF network element, and a migration scenario is an overload scenario or a load balancing scenario. FIG. 8A and FIG. 8B show another session management method according to an embodiment of this application. The session management method includes the following steps.

S801a to S814: Steps S801a to S814 are the same as steps S501a to S514. For related descriptions, refer to descriptions in the embodiment shown in FIG. 5A, FIG. 5B, and FIG. 5C. Details are not described herein again.

The session management method provided in this embodiment of this application may further include the following session migration procedure:

S815: Step S815 is similar to step S515. A difference is as follows: One or more of the one or more running statuses of the one or more logical interface groups in the first logical interface group list or the running status of the first UPF network element are reported in step S515, while load information of the first UPF network element is reported in step S815. For other related descriptions, refer to descriptions in step S515. Details are not described herein again.

S816: The SMF network element determines, based on the load information of the first UPF network element, that the first logical interface group on the first UPF network element needs to be migrated.

For example, if the SMF network element learns, based on the load information of the first UPF network element, that the first UPF network element is overloaded, the SMF network element may determine that one or more logical interface groups on the first UPF network element need to be migrated to another idle UPF network element. Alternatively, for example, if the SMF network element needs to perform load balancing between a plurality of UPF network elements managed by the SMF network element, the SMF network element may determine that one or more logical interface groups on the first UPF network element need to be migrated to another idle UPF network element. A manner of determining, by the SMF network element based on the load information of the first UPF network element, that one or more logical interface groups on the first UPF network element need to be migrated to another idle UPF network element is not specifically limited in this embodiment of this application.

S817: Step S817 is the same as step S517. For related descriptions, refer to descriptions in the embodiment shown in FIG. 5A, FIG. 5B, and FIG. 5C. Details are not described herein again.

S818 to S821: Steps S818 to S821 are the same as steps S521 to S524. For related descriptions, refer to descriptions in the embodiment shown in FIG. 5A, FIG. 5B, and FIG. 5C. Details are not described herein again.

Optionally, after the SMF network element receives the seventh response message from the second UPF network element, the session management method provided in this embodiment of this application may further include the following steps.

S822 to S824: Steps S822 to S824 are the same as steps S518 to S520. For related descriptions, refer to descriptions in the embodiment shown in FIG. 5A, FIG. 5B, and FIG. 5C. Details are not described herein again.

Optionally, in this embodiment of this application, after advertising the routing policy corresponding to the first logical interface group, the second UPF network element may notify the first UPF network element to delete the routing policy that corresponds to the first logical interface group and that is advertised by the first UPF network element. Alternatively, in this embodiment of this application, the routing policy that corresponds to the first logical interface group and that is advertised by the second UPF network element may be a routing policy with a higher priority than the routing policy that corresponds to the first logical interface group and that is advertised by the first UPF network element, so that during data routing, downlink data can be routed to the second UPF network element based on the routing policy that corresponds to the first logical interface group and that is advertised by the second UPF network element. This is not specifically limited in this embodiment of this application.

In steps S815 to S824, specific implementations of restoring the configuration information of the first logical interface group, restoring the information about the first IP address segment corresponding to the first logical interface group, and restoring the information about the one or more sessions corresponding to the first logical interface group are provided by using an example in which the load information of the first UPF network element is reported and it is determined that the first logical interface group on the first UPF network element needs to be migrated. Certainly, if a plurality of logical interface groups on the first UPF network element need to be migrated, for a manner of restoring configuration information of any logical interface group in the plurality of logical interface groups and information about an IP address segment corresponding to the logical interface group, refer to steps S822 to S824; and for a manner of restoring information about one or more sessions corresponding to a logical interface group, refer to steps S818 to S821. Details are not described herein again. In addition, in this embodiment of this application, the SMF network element may alternatively obtain load information of the second UPF network element, and migrate the session based on the load information of the second UPF network element. For related descriptions, refer to descriptions in steps S815 to S824. Details are not described herein again.

Optionally, the session management method provided in this embodiment of this application may further include the following steps.

S825: After the SMF network element receives the sixth response message from the second UPF network element, the SMF network element sends an eighth request message to the first UPF network element, so that the first UPF network element receives the eighth request message from the SMF network element.

The eighth request message is used to notify the first UPF network element to delete the information related to the first logical interface group.

Optionally, in this embodiment of this application, the information related to the first logical interface group may include, for example, one or more of the configuration information of the first logical interface group, the information about the first IP address segment corresponding to the first logical interface group, the information about the one or more sessions corresponding to the first logical interface group, or the routing policy advertised for the first IP address segment corresponding to the first logical interface group. This is not specifically limited in this embodiment of this application.

For example, as shown in FIG. 8A and FIG. 8B, the eighth request message in this embodiment of this application may be, for example, a PFCP UPF logical interface group deletion request (PFCP UPF logic interface remove request). This is not specifically limited in this embodiment of this application.

S826: The first UPF network element deletes the information related to the first logical interface group based on the eighth request message.

S827: The first UPF network element sends an eighth response message to the SMF network element, so that the first UPF network element receives the eighth response message from the SMF network element.

The eighth response message is used to acknowledge that the information related to the first logical interface group has been successfully deleted by the first UPF network element.

For example, as shown in FIG. 8A and FIG. 8B, the eighth response message in this embodiment of this application may be, for example, a PFCP UPF logical interface group deletion response (PFCP UPF logic interface remove response). This is not specifically limited in this embodiment of this application.

Optionally, in this embodiment of this application, the information that is about the one or more sessions corresponding to the first logical interface group and that is included in the information related to the first logical interface group may alternatively be deleted by the SMF network element through an N4 session deletion request (N4 session delete request). This is not specifically limited in this embodiment of this application.

Steps S825 to S827 provide an example of a manner of deleting the information related to the first logical interface group on the first UPF network element. Certainly, if another logical interface group on the first UPF network element needs to be migrated, or a logical interface group on another UPF network element needs to be migrated, for a manner of deleting information related to the logical interface group, refer to descriptions in steps S825 to S827. Details are not described herein again.

According to the session management method provided in this embodiment of this application, the SMF network element may be used as a centralized management node of UPF network elements, to monitor load information of the UPF network elements, and the SMF network element actively initiates a procedure for restoring configuration information of a logical interface group that needs to be migrated, a procedure for restoring information about an IP address segment corresponding to the logical interface group that needs to be migrated, and a procedure for restoring information about one or more sessions corresponding to the logical interface group that needs to be migrated. This is different from the prior art in which a UPF network element autonomously migrates a session. This can avoid a prior-art problem caused by migration autonomously performed by the UPF network element. For example, the session can be flexibly taken over from an overloaded UPF network element or a UPF network element for which load needs to be balanced, load balancing between a plurality of UPF network elements can be implemented, a complex function of managing a backup relationship between the plurality of UPF network elements is avoided, and a large quantity of overheads caused by processing session backup messages between the UPF network elements can be avoided. In other words, session management on the UPF network element can be implemented in a convenient manner. Optionally, in this embodiment of this application, during session migration, the information about the one or more sessions corresponding to the logical interface group that needs to be migrated may be first restored (as described in steps S818 to S821), and then the configuration information of the logical interface group that needs to be migrated and the information about the IP address segment corresponding to the logical interface group that needs to be migrated may be restored (as described in steps S822 to S824). This can reduce service interruption during the session migration, and can maintain service continuity. It may be understood that, in another possible implementation, steps S818 to S821 and steps S822 to S824 are not subject to a specific sequence. Optionally, in this embodiment of this application, after the session migration, information that is related to the migrated logical interface group and that is on the first UPF network element (namely, a source UPF network element) may be deleted. On one hand, this can save storage space of the first UPF network element, and reduce a waste of resources. On the other hand, this can avoid a session failure that may be caused because all data is automatically resumed on the first UPF network element according to the remaining routing policy without being perceived by the SMF network element when the second UPF network element (namely, a target UPF network element) is faulty subsequently.

The actions of the SMF network element, the first UPF network element, and the second UPF network element in steps S801a to S827 may be performed by the processor 401, by invoking the application program code stored in the memory 403, in the communications device 400 shown in FIG. 4. This is not limited in this embodiment.

Optionally, in an example, the session management system shown in FIG. 1 is applied to the 5G network shown in FIG. 2, the network device is an NRF network element, and a migration scenario is a fault scenario. FIG. 9A, FIG. 9B, FIG. 9C, and FIG. 9D show another session management method according to an embodiment of this application. The session management method includes the following steps.

Optionally, the session management method provided in this embodiment of this application may include the following one or more connection establishment procedures:

S901: An SMF network element establishes a connection to the NRF network element.

For a related implementation of step S901, refer to an existing implementation. Details are not described herein.

S902*a*: A first UPF network element establishes a connection to the NRF network element.

S902*b*: A second UPF network element establishes a connection to the NRF network element.

For specific implementations of step S902*a* and step S902*b*, refer to an existing implementation. Details are not described herein.

S903*a* and S904*a*: Steps S903*a* and S904*a* are the same as steps S501*a* and S502*a*. For related implementations, refer to descriptions in the embodiment shown in FIG. 5A, FIG. 5B, and FIG. 5C. Details are not described herein again.

S903*b* and S904*b*: Steps S903*b* and S904*b* may be similar to steps S903*a* and S904*a*. A difference is as follows: The first UPF network element in steps S903*a* and S904*a* is replaced with the second UPF network element. For related descriptions, refer to descriptions in steps S903*a* and S904*a*. Details are not described herein again.

It should be noted that step S901, step S902*a*, step S902*b*, steps S903*a* and S904*a*, and steps S903*b* and S904*b* are not subject to a specific sequence in this embodiment of this application. Any step may be performed first. Alternatively, the steps may be simultaneously performed. Alternatively, some of the steps may be simultaneously performed. This is not specifically limited in this embodiment of this application.

Optionally, the session management method provided in this embodiment of this application may further include the following one or more logical interface group list configuration procedures:

S905*a*: Step S905*a* is similar to step S503*a*. A difference is as follows: The SMF network element in step S503*a* is replaced with the NRF network element. For related descriptions, refer to descriptions in the embodiment shown in FIG. 5A, FIG. 5B, and FIG. 5C. Details are not described herein again.

S906*a* to S908*a*: Steps S906*a* to S908*a* are similar to steps S504*a* to S506*a*. A difference is as follows: First, the SMF network element in steps S504*a* to S506*a* is replaced with the NRF network element. Second, for example, as shown in FIG. 9A, FIG. 9B, FIG. 9C, and FIG. 9D, the second request message in step S906*a* may be, for example, a UPF logical interface group request. Correspondingly, for example, as shown in FIG. 9A, FIG. 9B, FIG. 9C, and FIG. 9D, the second response message in step S908 may be, for example, a UPF logical interface group response. For other related descriptions, refer to descriptions in the embodiment shown in FIG. 5A, FIG. 5B, and FIG. 5C. Details are not described herein again.

S909*a*: The NRF network element sends a ninth request message to the SMF network element that manages the first UPF network element, so that the SMF network element receives the ninth request message from the first UPF network element.

The ninth request message carries configuration information of the first logical interface group list that is allocated by the NRF to the first UPF network element and information about the one or more IP address segments corresponding to each of the one or more logical interface groups in the first logical interface group list. For related descriptions of the configuration information of the first logical interface group list and the information about the one or more IP address segments corresponding to each of the one or more logical interface groups in the first logical interface group list, refer to descriptions in step S504*a*. Details are not described herein again.

For example, as shown in FIG. 9A, FIG. 9B, FIG. 9C, and FIG. 9D, the ninth request message in this embodiment of this application may be, for example, a logical interface group request. This is not specifically limited in this embodiment of this application.

S910*a*: The SMF network element sends a ninth response message to the NRF network element, so that the NRF network element receives the ninth response message from the SMF network element.

The ninth response message is used to acknowledge that the first logical interface group list is successfully configured and the information about the one or more IP address segments corresponding to each of the one or more logical interface groups in the first logical interface group list is successfully sent.

For example, as shown in FIG. 9A, FIG. 9B, FIG. 9C, and FIG. 9D, the ninth response message in this embodiment of this application may be, for example, a logical interface group response. This is not specifically limited in this embodiment of this application.

In this embodiment of this application, descriptions are provided by using an example in which after the NRF network element, serving as a centralized management node, sends, to the first UPF network element, the configuration information of the first logical interface group list that is allocated by the NRF network element to the first UPF network element and the information about the one or more IP address segments corresponding to each of the one or more logical interface groups in the first logical interface group list, the NRF network element further sends, to the SMF network element that manages the first UPF network element, the configuration information of the first logical interface group list that is allocated by the NRF to the first UPF network element and the information about the one or more IP address segments corresponding to each of the one or more logical interface groups in the first logical interface group list. Optionally, in this embodiment of this application, if the first UPF network element is managed by only one SMF network element, after the NRF network element sends, to the first UPF network element, the configuration information of the first logical interface group list that is allocated by the NRF network element to the first UPF network element and the information about the one or more IP address segments corresponding to each of the one or more logical interface groups in the first logical interface group list, the first UPF network element actively reports, through a message to the SMF network element that manages the first UPF network element, the configuration information of the first logical interface group list that is allocated by the NRF to the first UPF network element and the information about the one or more IP address segments corresponding to each of the one or more logical interface groups in the first logical interface group list. This is not specifically limited in this embodiment of this application.

S905b to S910b: Steps S905b to S910b are similar to steps S905a to S910a. A difference is as follows: The first UPF network element in steps S905a to S910a is replaced with the second UPF network element, and the first logical interface group list in steps S905a to S910a is replaced with a second logical interface group list. For related descriptions, refer to descriptions in steps S905a to S910a. Details are not described herein again.

Steps S905a to S910a provide specific implementations in which the NRF network element configures the first logical interface group list for the first UPF network element and the first UPF network element obtains the information about the one or more IP address segments corresponding to each of the one or more logical interface groups in the first logical interface group list. Steps S905b to S910b provide specific implementations in which the NRF network element configures the second logical interface group list for the second UPF network element and the first UPF network element obtains information about one or more IP address segments corresponding to each of one or more logical interface groups in the second logical interface group list. A general description is provided herein, and details are not described below.

It should be noted that steps S905a to S910a and steps S905b to S910b are not subject to a specific sequence in this embodiment of this application. Steps S905a to S910a may be performed before steps S905b to S910b. Alternatively, steps S905b to S910b may be performed before steps S905a to S910a. Alternatively, steps S905a to S910a and steps S905b to S910b may be simultaneously performed. This is not specifically limited in this embodiment of this application.

It should be noted that, in this embodiment of this application, in a scenario in which there are a plurality of SMF network elements, logical interface groups managed by different SMF network elements do not overlap, and IP address segments that correspond to different logical interface groups and that are managed by different SMF network elements do not overlap either. In other words, a same logical interface group or a same IP address segment is managed by only one SMF network element, and can be allocated to only one UPF network element. A general description is provided herein, and details are not described below.

Figure 10:
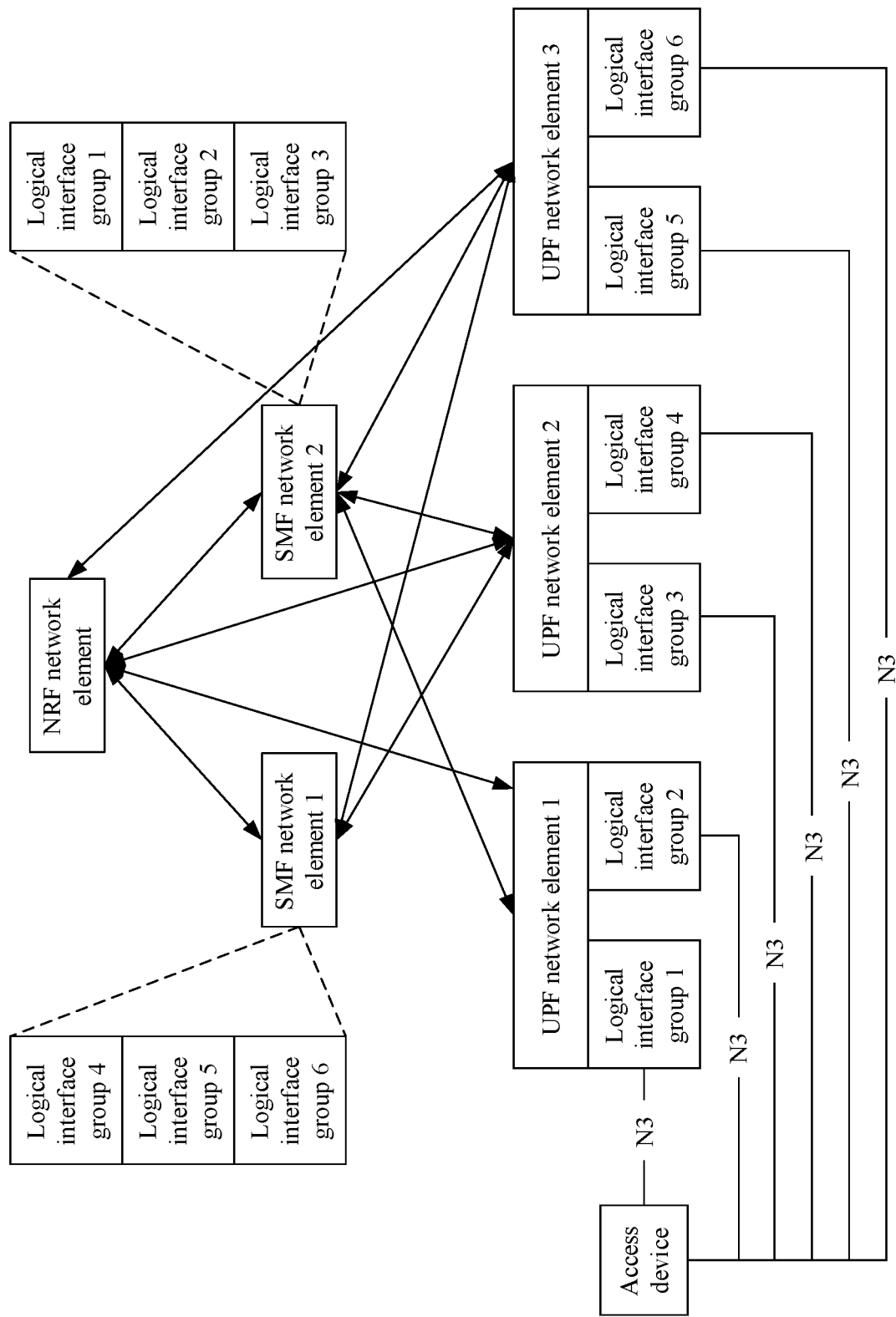
FIG. 10 is a schematic diagram 2 of configuration of a logical interface group according to an embodiment of this application.

For example, as shown in FIG. 10, an SMF network element 1 may manage a UPF network element 2 and a UPF network element 3, and an NRF network element may allocate a logical interface group 4, a logical interface group 5, and a logical interface group 6 to the SMF network element 1. In this case, the NRF network element may configure the logical interface group 4 for the UPF network element 2, and configure the logical interface group 5 and the logical interface group 6 for the UPF network element 3. In addition, the NRF network element may further send, to the UPF network element 2, information 4 about an IP address segment corresponding to the logical interface group 4, and send, to the UPF network element 3, information 5 about an IP address segment corresponding to the logical interface group 5 and information 6 about an IP address segment corresponding to the logical interface group 6. This is not shown in FIG. 10, and is not specifically limited herein.

Alternatively, for example, as shown in FIG. 10, an SMF network element 2 may manage a UPF network element 1, a UPF network element 2, and a UPF network element 3, and an NRF network element may allocate a logical interface group 1, a logical interface group 2, and a logical interface group 3 to the SMF network element 2. In this case, the NRF network element may configure the logical interface group 1 and the logical interface group 2 for the UPF network element 1, and configure the logical interface group 3 for the UPF network element 2. In addition, the NRF network element may further send, to the UPF network element 1, information 1 about an IP address segment corresponding to the logical interface group 1 and information 2 about an IP address segment corresponding to the logical interface group 2, and send, to the UPF network element 2, information 3 about an IP address segment corresponding to the logical interface group 3. This is not shown in FIG. 10, and is not specifically limited herein.

In addition, for example, as shown in FIG. 10, a logical interface group in this embodiment of this application may include the foregoing N3 address.

The session management method provided in this embodiment of this application may further include the following procedure for establishing the session (it may be understood that there is one or more terminals in the network, and a first terminal is merely used as an example for description below).

S911 to S918: Steps S911 to S918 are the same as steps S507 to S514. For related descriptions, refer to descriptions in the embodiment shown in FIG. 5A, FIG. 5B, and FIG. 5C. Details are not described herein again.

The session management method provided in this embodiment of this application may further include the following session migration procedure:

S919 and S920: Steps S919 and S920 are similar to steps S515 and S516. A difference is as follows: First, the SMF network element in steps S515 and S516 is replaced with the NRF network element. Second, for example, as shown in FIG. 9A, FIG. 9B, FIG. 9C, and FIG. 9D, the fifth request message in step S919 may be, for example, a UPF node report request (UPF node report request). Third, optionally, in this embodiment of this application, the first UPF network element may periodically report one or more of the one or more running statuses of the one or more logical interface groups in the first logical interface group list or the running status of the first UPF network element through a UPF heartbeat request (UPF heartbeat request) message. This is not specifically limited in this embodiment of this application. For other related descriptions, refer to descriptions in the embodiment shown in FIG. 5A, FIG. 5B, and FIG. 5C. Details are not described herein again.

For example, if the first UPF network element is the UPF network element 1 in FIG. 10, when a running status reported by the UPF network element 1 includes a running status of the UPF network element 1, if the running status of the UPF network element 1 is faulty, both the logical interface group 1 and the logical interface group 2 on the UPF network element 1 are considered to be faulty. Alternatively, when only a running status of the logical interface group 1 in the running status reported by the UPF network element 1 is faulty, it can be determined that the logical interface group 1 on the UPF network element 1 is faulty.

S921 to S924: Steps S921 to S924 are similar to steps S517 to S520. A difference is as follows: First, the SMF network element in steps S518 to S520 is replaced with the NRF network element. Second, for example, as shown in FIG. 9A, FIG. 9B, FIG. 9C, and FIG. 9D, the sixth request message in step S922 may be, for example, a UPF logical interface group request. Correspondingly, for example, as shown in FIG. 9A, FIG. 9B, FIG. 9C, and FIG. 9D, the sixth response message in step S924 may be, for example, a UPF logical interface group response. For other related descriptions, refer to descriptions in steps S517 to S520. Details are not described herein again.

Figure 11:
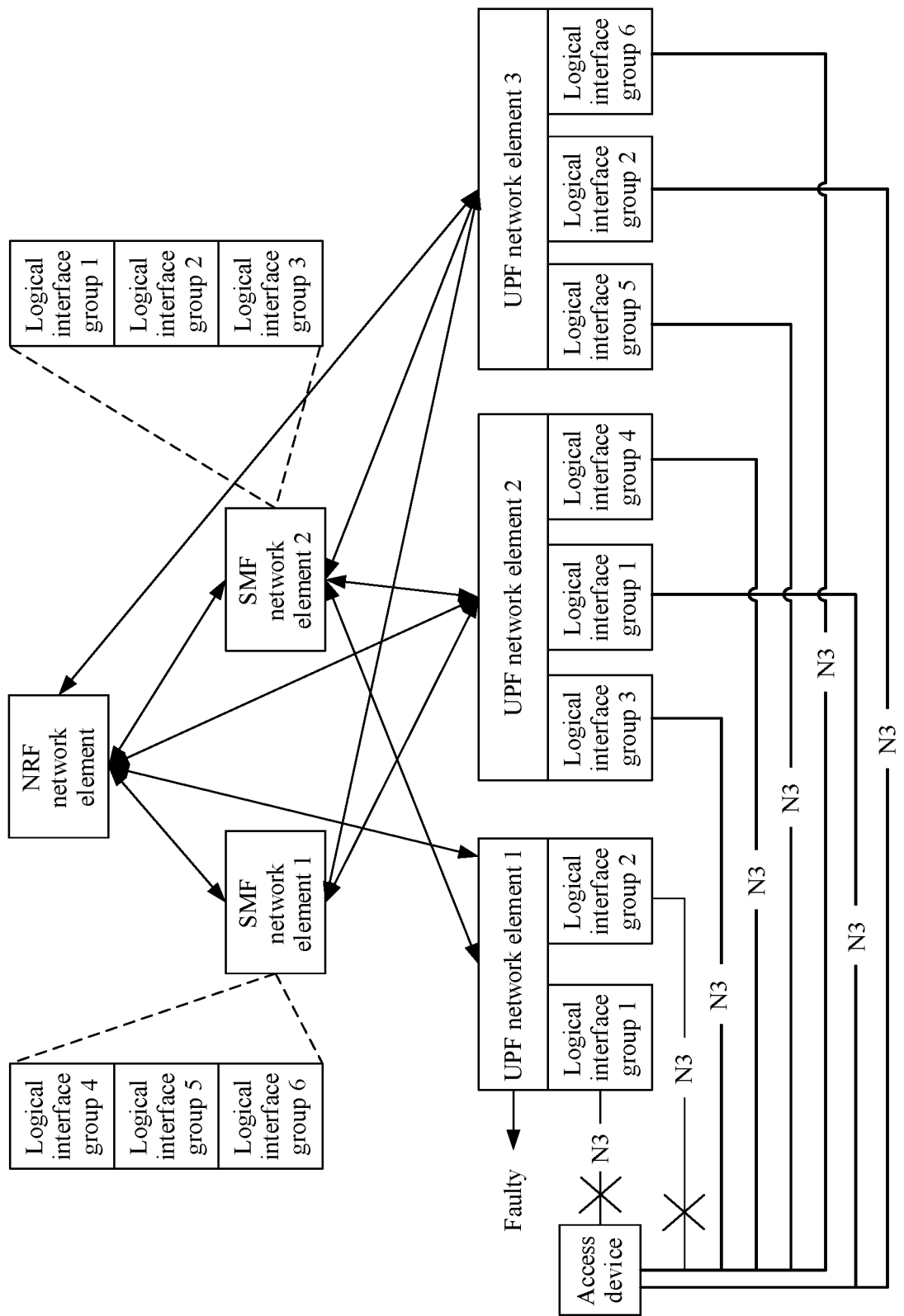
FIG. 11 is a schematic diagram 2 of restoration of a logical interface group according to an embodiment of this application.

For example, if the first UPF network element is the UPF network element 1 in FIG. 10, and if the running status of the UPF network element 1 is faulty, the logical interface group 1 on the UPF network element 1 may be migrated to the UPF network element 2, and the logical interface group 2 on the UPF network element 1 may be migrated to the UPF network element 3. A result is shown in FIG. 11. In addition, when the logical interface group 1 on the UPF network element 1 is migrated to the UPF network element 2, the information 1 about the IP address segment corresponding to the logical interface group 1 may also be sent to the UPF network element 2; and when the logical interface group 2 on the UPF network element 1 is migrated to the UPF network element 3, the information 2 about the IP address segment corresponding to the logical interface group 2 may also be sent to the UPF network element 3. This is not shown in FIG. 11, and is not specifically limited in this embodiment of this application.

S925: The NRF network element sends a tenth request message to the SMF network element, so that the SMF network element receives the tenth request message from the NRF network element.

The tenth request message carries the information about the first logical interface group, and is used to request to restore, on the second UPF network element, the information about the one or more sessions corresponding to the first logical interface group. For related descriptions of the information about the first logical interface group, refer to descriptions in step S513. Details are not described herein again.

For example, as shown in FIG. 9A, FIG. 9B, FIG. 9C, and FIG. 9D, the tenth request message in step S925 may be, for example, a session restoration request (session recover request). This is not specifically limited in this embodiment of this application.

S926 to S929: Steps S926 to S929 are the same as steps S521 to S524. For related descriptions, refer to descriptions in the embodiment shown in FIG. 5A, FIG. 5B, and FIG. 5C. Details are not described herein again.

After the SMF network element restores the information about the one or more sessions corresponding to the first logical interface group, optionally, the session management method provided in this embodiment of this application may further include the following steps.

S930: The SMF network element sends a tenth response message to the NRF network element, so that the NRF network element receives the tenth response message from the SMF network element.

The tenth response message is used to acknowledge that the information about the one or more sessions corresponding to the first logical interface group has been successfully restored on the second UPF network element.

For example, as shown in FIG. 9A, FIG. 9B, FIG. 9C, and FIG. 9D, the tenth response message in step S930 may be, for example, a session restoration response (session recover response). This is not specifically limited in this embodiment of this application.

S931: The NRF network element has established a correspondence between the restored information about the first logical interface group and the second UPF network element.

In steps S919 to S931, specific implementations of restoring the configuration information of the first logical interface group, restoring the information about the first IP address segment corresponding to the first logical interface group, and restoring the information about the one or more sessions corresponding to the first logical interface group are provided by using an example in which one or more of the running status of the first logical interface group or the running status of the first UPF network element are reported and it is determined that the first logical interface group on the first UPF network element is faulty. Certainly, if a plurality of logical interface groups on the first UPF network element are faulty, for a manner of restoring configuration information of any logical interface group in the plurality of logical interface groups and information about an IP address segment corresponding to the logical interface group, refer to steps S922 to S924; and for a manner of restoring information about one or more sessions corresponding to a logical interface group, refer to steps S925 to S931. Details are not described herein again. In addition, in this embodiment of this application, the NRF network element may alternatively obtain a running status of the second UPF network element, and migrate the session based on the running status of the second UPF network element. For related descriptions, refer to descriptions in steps S919 to S931. Details are not described herein again.

It should be noted that steps S922 to S924 and steps S919 to S931 are not subject to a specific sequence in this embodiment of this application. Steps S922 to S924 may be performed before steps S919 to S931. Alternatively, steps S919 to S931 may be performed before steps S922 to S924. Alternatively, steps S922 to S924 and steps S919 to S931 may be simultaneously performed. This is not specifically limited in this embodiment of this application.

In addition, after the configuration information of the first logical interface group and the information about the IP address segment corresponding to the first logical interface group are migrated to the second UPF network element, for a method for establishing, for a new terminal, a session corresponding to the first logical interface, refer to steps S911 to S918. Details are not described herein again.

According to the session management method provided in this embodiment of this application, the NRF network element may be used as a centralized management node of UPF network elements, to monitor running statuses of the UPF network elements or a running status of a logical interface group on a UPF network element, and the NRF network element actively initiates a procedure for restoring configuration information of a faulty logical interface group on the UPF network element, a procedure for restoring information about an IP address segment corresponding to the faulty logical interface group, and a procedure for restoring information about one or more sessions corresponding to the faulty logical interface group. This is different from the prior art in which a UPF network element autonomously migrates a session. This can avoid a prior-art problem caused by migration autonomously performed by the UPF network element. For example, the session can be flexibly taken over after the UPF network element is faulty, a complex function of managing a backup relationship between a plurality of UPF network elements is avoided, and a large quantity of overheads caused by processing session backup messages between the UPF network elements can be avoided. In other words, session management on the UPF network element can be implemented in a convenient manner.

The actions of the SMF network element, the NRF network element, the first UPF network element, and the second UPF network element in steps S901 to S931 may be performed by the processor 401, by invoking the application program code stored in the memory 403, in the communications device 400 shown in FIG. 4. This is not limited in this embodiment.

In this embodiment shown in FIG. 9A, FIG. 9B, FIG. 9C, and FIG. 9D, descriptions are provided by using an example in which the NRF network element monitors one or more of the running status of the first UPF network element or the running status of the first logical interface group on the first UPF network element. Optionally, in this embodiment of this application, the SMF network element may monitor one or more of the running status of the first UPF network element or the running status of the first logical interface group on the first UPF network element. In this case, steps S919 and S920 in this embodiment shown in FIG. 9A, FIG. 9B, FIG. 9C, and FIG. 9D may be replaced with steps S515 and S516 in the embodiment shown in FIG. 5A, FIG. 5B, and FIG. 5C. After the SMF network element determines that the first logical interface group on the first UPF network element is faulty, the SMF network element may send a request message to the NRF network element, where the request message carries the information about the first logical interface group, and is used to request to reselect a UPF network element for the first logical interface group. Further, the NRF network element may learn that the first logical interface group needs to be migrated, and then continue to perform steps S921 to S931. For related descriptions, refer to descriptions in the embodiment shown in FIG. 9A, FIG. 9B, FIG. 9C, and FIG. 9D. Details are not described herein again.

Figure 12A:
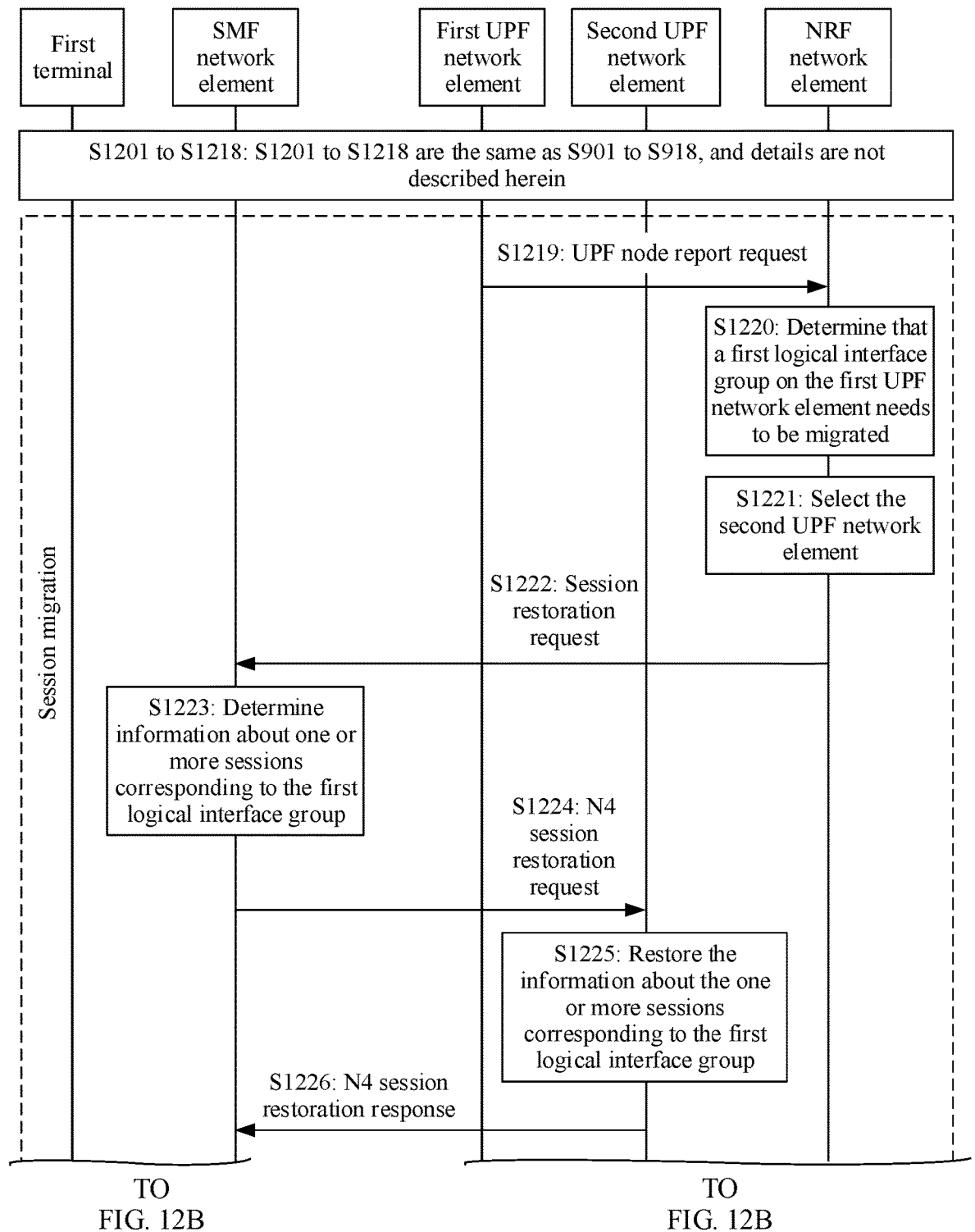
FIG. 12A and FIG. 12B are a schematic flowchart 4 of a session management method according to an embodiment of this application.
Figure 12B:
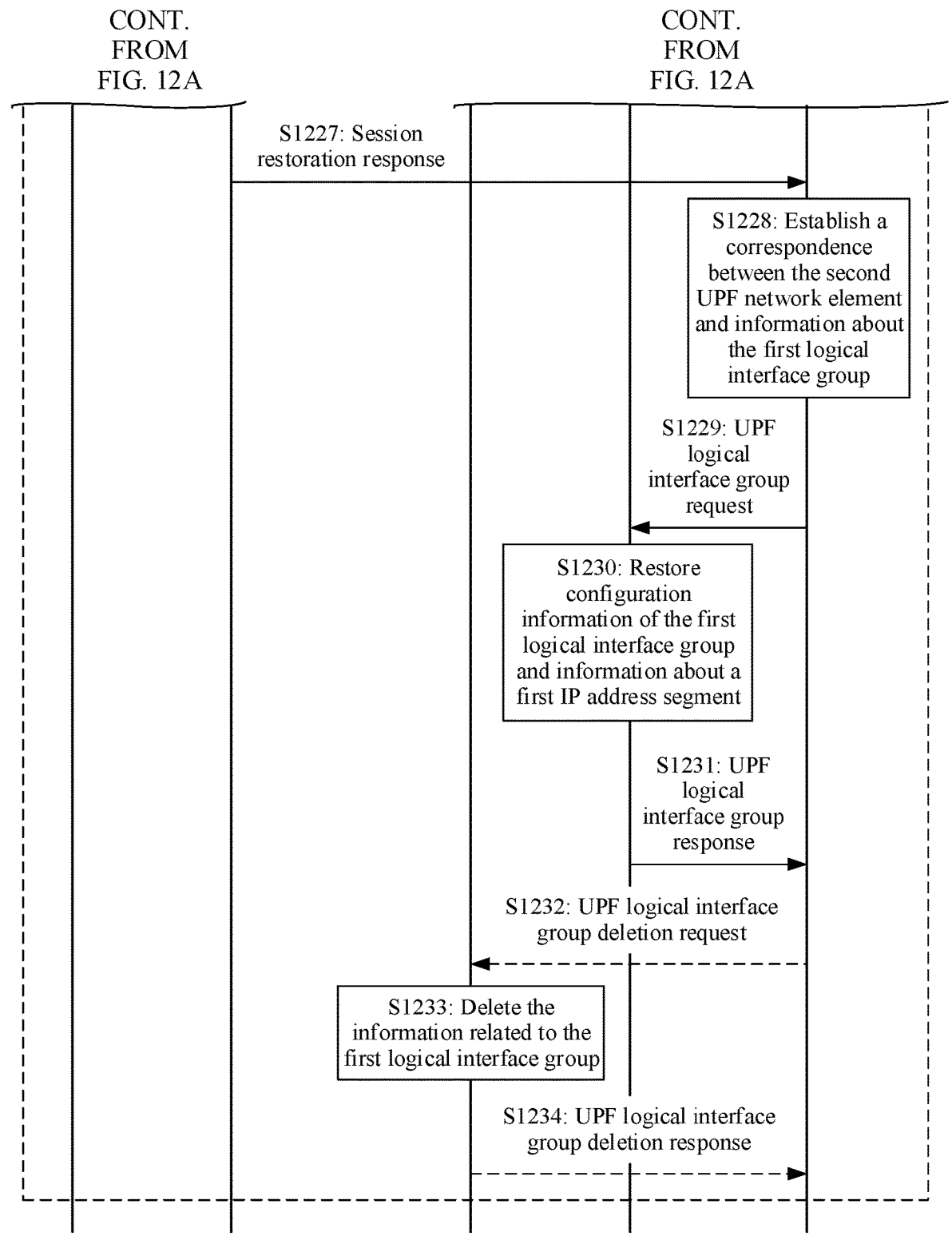
Figure 13A:
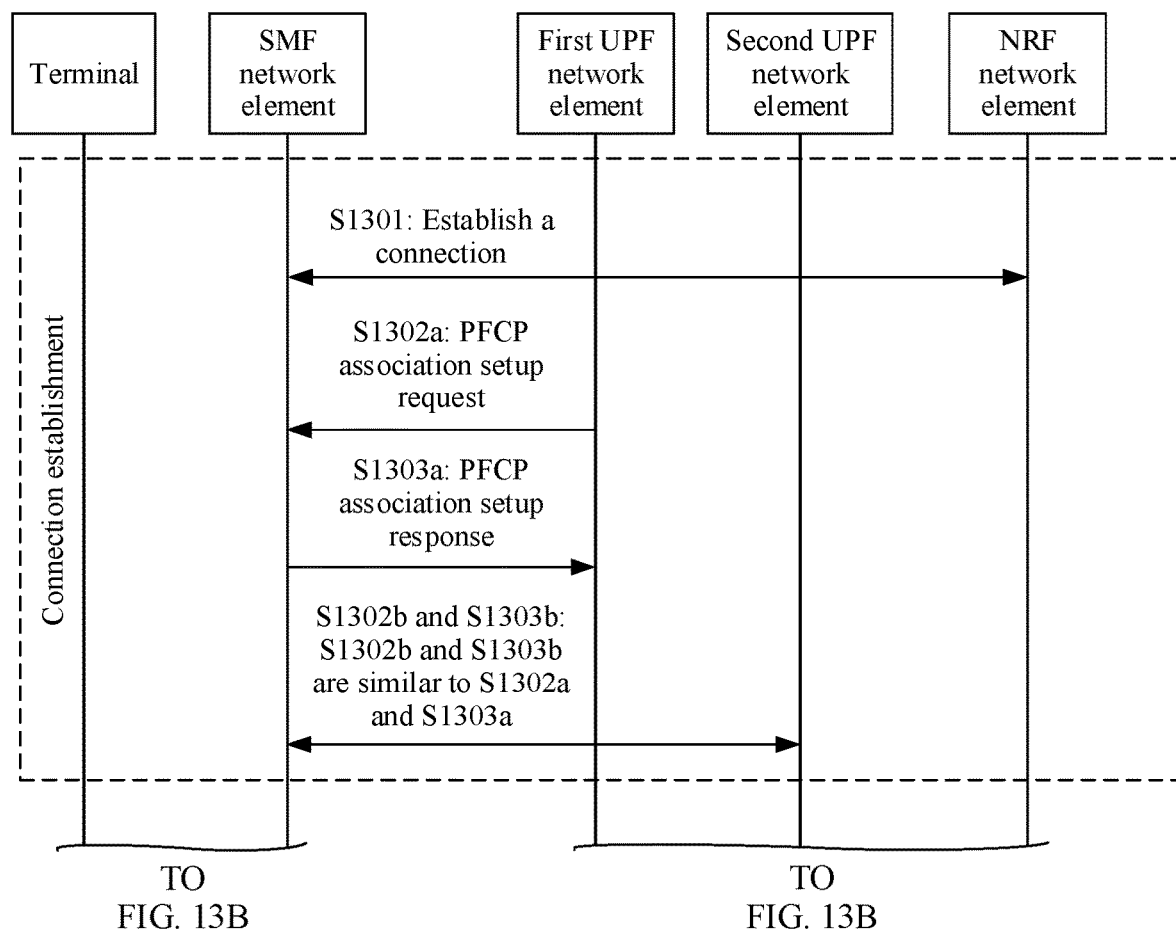
FIG. 13A, FIG. 13B, FIG. 13C, and FIG. 13D are a schematic flowchart 5 of a session management method according to an embodiment of this application.
Figure 13B:
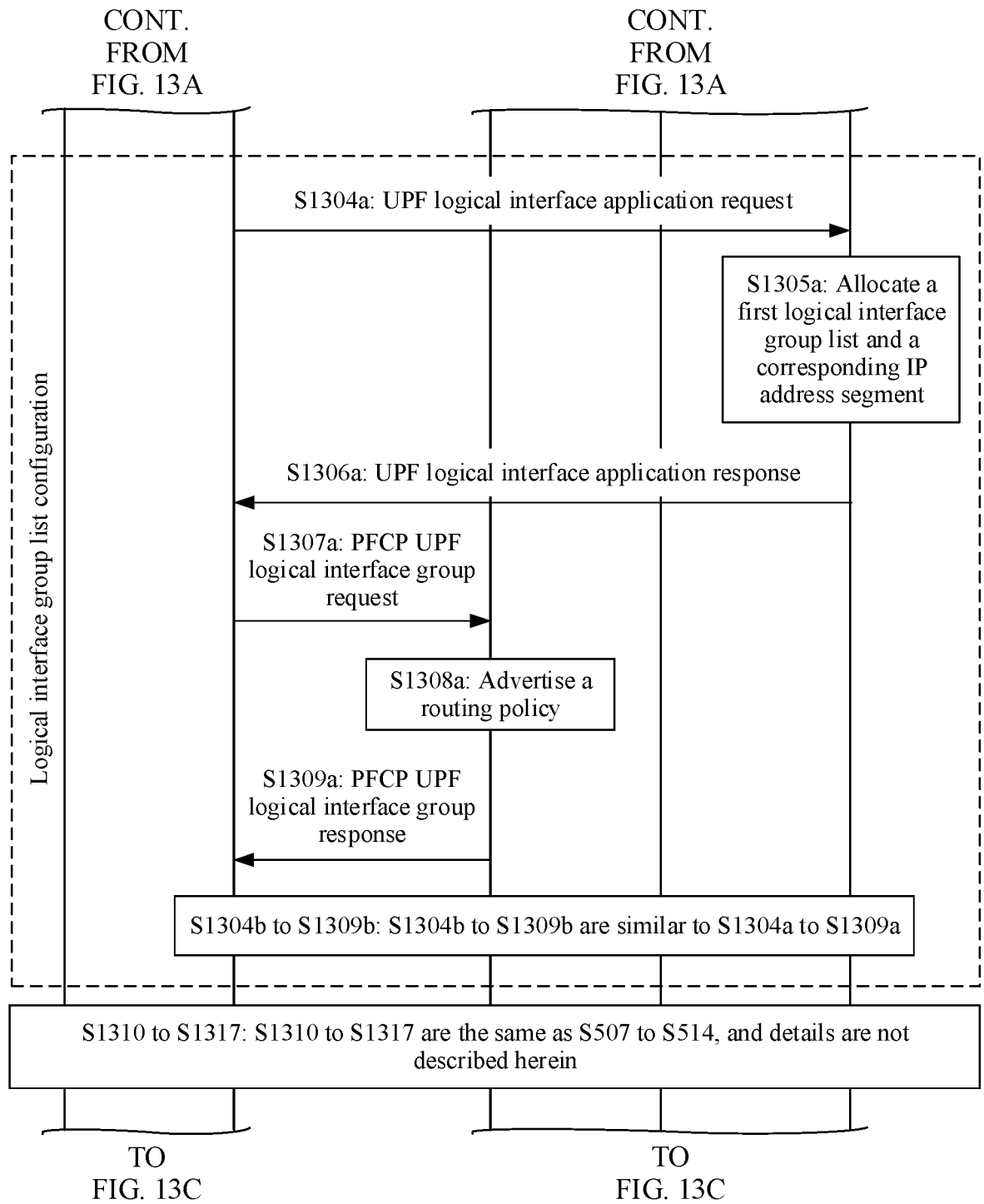
Figure 13C:
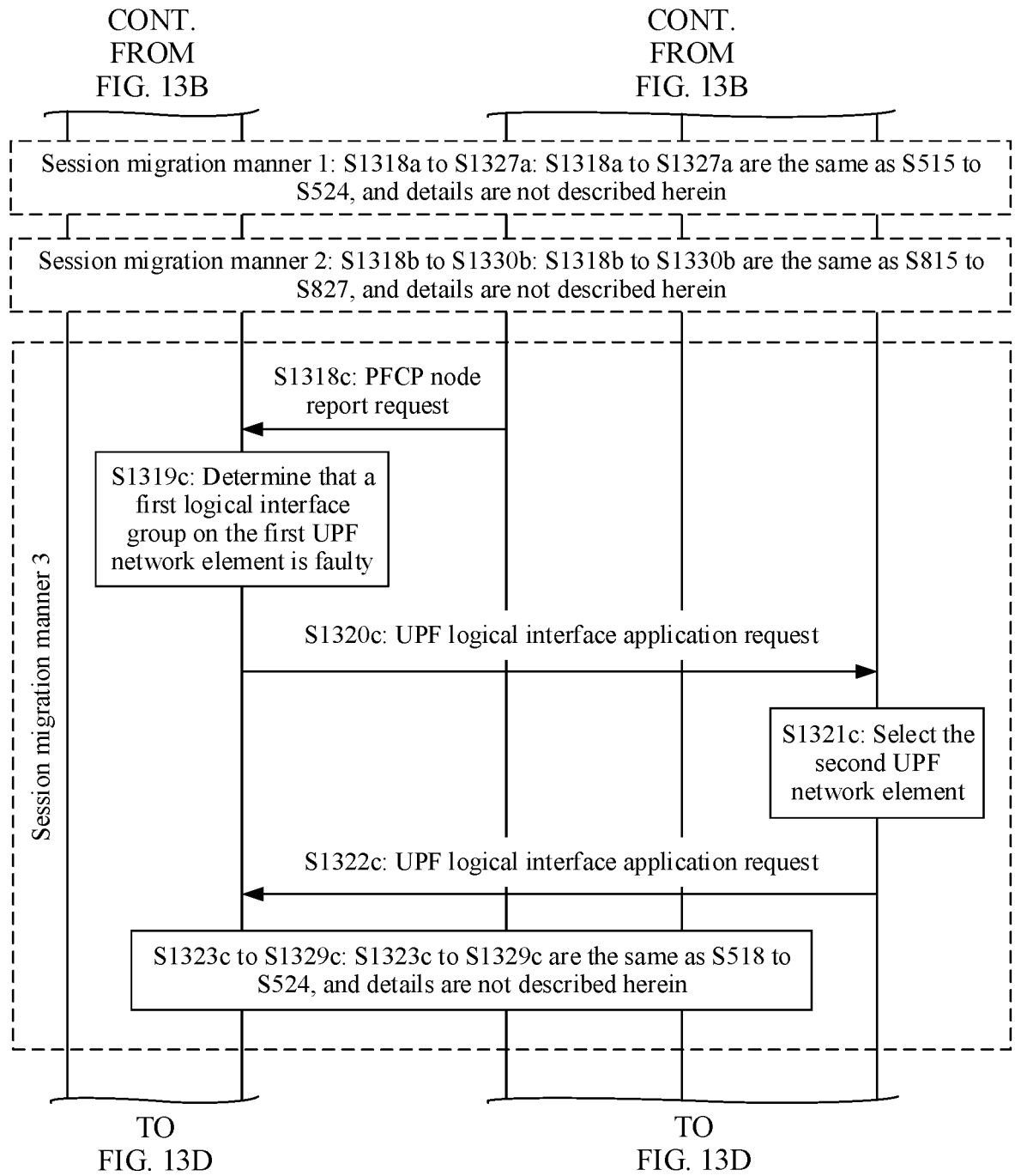
Figure 13D:
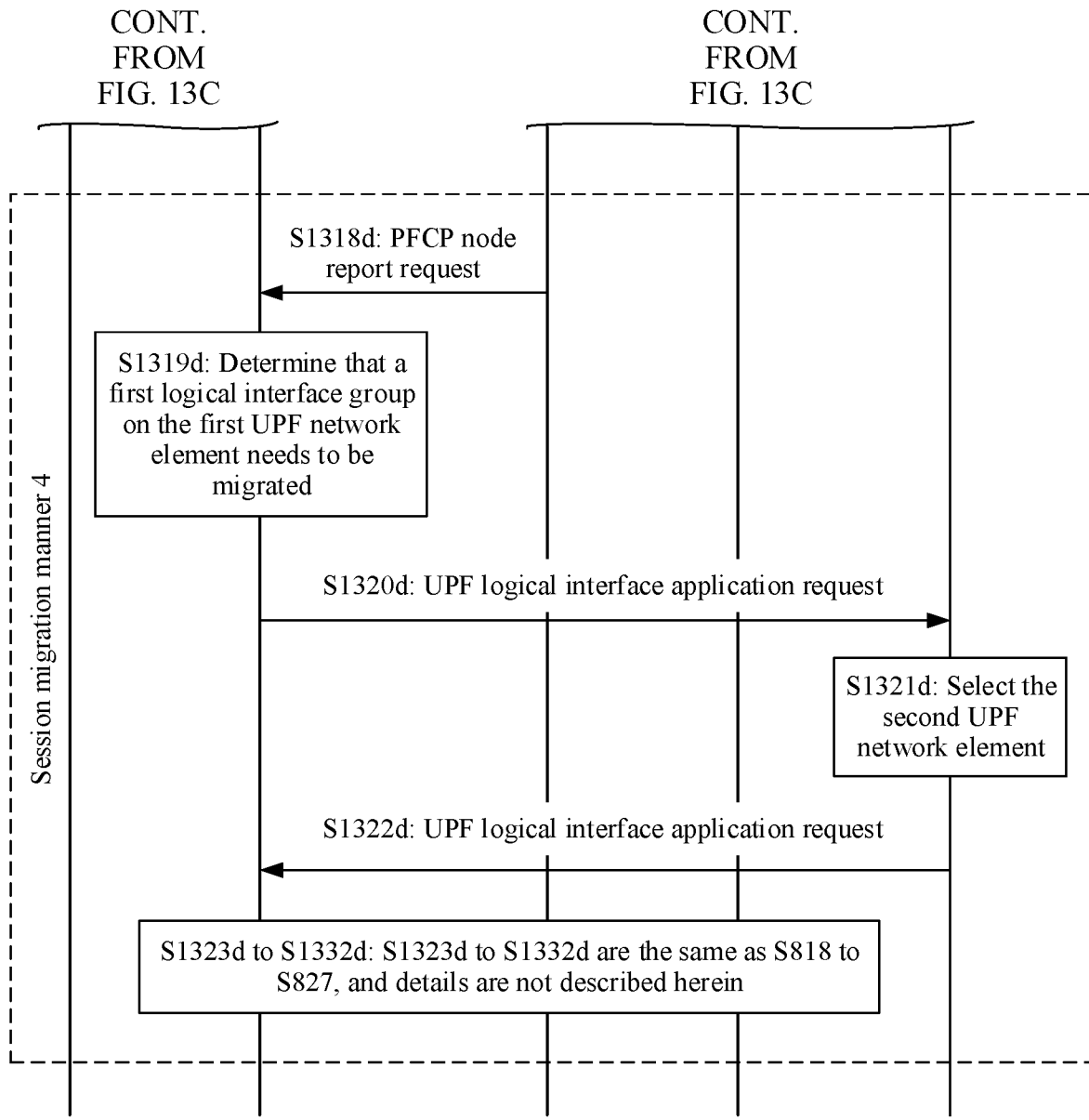

Optionally, in an example, the session management system shown in FIG. 1 is applied to the 5G network shown in FIG. 2, the network device is an NRF network element, and a migration scenario is an overload scenario or a load balancing scenario. FIG. 12A and FIG. 12B show another session management method according to an embodiment of this application. The session management method includes the following steps.

S1201 to S1218: Steps S1201 to S1218 are the same as steps S901 to S918. For related descriptions, refer to descriptions in the embodiment shown in FIG. 9A, FIG. 9B, FIG. 9C, and FIG. 9D. Details are not described herein again.

The session management method provided in this embodiment of this application may further include the following session migration procedure:

S1219: Step S1219 is similar to step S919. A difference is as follows: One or more of the one or more running statuses of the one or more logical interface groups in the first logical interface group list or the running status of the first UPF network element are reported in step S919, while load information of the first UPF network element is reported in step S1219. For other related descriptions, refer to descriptions in step S919. Details are not described herein again.

S1220: Step S1220 is similar to step S816. An only difference is as follows: The SMF network element in step S816 is replaced with the NRF network element. For related descriptions, refer to descriptions in step S816. Details are not described herein again.

S1221: Step S1221 is the same as step S921. For related descriptions, refer to descriptions in the embodiment shown in FIG. 9A and FIG. 9B. Details are not described herein again.

S1222 to S1228: Steps S1222 to S1228 are the same as steps S925 to S931. For related descriptions, refer to descriptions in the embodiment shown in FIG. 9A, FIG. 9B, FIG. 9C, and FIG. 9D. Details are not described herein again.

Optionally, after the NRF network element receives the tenth response message from the SMF network element, the session management method provided in this embodiment of this application further includes the following steps.

S1229 to S1231: Steps S1229 to S1231 are the same as steps S922 to S924. For related descriptions, refer to descriptions in the embodiment shown in FIG. 9A, FIG. 9B, FIG. 9C, and FIG. 9D. Details are not described herein again.

In steps S1219 to S1231, specific implementations of restoring the configuration information of the first logical interface group, restoring the information about the first IP address segment corresponding to the first logical interface group, and restoring the information about the one or more sessions corresponding to the first logical interface group are provided by using an example in which the load information of the first UPF network element is reported and it is determined that the first logical interface group on the first UPF network element needs to be migrated. Certainly, if a plurality of logical interface groups on the first UPF network element need to be migrated, for a manner of restoring configuration information of any logical interface group in the plurality of logical interface groups and information about an IP address segment corresponding to the logical interface group, refer to steps S1229 to S1231; and for a manner of restoring information about one or more sessions corresponding to a logical interface group, refer to steps S1222 to S1228. Details are not described herein again. In addition, in this embodiment of this application, the NRF network element may alternatively obtain load information of the second UPF network element, and migrate the session based on the load information of the second UPF network element. For related descriptions, refer to descriptions in steps S1219 to S1231. Details are not described herein again.

Optionally, the session management method provided in this embodiment of this application may further include the following steps.

S1232 to S1234: Steps S1232 to S1234 are similar to steps S825 to S827. A difference is as follows: First, the SMF network element in steps S825 to S827 is replaced with the NRF network element. Second, for example, as shown in FIG. 12A and FIG. 12B, the eighth request message in step S1232 may be, for example, a UPF logical interface group deletion request. Correspondingly, for example, as shown in FIG. 12A and FIG. 12B, the eighth request message in step S1232 may be, for example, a UPF logical interface group deletion response. Third, optionally, in this embodiment of this application, the information about the one or more sessions corresponding to the first logical interface group and information about a session established for a terminal corresponding to the first logical interface group may alternatively be deleted by the NRF network element through a session deletion request (session delete request), where the information about the one or more sessions corresponding to the first logical interface group and the information about the session established for the terminal corresponding to the first logical interface group are included in the information related to the first logical interface group. This is not specifically limited in this embodiment of this application. For other related descriptions, refer to descriptions in the embodiment shown in FIG. 8A and FIG. 8B. Details are not described herein again.

Steps S1232 to S1234 provide an example of a manner of deleting the information related to the first logical interface group on the first UPF network element. Certainly, if another logical interface group on the first UPF network element needs to be migrated, or a logical interface group on another UPF network element needs to be migrated, for a manner of deleting information related to the logical interface group, refer to descriptions in steps S1232 to S1234. Details are not described herein again.

According to the session management method provided in this embodiment of this application, the NRF network element may be used as a centralized management node of UPF network elements, to monitor load information of the UPF network elements, and the NRF network element actively initiates a procedure for restoring configuration information of a logical interface group that needs to be migrated, a procedure for restoring information about an IP address segment corresponding to the logical interface group that needs to be migrated, and a procedure for restoring information about one or more sessions corresponding to the logical interface group that needs to be migrated. This is different from the prior art in which a UPF network element autonomously migrates a session. This can avoid a prior-art problem caused by migration autonomously performed by the UPF network element. For example, the session can be flexibly taken over from an overloaded UPF network element or a UPF network element for which load needs to be balanced, load balancing between a plurality of UPF network elements can be implemented, a complex function of managing a backup relationship between the plurality of UPF network elements is avoided, and a large quantity of overheads caused by processing session backup messages between the UPF network elements can be avoided. In other words, session management on the UPF network element can be implemented in a convenient manner. Optionally, in this embodiment of this application, during session migration, the information about the one or more sessions corresponding to the logical interface group that needs to be migrated may be first restored (as described in steps S1222 to S1228), and then the configuration information of the logical interface group that needs to be migrated and the information about the IP address segment corresponding to the logical interface group that needs to be migrated may be restored (as described in steps S1229 to S1231). This can reduce service interruption during the session migration, and can maintain service continuity. It may be understood that, in another possible implementation, steps S1222 to S1228 and steps S1229 to S1231 are not subject to a specific sequence. Optionally, in this embodiment of this application, after the session migration, information that is related to the migrated logical interface group and that is on the first UPF network element (namely, a source UPF network element) may be deleted. On one hand, this can save storage space of the first UPF network element, and reduce a waste of resources. On the other hand, this can avoid a session failure that may be caused because all data is automatically resumed on the first UPF network element according to the remaining routing policy without being perceived by the SMF network element when the second UPF network element (namely, a target UPF network element) is faulty subsequently.

The actions of the SMF network element, the NRF network element, the first UPF network element, and the second UPF network element in steps S1201 to S1234 may be performed by the processor 401, by invoking the application program code stored in the memory 403, in the communications device 400 shown in FIG. 4. This is not limited in this embodiment.

In this embodiment shown in FIG. 12A and FIG. 12B, descriptions are provided by using an example in which the NRF network element monitors the load information of the first UPF network element. Optionally, in this embodiment of this application, the SMF network element may alternatively monitor the load information of the first UPF network element. In this case, steps S1219 and S1220 in this embodiment shown in FIG. 12A and FIG. 12B may be replaced with steps S815 and S816 in the embodiment shown in FIG. 8A and FIG. 8B. After the SMF network element determines that the first logical interface group on the first UPF network element needs to be migrated, the SMF network element may send a request message to the NRF network element, where the request message carries the information about the first logical interface group, and is used to request to reselect a UPF network element for the first logical interface group. Further, the NRF network element may learn that the first logical interface group needs to be migrated, and then continue to perform steps S1221 to S1234. For related descriptions, refer to descriptions in the embodiment shown in FIG. 12A and FIG. 12B. Details are not described herein again.

Optionally, in an example, the session management system shown in FIG. 1 is applied to the 5G network shown in FIG. 2, the network device is an SMF network element, and a migration scenario is a fault scenario, an overload scenario, or a load balancing scenario. FIG. 13A, FIG. 13B, FIG. 13C, and FIG. 13D show another session management method according to an embodiment of this application. The session management method includes the following steps.

Optionally, the session management method provided in this embodiment of this application may include the following one or more connection establishment procedures:

S1301: The SMF network element establishes a connection to an NRF network element.

For a related implementation of step S901, refer to an existing implementation. Details are not described herein.

S1302*a* and S1303*a*: Steps 1302*a* and 1303*a* are the same as steps S501*a* and S502*a*. For related implementations, refer to descriptions in the embodiment shown in FIG. 5A, FIG. 5B, and FIG. 5C. Details are not described herein again.

S1302*b* and S1303*b*: Steps S1302*b* and S1303*b* may be similar to steps S1302*a* and S1303*a*. A difference is as follows: The first UPF network element in steps S1302*a* and S1303*a* is replaced with a second UPF network element. For related descriptions, refer to descriptions in steps S1302*a* and S1303*a*. Details are not described herein again.

It should be noted that step S1301, steps S1302*a* and S1303*a*, and steps S1302*b* and S1303*b* are not subject to a specific sequence in this embodiment of this application. Any step may be performed first. Alternatively, the steps may be simultaneously performed. Alternatively, some of the steps may be simultaneously performed. This is not specifically limited in this embodiment of this application.

Optionally, the session management method provided in this embodiment of this application may further include the following one or more logical interface group list configuration procedures:

S1304*a*: After the SMF network element establishes the connection to the NRF and the SMF network element establishes a connection to the first UPF network element, the SMF network element sends an eleventh request message to the NRF network element, so that the NRF network element receives the eleventh request message from the SMF network element.

The eleventh request message carries an identifier of the first UPF network element, and is used to request to allocate, to the first UPF network element, a first logical interface group list and one or more IP address segments corresponding to each of one or more logical interface groups in the first logical interface group list.

For example, as shown in FIG. 13A, FIG. 13B, FIG. 13C, and FIG. 13D, the eleventh request message in this embodiment of this application may be, for example, a UPF logical interface application request (UPF logic interface apply request). This is not specifically limited in this embodiment of this application.

S1305a: Step S1305a is the same as step S905a. For related descriptions, refer to descriptions in the embodiment shown in FIG. 9A, FIG. 9B, FIG. 9C, and FIG. 9D. Details are not described herein again.

S1306a: The NRF network element sends an eleventh response message to the SMF network element, so that the SMF network element receives the eleventh response message from the NRF network element.

The eleventh response message carries configuration information of the first logical interface group list that is allocated by the NRF network element to the first UPF network element and information about the one or more IP address segments corresponding to each of the one or more logical interface groups in the first logical interface group list.

For example, as shown in FIG. 13A, FIG. 13B, FIG. 13C, and FIG. 13D, the eleventh response message in this embodiment of this application may be, for example, a UPF logical interface application response (UPF logic interface apply response). This is not specifically limited in this embodiment of this application.

Optionally, the configuration information of the first logical interface group list and the information about the one or more IP address segments corresponding to each of the one or more logical interface groups in the first logical interface group list may be sent to the SMF network element through a plurality of messages. For related descriptions, refer to descriptions in steps S504a and S506a in the embodiment shown in FIG. 5A, FIG. 5B, and FIG. 5C. Details are not described herein again.

S1307a to S1309a: Steps S1307a to S1309a are the same as steps 504a to S506a. For related descriptions, refer to descriptions in the embodiment shown in FIG. 5A, FIG. 5B, and FIG. 5C. Details are not described herein again.

S1304b to S1309b: Steps S1304b to S1309b are similar to steps S1304a to S1309a. A difference is as follows: The first UPF network element in steps S1304a to S1309a is replaced with a second UPF network element, and the first logical interface group list in steps S1304a to S1309a is replaced with a second logical interface group list. For related descriptions, refer to descriptions in steps S1304a to S1309a. Details are not described herein again.

It should be noted that steps S1304a to S1309a and steps S1304b to S1309b are not subject to a specific sequence in this embodiment of this application. Steps S1304a to S1309a may be performed before steps S1304b to S1309b. Alternatively, steps S1304b to S1309b may be performed before steps S1304a to S1309a. Alternatively, steps S1304a to S1309a and steps S1304b to S1309b may be simultaneously performed. This is not specifically limited in this embodiment of this application.

For an example of configuring a logical interface group list, refer to the example shown in FIG. 10. Details are not described herein again.

The session management method provided in this embodiment of this application may further include the following procedure for establishing the session (it may be understood that there is one or more terminals in the network, and a first terminal is merely used as an example for description below).

S1310 to S1317: Steps S1310 to S1317 are the same as steps S507 to S514. For related descriptions, refer to descriptions in the embodiment shown in FIG. 5A, FIG. 5B, and FIG. 5C. Details are not described herein again.

The session management method provided in this embodiment of this application may further include the following session migration manner 1.

S1318a to S1327a: Steps S1318a to S1327a are the same as steps S515 to S524. For related descriptions, refer to descriptions in the embodiment shown in FIG. 5A, FIG. 5B, and FIG. 5C. Details are not described herein again.

Alternatively, the session management method provided in this embodiment of this application may further include the following session migration manner 2.

S1318b to S1330b: Steps S1318b to S1330b are the same as steps S815 to S827. For related descriptions, refer to descriptions in the embodiment shown in FIG. 8A and FIG. 8B. Details are not described herein again.

Alternatively, the session management method provided in this embodiment of this application may further include the following session migration manner 3.

S1318c and S1319c: Steps S1318c and S1319c are the same as steps S515 and S516. For related descriptions, refer to descriptions in the embodiment shown in FIG. 5A, FIG. 5B, and FIG. 5C. Details are not described herein again.

S1320c: The SMF network element sends a twelfth request message to the NRF network element, so that the NRF network element receives the twelfth request message from the SMF network element.

The twelfth request message carries the identifier of the first UPF network element and information about the first logical interface group that needs to be migrated, and is used to request to reselect a UPF network element for the first logical interface group. For related descriptions of the information about the first logical interface group, refer to descriptions in step S513 in the embodiment shown in FIG. 5A, FIG. 5B, and FIG. 5C. Details are not described herein again.

For example, as shown in FIG. 13A, FIG. 13B, FIG. 13C, and FIG. 13D, the twelfth request message in this embodiment of this application may be, for example, a UPF logical interface application request. This is not specifically limited in this embodiment of this application.

S1321c: The NRF network element selects the second UPF network element for the first logical interface group.

Optionally, in this embodiment of this application, when the NRF network element reselects, for the first logical interface group, a UPF network element that can take over, the NRF network element may consider factors such as a running status and load information of the UPF network element. For details, refer to an existing manner of selecting a UPF network element by an NRF network element or an SMF network element. This is not specifically limited in this embodiment of this application.

S1322c: The NRF network element sends a twelfth response message to the SMF network element, so that the SMF network element receives the twelfth response message from the NRF network element.

The twelfth response message carries an identifier of the second UPF network element and the information about the first logical interface group that needs to be migrated, and is used to indicate to migrate the first logical interface group to the second UPF network element.

For example, as shown in FIG. 13A, FIG. 13B, FIG. 13C, and FIG. 13D, the twelfth response message in this embodiment of this application may be, for example, a UPF logical interface application response. This is not specifically limited in this embodiment of this application.

S1323c to S1329c: Steps S1323c to S1329c are the same as steps S518 to S524. For related descriptions, refer to descriptions in the embodiment shown in FIG. 5A, FIG. 5B, and FIG. 5C. Details are not described herein again.

Alternatively, the session management method provided in this embodiment of this application may further include the following session migration manner 4.

S1318d to S1322d: Steps S1318d to S1322d are the same as steps S1318c to S1322c. For related descriptions, refer to the manner 3. Details are not described herein again.

S1323d to S1332d: Steps S1323d to S1332d are the same as steps S818 to S827. For related descriptions, refer to descriptions in the embodiment shown in FIG. 8A and FIG. 8B. Details are not described herein again.

According to the session management method provided in this embodiment of this application, the NRF network element may be used as a centralized management node of UPF network elements, and the SMF network element may be used as a proxy management node of the UPF network elements. Further, after the SMF network element determines that a logical interface group on a UPF network element is faulty or needs to be migrated, the SMF network element actively initiates a procedure for restoring configuration information of the faulty logical interface group or the logical interface group that needs to be migrated on the UPF network element, a procedure for restoring information about an IP address segment corresponding to the faulty logical interface group or the logical interface group that needs to be migrated, and a procedure for restoring information about one or more sessions corresponding to the faulty logical interface group or the logical interface group that needs to be migrated. This is different from the prior art in which a UPF network element autonomously migrates a session. This can avoid a prior-art problem caused by migration autonomously performed by the UPF network element. For example, the session can be flexibly taken over after the UPF network element is faulty, a complex function of managing a backup relationship between a plurality of UPF network elements is avoided, and a large quantity of overheads caused by processing session backup messages between the UPF network elements can be avoided. In other words, session management on the UPF network element can be implemented in a convenient manner.

Actions of the SMF network element, the NRF network element, the first UPF network element, and the second UPF network element in steps S1301 to S1327a, S1301 to S1330b, S1301 to S1329c, or S1301 to S1332d may be performed by the processor 401, by invoking the application program code stored in the memory 403, in the communications device 400 shown in FIG. 4. This is not limited in this embodiment.

Optionally, in the embodiment shown in FIG. 8A and FIG. 8B or FIG. 13A, FIG. 13B, FIG. 13C, and FIG. 13D, descriptions are provided by using an example in which the SMF network element determines, based on load information of a UPF network element, that one or more logical interface groups on the UPF network element need to be migrated to another idle UPF network element; and in the embodiment shown in FIG. 12A and FIG. 12B, descriptions are provided by using an example in which the NRF network element determines, based on load information of a UPF network element, that one or more logical interface groups on the UPF network element need to be migrated to another idle UPF network element. Certainly, the session management method shown in FIG. 8A and FIG. 8B, FIG. 12A and FIG. 12B, or FIG. 13A, FIG. 13B, FIG. 13C, and FIG. 13D may also be used in another scenario. For example, in a scale-in (scaling in) scenario, because a UPF network element node needs to be reclaimed, a session is definitely to be migrated. In this case, the session management method shown in FIG. 8A and FIG. 8B, FIG. 12A and FIG. 12B, or FIG. 13A, FIG. 13B, FIG. 13C, and FIG. 13D may be used to migrate, to another UPF network element, configuration information of one or more logical interface groups on the UPF network element, information about one or more IP address segments corresponding to each of the one or more logical interface groups, and information about one or more sessions corresponding to each of the one or more logical interface groups. Alternatively, in a scale-out (scaling out) scenario, because a new UPF network element node needs to be created, a session is definitely to be migrated. In this case, the session management method shown in FIG. 8A and FIG. 8B, FIG. 12A and FIG. 12B, or FIG. 13A, FIG. 13B, FIG. 13C, and FIG. 13D may be used to migrate, to the newly created idle UPF network element, configuration information of one or more logical interface groups on another UPF network element, information about one or more IP address segments corresponding to each of the one or more logical interface groups, and information about one or more sessions corresponding to each of the one or more logical interface groups. A scenario in which the SMF network element or the NRF network element determines that a logical interface group needs to be migrated is not specifically limited in this embodiment of this application.

Optionally, the embodiments shown in FIG. 8A and FIG. 8B to FIG. 13A, FIG. 13B, FIG. 13C, and FIG. 13D are described by using the example in which the session management system shown in FIG. 1 is applied to the 5G network shown in FIG. 2. Certainly, as described above, the session management system shown in FIG. 1 may also be applied to the 4.5G network shown in FIG. 3 or another future network. This is not specifically limited in this embodiment of this application. If the session management system shown in FIG. 1 is applied to the 4.5G network shown in FIG. 3 or another future network, only a name of a corresponding network element, a name of a corresponding message, a name of a corresponding interface, and the like need to be replaced. For example, if the session management system shown in FIG. 1 may be applied to the 4.5G network shown in FIG. 3, correspondingly, a group of interface addresses included in configuration information of a logical interface group may be, for example, one or more of an S1-U interface address, an S5/S8-U interface address, or a Gn-U interface address; a network element, corresponding to an SMF network element, in the 4.5G network may be a GW-C; a network element, corresponding to a UPF network element, in the 4.5G network may be a GW-U network element; and an interface between the GW-C network element and the GW-U network element is Sx. Details are not described herein.

The foregoing mainly describes, from a perspective of interaction between the network elements, the solutions provided in the embodiments of this application. It may be understood that, to implement the foregoing functions, the network device, the second user plane function network element, or the session management network element includes a corresponding hardware structure and/or software module for performing each function. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the network device, the second user plane function network element, or the session management network element may be divided into functional modules based on the foregoing method examples. For example, each functional module may be obtained through division based on a corresponding function, or two or more functions may be integrated into one processing module. The integrated module may be implemented in a form of hardware, or may be implemented in a form of a software functional module. It should be noted that, in the embodiments of this application, division into the modules is an example and merely a logical function division, and may be other division in an actual implementation.

Figure 14:
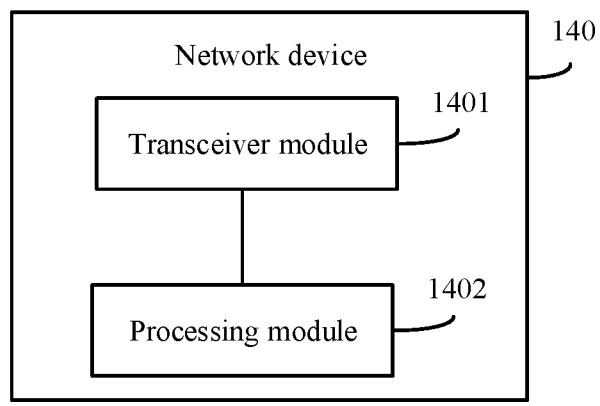
FIG. 14 is a schematic structural diagram of a network device according to an embodiment of this application.

For example, if each functional module is obtained through integration, FIG. 14 is a schematic structural diagram of a network device 140. The network device 140 includes a transceiver module 1401 and a processing module 1402. The processing module 1402 is configured to determine that a first logical interface group on a first user plane function network element needs to be migrated, where the first logical interface group includes a group of interface addresses. The processing module 1402 is further configured to determine a second user plane function network element for the first logical interface group. The transceiver module 1401 is configured to send, to the second user plane function network element, configuration information of the first logical interface group and information about a first IP address segment corresponding to the first logical interface group, to restore the configuration information of the first logical interface group and the information about the first IP address segment on the second user plane function network element. The transceiver module 1401 is further configured to send a first message, where the first message is used to restore, on the second user plane function network element, information about one or more sessions corresponding to the first logical interface group.

Optionally, the network device 140 in this embodiment of this application may include a session management network element or a service control function network element.

In a possible implementation, when the network device 140 is the session management network element, the processing module 1402 is further configured to determine, based on information about the first logical interface group, the information about the one or more sessions corresponding to the first logical interface group.

Correspondingly, that the transceiver module 1401 is configured to send a first message includes: the transceiver module 1401 is configured to send the first message to the second user plane function network element, where the first message carries the information about the one or more sessions corresponding to the first logical interface group.

In a possible implementation, when the network device 140 is the service control function network element, correspondingly, that the transceiver module 1401 is configured to send a first message includes: the transceiver module 1401 is configured to send the first message to a session management network element, where the first message carries information about the first logical interface group, and is used to indicate the session management network element to initiate a procedure for restoring the information about the one or more sessions corresponding to the first logical interface group, so that the session management network element sends a second message to the second user plane function network element, and the second message carries the information about the one or more sessions corresponding to the first logical interface group.

Optionally, that the processing module 1402 is configured to determine that a first logical interface group on a first user plane function network element needs to be migrated includes: the processing module 1402 is configured to: obtain one or more of a running status of the first user plane function network element or a running status of the first logical interface group on the first user plane function network element; and determine, based on one or more of the running status of the first user plane function network element or the running status of the first logical interface group on the first user plane function network element, that the first logical interface group on the first user plane function network element is faulty.

In a possible implementation, when the network device 140 is the session management network element, the processing module 1402 is further configured to determine, based on information about the first logical interface group, the information about the one or more sessions corresponding to the first logical interface group.

Correspondingly, that the transceiver module 1401 is configured to send a first message includes: the transceiver module 1401 is configured to send the first message to the second user plane function network element, where the second message carries the information about the one or more sessions corresponding to the first logical interface group.

That the transceiver module 1401 is configured to send, to the second user plane function network element, configuration information of the first logical interface group and information about a first IP address segment corresponding to the first logical interface group includes: the transceiver module 1401 is configured to: after receiving a third message returned by the second user plane function network element based on the first message, send, to the second user plane function network element, the configuration information of the first logical interface group and the information about the first IP address segment corresponding to the first logical interface group, where the third message is used to indicate that the information about the one or more sessions corresponding to the first logical interface group has been successfully restored on the second user plane function network element.

In a possible implementation, when the network device 140 is the service control function network element, correspondingly, that the transceiver module 1401 is configured to send a first message includes: the transceiver module 1401 is configured to send the first message to a session management network element, where the first message carries information about the first logical interface group, and is used to indicate the session management network element to initiate a procedure for restoring the information about the one or more sessions corresponding to the first logical interface group, so that the session management network element sends a second message to the second user plane function network element, and the second message carries the information about the one or more sessions corresponding to the first logical interface group.

That the transceiver module 1401 is configured to send, to the second user plane function network element, configuration information of the first logical interface group and information about a first IP address segment corresponding to the first logical interface group includes: the transceiver module 1401 is configured to: after receiving a third message returned by the session management network element based on the first message, send, to the second user plane function network element, the configuration information of the first logical interface group and the information about the first IP address segment corresponding to the first logical interface group, where the third message is used to indicate that the information about the one or more sessions corresponding to the first logical interface group has been successfully restored on the second user plane function network element.

Optionally, that the processing module 1402 is configured to determine that a first logical interface group on a first user plane function network element needs to be migrated includes: the processing module 1402 is configured to: obtain load information of the first user plane function network element; and determine, based on the load information, that the first logical interface group on the first user plane function network element needs to be migrated.

Optionally, when the network device 140 is the session management network element, correspondingly, that the processing module 1402 is configured to determine a second user plane function network element for the first logical interface group includes: the processing module 1402 is configured to: send a fourth message to a service control function network element, where the fourth message carries an identifier of the first user plane function network element and the information about the first logical interface group, and is used to request to reselect a user plane function network element for the first logical interface group; and receive, from the service control function network element, an identifier of the second user plane function network element and the information about the first logical interface group, to indicate to migrate the first logical interface group to the second user plane function network element.

Alternatively, that the processing module 1402 is configured to determine a second user plane function network element for the first logical interface group includes: the processing module 1402 is configured to select the second user plane function network element for the first logical interface group.

Optionally, when the network device 140 is the session management network element, correspondingly, the transceiver module 1401 is further configured to send a fifth message to a service control function network element, where the fifth message carries an identifier of the first user plane function network element, and is used to request to allocate, to the first UPF network element, a first logical interface group list and one or more IP address segments corresponding to each of one or more logical interface groups in the first logical interface group list. The transceiver module 1401 is further configured to receive, from the service control function network element, the configuration information of the first logical interface group and the information about the first IP address segment corresponding to the first logical interface group. The transceiver module 1401 is further configured to send, to the first user plane function network element, the configuration information of the first logical interface group and the information about the first IP address segment corresponding to the first logical interface group.

Optionally, the processing module 1402 is further configured to allocate, to the first user plane function network element, the first logical interface group and the first IP address segment corresponding to the first logical interface group. The transceiver module 1401 is further configured to send, to the first user plane function network element, the configuration information of the first logical interface group and the information about the first IP address segment corresponding to the first logical interface group.

Optionally, when the network device 140 is the service control function network element, correspondingly, that the processing module 1402 is configured to determine that a first logical interface group on a first user plane function network element needs to be migrated includes: the processing module 1402 is configured to receive a sixth message from a session management network element, where the sixth message carries the information about the first logical interface group, and is used to request to reselect a user plane function network element for the first logical interface group.

Optionally, the transceiver module 1401 is further configured to send a notification message to the first user plane function network element, where the notification message is used to notify the first user plane function network element to delete the information related to the first logical interface group.

The information related to the first logical interface group includes one or more of the configuration information of the first logical interface group, the information about the first IP address segment corresponding to the first logical interface group, the information about the one or more sessions corresponding to the first logical interface group, or an advertised routing policy for the first IP address segment, and the routing policy is used to route data to the first user plane function network element.

Optionally, that the processing module 1402 is configured to determine, based on information about the first logical interface group, the information about the one or more sessions corresponding to the first logical interface group includes: the processing module 1402 is configured to determine, based on the information about the first logical interface group and a stored correspondence between the information about the first logical interface group and the information about the one or more sessions corresponding to the first logical interface group, the information about the one or more sessions corresponding to the first logical interface group.

Optionally, when the network device 140 is the session management network element, correspondingly, after determining that a session needs to be established for a first terminal, the processing module 1402 is further configured to select the first user plane function network element to serve the first terminal. The processing module 1402 is further configured to allocate a first interface address to the first terminal based on the first logical interface group on the first user plane function network element. The processing module 1402 is further configured to allocate a first IP address to the first terminal, where the first IP address is an address in the first IP address segment corresponding to the first logical interface group. The processing module 1402 is further configured to obtain, based on the first interface address, a first F-TEID corresponding to the session. The processing module 1402 is further configured to: generate information about a first session for the first terminal, and establish a correspondence between the information about the first logical interface group and the information about the first session, where the information about the first session includes one or more of the first IP address or the first F-TEID.

All related content of the steps in the foregoing method embodiments may be cited in function descriptions of corresponding functional modules. Details are not described herein again.

In this embodiment, the network device 140 is presented in a form of functional modules obtained through integration. The "module" herein may be a specific ASIC, a circuit, a processor that executes one or more software or firmware programs, a memory, an integrated logic circuit, and/or another device that can provide the foregoing functions. In a simple embodiment, a person skilled in the art may figure out that the network device 140 may be in a form shown in FIG. 4.

For example, the processor 401 in FIG. 4 may invoke a computer-executable instruction stored in the memory 403, to enable the network device 140 to perform the session management method in the foregoing method embodiments.

Specifically, functions/implementation processes of the transceiver module 1401 and the processing module 1402 in FIG. 14 may be implemented by the processor 401 in FIG. 4 by invoking the computer-executable instruction stored in the memory 403. Alternatively, a function/an implementation process of the processing module 1402 in FIG. 14 may be implemented by the processor 401 in FIG. 4 by invoking the computer-executable instruction stored in the memory 403, and a function/an implementation process of the transceiver module 1401 in FIG. 14 may be implemented by the communications interface 404 in FIG. 4.

The network device provided in this embodiment can perform the foregoing session management method. Therefore, for a technical effect that can be achieved by the network device, refer to descriptions in the foregoing method embodiments. Details are not described herein again.

Optionally, an embodiment of this application further provides an apparatus (for example, the apparatus may be a chip system). The apparatus includes a processor, configured to support a network device to implement the foregoing session management method, for example, determine that a first logical interface group on a first user plane function network element needs to be migrated. In an embodiment, the apparatus further includes a memory. The memory is configured to store a program instruction and data that are necessary for the network device. Certainly, the memory may alternatively be not in the apparatus. When the apparatus is a chip system, the apparatus may include a chip, or may include a chip and another discrete device. This is not specifically limited in this embodiment of this application.

Figure 15:
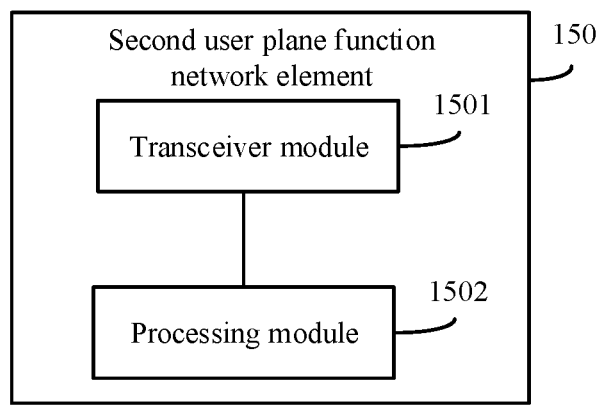
FIG. 15 is a schematic structural diagram of a second user plane function network element according to an embodiment of this application.

For example, when the functional modules are obtained through integration, FIG. 15 is a schematic structural diagram of a second user plane function network element 150. The second user plane function network element 150 includes a transceiver module 1501 and a processing module 1502. The transceiver module 1501 is configured to receive, from a network device, configuration information of a first logical interface group and information about a first IP address segment corresponding to the first logical interface group, where the first logical interface group includes a group of interface addresses. The transceiver module 1501 is further configured to receive a seventh message, where the seventh message is used to restore, on the second user plane function network element, information about one or more sessions corresponding to the first logical interface group. The processing module 1502 is configured to: restore the configuration information of the first logical interface group and the information about the first IP address segment on the second user plane function network element based on the configuration information of the first logical interface group and the information about the first IP address segment, and advertise a routing policy for the first IP address segment, where the routing policy is used to route data to the second user plane function network element. The processing module 1502 is further configured to restore, on the second user plane function network element based on the seventh message, the information about the one or more sessions corresponding to the first logical interface group.

In a possible implementation, when the network device is a session management network element, correspondingly, that the transceiver module 1501 is configured to receive a seventh message includes: the transceiver module 1501 is configured to receive the seventh message from the session management network element, where the seventh message carries the information about the one or more sessions corresponding to the first logical interface group.

In a possible implementation, when the network device is a session management network element, correspondingly, that the transceiver module 1501 is configured to receive a seventh message includes: the transceiver module 1501 is configured to receive the seventh message from the session management network element, where the seventh message carries the information about the one or more sessions corresponding to the first logical interface group.

That the transceiver module 1501 is configured to receive, from a network device, configuration information of a first logical interface group and information about a first IP address segment corresponding to the first logical interface group includes: the transceiver module 1501 is configured to: after sending a third message to the session management network element based on the seventh message, receive, from the session management network element, the configuration information of the first logical interface group and the information about the first IP address segment corresponding to the first logical interface group, where the third message is used to indicate that the information about the one or more sessions corresponding to the first logical interface group has been successfully restored on the second user plane function network element.

In a possible implementation, when the network device is a service control function network element, correspondingly, that the transceiver module 1501 is configured to receive a seventh message includes: the transceiver module 1501 is configured to receive the seventh message from a session management network element, where the seventh message carries the information about the one or more sessions corresponding to the first logical interface group.

In a possible implementation, when the network device is a service control function network element, correspondingly, that the transceiver module 1501 is configured to receive a seventh message includes: the transceiver module 1501 is configured to receive the seventh message from a session management network element, where the seventh message carries the information about the one or more sessions corresponding to the first logical interface group.

That the transceiver module 1501 is configured to receive, from a network device, configuration information of a first logical interface group and information about a first IP address segment corresponding to the first logical interface group includes: the transceiver module 1501 is configured to: after sending an eighth message to the session management network element based on the seventh message, receive, from the service control function network element, the configuration information of the first logical interface group and the information about the first IP address segment corresponding to the first logical interface group, where the eighth message is used to indicate that the information about the one or more sessions corresponding to the first logical interface group has been successfully restored on the second user plane function network element.

Optionally, the transceiver module 1501 is further configured to send one or more of a running status of the second user plane function network element, a running status of the first logical interface group on the second user plane function network element, or load information of the second user plane function network element to the session management network element. One or more of the running status of the second user plane function network element, the running status of the first logical interface group on the second user plane function network element, or the load information of the second user plane function network element are used to determine whether the first logical interface group on the second user plane function network element needs to be migrated.

Optionally, the transceiver module 1501 is further configured to send one or more of a running status of the second user plane function network element, a running status of the first logical interface group on the second user plane function network element, or load information of the second user plane function network element to the network device. One or more of the running status of the second user plane function network element, the running status of the first logical interface group on the second user plane function network element, or the load information of the second user plane function network element are used to determine whether the first logical interface group on the second user plane function network element needs to be migrated.

All related content of the steps in the foregoing method embodiments may be cited in function descriptions of corresponding functional modules. Details are not described herein again.

In this embodiment, the second user plane function network element 150 is presented in a form of functional modules obtained through integration. The "module" herein may be a specific ASIC, a circuit, a processor that executes one or more software or firmware programs, a memory, an integrated logic circuit, and/or another device that can provide the foregoing functions. In a simple embodiment, a person skilled in the art may figure out that the second user plane function network element 150 may be in a form shown in FIG. 4.

For example, the processor 401 in FIG. 4 may invoke a computer-executable instruction stored in the memory 403, to enable the second user plane function network element 150 to perform the session management method in the foregoing method embodiments.

Specifically, functions/implementation processes of the transceiver module 1501 and the processing module 1502 in FIG. 15 may be implemented by the processor 401 in FIG. 4 by invoking the computer-executable instruction stored in the memory 403. Alternatively, a function/an implementation process of the processing module 1502 in FIG. 15 may be implemented by the processor 401 in FIG. 4 by invoking the computer-executable instruction stored in the memory 403, and a function/an implementation process of the transceiver module 1501 in FIG. 15 may be implemented by the communications interface 404 in FIG. 4.

The second user plane function network element provided in this embodiment can perform the foregoing session management method. Therefore, for a technical effect that can be achieved by the second user plane function network element, refer to descriptions in the foregoing method embodiments. Details are not described herein again.

Optionally, an embodiment of this application further provides an apparatus (for example, the apparatus may be a chip system). The apparatus includes a processor, configured to support a second user plane function network element to implement the foregoing session management method, for example, restore, on the second user plane function network element based on a seventh message, information about one or more sessions corresponding to a first logical interface group. In an embodiment, the apparatus further includes a memory. The memory is configured to store a program instruction and data that are necessary for the second user plane function network element. Certainly, the memory may alternatively be not in the apparatus. When the apparatus is a chip system, the apparatus may include a chip, or may include a chip and another discrete device. This is not specifically limited in this embodiment of this application.

Figure 16:
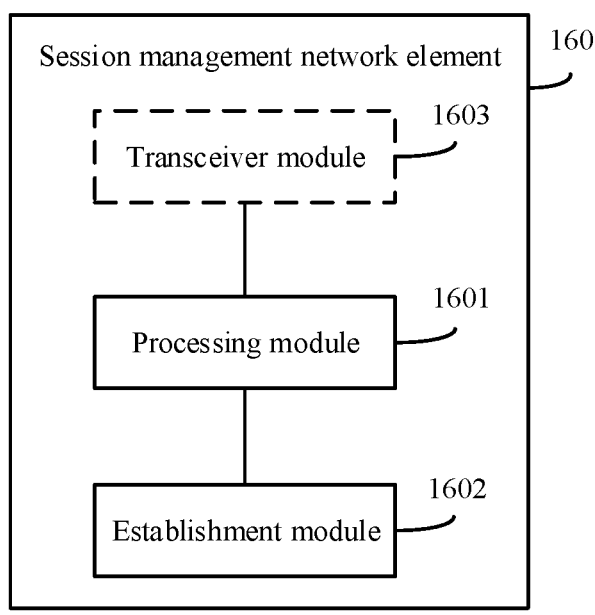
FIG. 16 is a schematic structural diagram of a session management network element according to an embodiment of this application.

For example, when the functional modules are obtained through integration, FIG. 16 is a schematic structural diagram of a session management network element 160. The session management network element 160 includes a processing module 1601 and an establishment module 1602. The processing module 1601 is configured to determine that a session needs to be established for a first terminal. The processing module 1601 is further configured to select a first user plane function network element to serve the first terminal. The processing module 1601 is further configured to allocate a first interface address to the first terminal based on a first logical interface group on the first user plane function network element, where the first logical interface group includes a group of interface addresses. The processing module 1601 is further configured to allocate a first IP address to the first terminal, where the first IP address is an address in a first IP address segment corresponding to the first logical interface group. The processing module 1601 is further configured to obtain, based on the first interface address, a first F-TEID corresponding to the session. The processing module 1601 is further configured to generate information about a first session for the first terminal, where the information about the first session includes one or more of the first IP address or the first F-TEID. The establishment module 1602 is further configured to establish a correspondence between information about the first logical interface group and the information about the first session.

Optionally, as shown in FIG. 16, the session management network element 160 may further include a transceiver module 1603. The processing module 1601 is further configured to allocate, to the first user plane function network element, the first logical interface group and the first IP address segment corresponding to the first logical interface group. The transceiver module 1603 is further configured to send configuration information of the first logical interface group and information about the first IP address segment to the first user plane function network element.

Optionally, the transceiver module 1603 is further configured to send a fifth message to a service control function network element, where the fifth message carries an identifier of the first user plane function network element, and is used to request to allocate, to the first UPF network element, a first logical interface group list and one or more IP address segments corresponding to each of one or more logical interface groups in the first logical interface group list. The transceiver module 1603 is further configured to receive, from the service control function network element, configuration information of the first logical interface group and information about the first IP address segment corresponding to the first logical interface group. The transceiver module 1603 is further configured to send, to the first user plane function network element, the configuration information of the first logical interface group and the information about the first IP address segment corresponding to the first logical interface group.

Optionally, the processing module 1601 is further configured to determine that the first logical interface group needs to be migrated. The processing module 1601 is further configured to determine a second user plane function network element for the first logical interface group. The transceiver module 1603 is further configured to send, to the second user plane function network element, the configuration information of the first logical interface group and the information about the first IP address segment corresponding to the first logical interface group, to restore the configuration information of the first logical interface group and the information about the first IP address segment on the second user plane function network element. The transceiver module 1603 is further configured to send a first message, where the first message is used to restore, on the second user plane function network element, information about one or more sessions corresponding to the first logical interface group, and the information about the one or more sessions includes the information about the first session.

All related content of the steps in the foregoing method embodiments may be cited in function descriptions of corresponding functional modules. Details are not described herein again.

In this embodiment, the session management network element 160 is presented in a form of functional modules obtained through integration. The "module" herein may be a specific ASIC, a circuit, a processor that executes one or more software or firmware programs, a memory, an integrated logic circuit, and/or another device that can provide the foregoing functions. In a simple embodiment, a person skilled in the art may figure out that the session management network element 160 may be in a form shown in FIG. 4.

For example, the processor 401 in FIG. 4 may invoke a computer-executable instruction stored in the memory 403, to enable the session management network element 160 to perform the session management method in the foregoing method embodiments.

Specifically, functions/implementation processes of the processing module 1601, the establishment module 1602, and the transceiver module 1603 in FIG. 16 may be implemented by the processor 401 in FIG. 4 by invoking the computer-executable instruction stored in the memory 403. Alternatively, functions/implementation processes of the processing module 1601 and the establishment module 1602 in FIG. 16 may be implemented by the processor 401 in FIG. 4 by invoking the computer-executable instruction stored in the memory 403, and a function/an implementation process of the transceiver module 1603 in FIG. 16 may be implemented by the communications interface 404 in FIG. 4.

The session management network element provided in this embodiment can perform the foregoing session management method. Therefore, for a technical effect that can be achieved by the session management network element, refer to descriptions in the foregoing method embodiments. Details are not described herein again.

Optionally, an embodiment of this application further provides an apparatus (for example, the apparatus may be a chip system). The apparatus includes a processor, configured to support a session management network element to implement the foregoing session management method, for example, allocate a first interface address to a first terminal based on a first logical interface group on a first user plane function network element. In an embodiment, the apparatus further includes a memory. The memory is configured to store a program instruction and data that are necessary for the session management network element. Certainly, the memory may alternatively be not in the apparatus. When the apparatus is a chip system, the apparatus may include a chip, or may include a chip and another discrete device. This is not specifically limited in this embodiment of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising (comprising)" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, various modifications and combinations may be made to this application without departing from the spirit and scope of this application. Correspondingly, the specification and the accompanying drawings are merely example descriptions of this application defined by the accompanying claims, and are considered to cover any of or all modifications, variations, combinations or equivalents in the scope of this application. A person skilled in the art can make various modifications and variations to this application without departing from the spirit and scope of this application. This application is intended to cover these modifications and variations of this application provided that the modifications and variations fall within the scope of protection defined by the following claims and their equivalent technologies.

What is claimed is:

1. A session management method, wherein the method comprises:
    determining, by a network device, that a first logical interface group on a first user plane function network element needs to be migrated, wherein the first logical interface group comprises a group of interface addresses;
    determining, by the network device, a second user plane function network element for the first logical interface group;
    sending, by the network device to the second user plane function network element, configuration information of the first logical interface group and information about a first internet protocol (IP) address segment corresponding to the first logical interface group, to restore the configuration information of the first logical interface group and the information about the first IP address segment on the second user plane function network element; and
    sending, by the network device, a first message, wherein the first message is used to restore, on the second user plane function network element, information about one or more sessions corresponding to the first logical interface group.

2. The method according to claim 1, wherein the network device comprises a session management network element or a service control function network element.

3. The method according to claim 2, wherein when the network device is the session management network element, the method further comprises: determining, by the session management network element based on information about the first logical interface group, the information about the one or more sessions corresponding to the first logical interface group; and
    the sending, by the network device, a first message comprises:
    sending, by the session management network element, the first message to the second user plane function network element, wherein the first message carries the information about the one or more sessions corresponding to the first logical interface group.

4. The method according to claim 3, wherein the determining, by the session management network element based on information about the first logical interface group, the information about the one or more sessions corresponding to the first logical interface group comprises:
    determining, by the session management network element based on the information about the first logical interface group and a stored correspondence between the information about the first logical interface group and the information about the one or more sessions corresponding to the first logical interface group, the information about the one or more sessions corresponding to the first logical interface group.

5. The method according to claim 2, wherein when the network device is the service control function network element, the sending, by the network device, a first message comprises:
    sending, by the service control function network element, the first message to a session management network element, wherein the first message carries information about the first logical interface group, and is used to indicate the session management network element to initiate a procedure for restoring the information about the one or more sessions corresponding to the first logical interface group, to enable the session management network element to send a second message to the second user plane function network element, wherein the second message carries the information about the one or more sessions corresponding to the first logical interface group.

6. The method according to claim 2, wherein when the network device is the session management network element, the method further comprises: determining, by the session management network element based on information about the first logical interface group, the information about the one or more sessions corresponding to the first logical interface group;
    the sending, by the network device, a first message comprises:
    sending, by the session management network element, the first message to the second user plane function network element, wherein the first message carries the information about the one or more sessions corresponding to the first logical interface group; and
    the sending, by the network device to the second user plane function network element, configuration information of the first logical interface group and information about a first IP address segment corresponding to the first logical interface group comprises:
    after the session management network element receives a third message returned by the second user plane function network element based on the first message, sending, by the session management network element to the second user plane function network element, the configuration information of the first logical interface group and the information about the first IP address segment corresponding to the first logical interface group, wherein the third message is used to indicate that the information about the one or more sessions corresponding to the first logical interface group has been successfully restored on the second user plane function network element.

7. The method according to claim 2, wherein when the network device is the service control function network element, the sending, by the network device, a first message comprises:
    sending, by the service control function network element, the first message to a session management network element, wherein the first message carries information about the first logical interface group, and is used to indicate the session management network element to initiate a procedure for restoring the information about the one or more sessions corresponding to the first logical interface group, so that the session management network element sends a second message to the second user plane function network element, and the second message carries the information about the one or more sessions corresponding to the first logical interface group; and
    the sending, by the network device to the second user plane function network element, configuration information of the first logical interface group and information about a first IP address segment corresponding to the first logical interface group comprises:
    after the service control function network element receives a third message returned by the session management network element based on the first message, sending, by the service control function network element to the second user plane function network element, the configuration information of the first logical interface group and the information about the first IP address segment corresponding to the first logical interface group, wherein the third message is used to indicate that the information about the one or more sessions corresponding to the first logical interface group has been successfully restored on the second user plane function network element.

8. The method according to claim 2, wherein when the network device is the session management network element, the determining, by the network device, a second user plane function network element for the first logical interface group comprises:
sending, by the session management network element, a fourth message to a service control function network element, wherein the fourth message carries an identifier of the first user plane function network element and the information about the first logical interface group, and is used to request to reselect a user plane function network element for the first logical interface group;
and receiving, from the service control function network element, an identifier of the second user plane function network element and the information about the first logical interface group, to indicate to migrate the first logical interface group to the second user plane function network element; or
selecting, by the session management network element, the second user plane function network element for the first logical interface group.

9. The method according to claim 2, wherein when the network device is the session management network element, before the determining, by a network device, that a first logical interface group on a first user plane function network element needs to be migrated, the method further comprises:
sending, by the session management network element, a fifth message to a service control function network element, wherein the fifth message carries an identifier of the first user plane function network element, and is used to request to allocate, to the first user plane function network element, a first logical interface group list and one or more IP address segments corresponding to each of one or more logical interface groups in the first logical interface group list;
receiving, by the session management network element from the service control function network element, the configuration information of the first logical interface group and the information about the first IP address segment corresponding to the first logical interface group; and
sending, by the session management network element to the first user plane function network element, the configuration information of the first logical interface group and the information about the first IP address segment corresponding to the first logical interface group.

10. The method according to claim 2, wherein when the network device is the service control function network element, the determining, by a network device, that a first logical interface group on a first user plane function network element needs to be migrated comprises:
receiving, by the service control function network element, a sixth message from a session management network element, wherein the sixth message carries the information about the first logical interface group, and is used to request to reselect a user plane function network element for the first logical interface group.

11. The method according to claim 2, wherein when the network device is the session management network element, before the determining, by a network device, that a first logical interface group on a first user plane function network element needs to be migrated, the method further comprises:
determining, by the session management network element, that a session needs to be established for the first terminal;
selecting, by the session management network element, the first user plane function network element to serve the first terminal;
allocating, by the session management network element, a first interface address to the first terminal based on the first logical interface group on the first user plane function network element;
allocating, by the session management network element, a first IP address to the first terminal, wherein the first IP address is an address in the first IP address segment corresponding to the first logical interface group;
obtaining, by the session management network element based on the first interface address, a first fully qualified tunnel endpoint identifier (F-TEID) corresponding to the session; and
generating, by the session management network element, information about a first session for the first terminal, and establishing a correspondence between the information about the first logical interface group and the information about the first session, wherein the information about the first session comprises one or more of the first IP address or the first F-TEID.

12. The method according to claim 1, wherein the determining, by a network device, that a first logical interface group on a first user plane function network element needs to be migrated comprises:
obtaining, by the network device, one or more of a running status of the first user plane function network element or a running status of the first logical interface group on the first user plane function network element; and
determining, by the network device based on one or more of the running status of the first user plane function network element or the running status of the first logical interface group on the first user plane function network element, that the first logical interface group on the first user plane function network element is faulty.

13. The method according to claim 1, wherein the determining, by a network device, that a first logical interface group on a first user plane function network element needs to be migrated comprises:
obtaining, by the network device, load information of the first user plane function network element; and
determining, by the network device based on the load information, that the first logical interface group on the first user plane function network element needs to be migrated.

14. The method according to claim 1, wherein before the determining, by a network device, that a first logical interface group on a first user plane function network element needs to be migrated, the method further comprises:
allocating, by the network device to the first user plane function network element, the first logical interface group and the first IP address segment corresponding to the first logical interface group; and
sending, by the session management network element to the first user plane function network element, the configuration information of the first logical interface group and the information about the first IP address segment corresponding to the first logical interface group.

15. The method according to claim 1, wherein the method further comprises:
sending, by the network device, a notification message to the first user plane function network element, wherein the notification message is used to notify the first user plane function network element to delete the information related to the first logical interface group, wherein the information related to the first logical interface group comprises one or more of the configuration information of the first logical interface group, the information about the first IP address segment corresponding to the first logical interface group, the information about the one or more sessions corresponding to the first logical interface group, or an advertised routing policy for the first IP address segment, and the routing policy is used to route data to the first user plane function network element.

* * * * *

UNITED STATES PATENT AND TRADEMARK OFFICE
CERTIFICATE OF CORRECTION

| | |
|---|---|
| PATENT NO. | : 11,399,405 B2 |
| APPLICATION NO. | : 17/014696 |
| DATED | : July 26, 2022 |
| INVENTOR(S) | : Hu et al. |

It is certified that error appears in the above-identified patent and that said Letters Patent is hereby corrected as shown below:

On the Title Page

(57) ABSTRACT, Column 1, Line 1: "Embodiments provide a method, a device, and system to"
Should read -- Embodiments provide a method, device, and system to --.

Signed and Sealed this
Fifteenth Day of November, 2022

Katherine Kelly Vidal
*Director of the United States Patent and Trademark Office*